US009753682B2

(12) United States Patent
Ito et al.

(10) Patent No.: US 9,753,682 B2
(45) Date of Patent: Sep. 5, 2017

(54) INFORMATION PROCESSING APPARATUS, INFORMATION PROCESSING METHOD, AND COMPUTER-READABLE STORAGE MEDIUM

(71) Applicant: CANON KABUSHIKI KAISHA, Tokyo (JP)

(72) Inventors: Yosuke Ito, Yokohama (JP); Kenji Baba, Tokyo (JP); Wataru Tamaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/581,524

(22) Filed: Dec. 23, 2014

(65) Prior Publication Data

US 2015/0186085 A1    Jul. 2, 2015

(30) Foreign Application Priority Data

Dec. 27, 2013  (JP) ................................. 2013-272039
Dec. 27, 2013  (JP) ................................. 2013-272040

(51) Int. Cl.
*H04N 1/04*  (2006.01)
*G06F 3/12*  (2006.01)

(52) U.S. Cl.
CPC .......... *G06F 3/1247* (2013.01); *G06F 3/1211* (2013.01); *G06F 3/1277* (2013.01); *G06F 3/1288* (2013.01); *G06F 3/121* (2013.01)

(58) Field of Classification Search
CPC ....... G06F 3/1277; G06F 3/1288; G06F 3/121
USPC .......................................... 358/1.9, 474, 488
See application file for complete search history.

(56) References Cited

U.S. PATENT DOCUMENTS 6,269,195 B1 *  7/2001  Gonsalves ........... H04N 5/2622
                                                 348/E5.052
2002/0181024 A1 * 12/2002  Morimoto .......... H04N 1/40075
                                                    358/3.15

FOREIGN PATENT DOCUMENTS

JP         2013-093890 A      5/2013

* cited by examiner

*Primary Examiner* — Houshang Safaipour
(74) *Attorney, Agent, or Firm* — Canon USA, Inc. IP Division

(57) ABSTRACT

An information processing apparatus includes an acquisition unit configured to acquire input data used to generate an image, a conversion unit configured to generate intermediate data by performing data conversion on the input data with a first data conversion filter activated as a first process, and to generate image data by performing data conversion on the intermediate data with a second data conversion filter activated as a second process different from the first process, and an output unit configured to output the image data.

19 Claims, 43 Drawing Sheets

FIG.5

```
<?xml version="1.0"encoding="utf-8"standalone="no"?>
<FiltersCatalog>
    <Function id="Conversion for print service A">          ~501
        <Filter name="Filter A"version="1.0.0.0"/>
        <Filter name="Filter B"version="1.0.0.0"/>          ~502
        <Filter name="Filter C"version="1.0.0.0"/>
    </Function>
    <Function id="Conversion for print service B thumbnail">
        <Filter name="Filter A"version="1.0.0.0"/>
        <Filter name="Filter D"version="1.0.0.0"/>
    </Function>
</FiltersCatalog>
```

FIG.8

| | | |
|---|---|---|
| 802 | COMPONENT NAME | FilterController |
| 803 | VERSION | 1.0.2.3 |
| 804 | EXECUTION FILE PATH | C:¥... ¥FilterController.exe |
| 805 | CONFIGURATION FILE PATH | C:¥... ¥FilterController.cfg |
| 806 | TERMINATION CONDITION (TIME) | 3600 |
| 806 | TERMINATION CONDITION (NUMBER OF JOBS) | 20 |
| 807 | ACTIVATION MODE | HotStandby |
| 808 | MAXIMUM NUMBER OF ACTIVATIONS | 5 |

FIG.9

| | | 706 |
|---|---|---|
| 901 | | |
| 902 | ID | {420AB3480-1313...} |
| 903 | NAME | FilterController |
| 904 | VERSION | 1.0.2.3 |
| 905 | ADDRESS | 101.10.10.1 |
| | PORT | 69483 |
| 906 | LIFETIME | 30 |
| 907 | STATUS | IDLING |
| 908 | LAST CONTACT TIME | 657857435 |

FIG.16A

```
<?xml version="1.0"encoding="utf-8"standalone="no"?>
<ProcessManagerConfig>
    ...
    <CBEndPoint address="225.0.0.0"port="54567"/>   ~1601
    ...
</ProcessManagerConfig>
```

FIG.16B

```
<?xml version="1.0"encoding="utf-8"standalone="no"?>
<ProcessManagerConfig>
    ...
    <CBEndPoint address="225.0.0.0"port="54569"/>   ~1602
    ...
</ProcessManagerConfig>
```

FIG.16C

```
<?xml version="1.0"encoding="utf-8"standalone="no"?>
<JobReceiverConfig>
    ...
    <AvailableEndPoints>
        <CBEndPoint address="225.0.0.0"port="54567"/>   ~1603
        <CBEndPoint address="225.0.0.0"port="54569"/>   ~1604
    </AvailableEndPoints>
    ...
</JobReceiverConfig>
```

FIG.22

| FILTER NAME 1301 | VERSION 1302 | NUMBER OF PROCESSED JOBS 1303 | NUMBER OF ABNORMAL TERMINATIONS 1304 | RELIABILITY 1305 | DETERMINATION THRESHOLD 1306 |
|---|---|---|---|---|---|
| FILTER A | 1.0.0.0 | 0 | 0 | LOW | 10000 |
| FILTER B | 1.0.0.0 | 0 | 0 | LOW | 10000 |
| FILTER C | 1.0.0.0 | 0 | 0 | LOW | 10000 |
| ... | ... | ... | ... | ... | ... |
| FILTER Z | 1.0.0.0 | 0 | 0 | LOW | 10000 |

FIG.23

| FILTER NAME 1301 | VERSION 1302 | NUMBER OF PROCESSED JOBS 1303 | NUMBER OF ABNORMAL TERMINATIONS 1304 | RELIABILITY 1305 | DETERMINATION THRESHOLD 1306 |
|---|---|---|---|---|---|
| FILTER A | 1.0.0.0 | 50000 | 2 | HIGH | 10000 |
| FILTER B | 1.0.0.0 | 20000 | 0 | HIGH | 10000 |
| FILTER C | 1.0.0.0 | 20000 | 3 | LOW | 10000 |
| ... | | ... | ... | ... | |
| FILTER Z | 1.0.0.0 | 10 | 0 | LOW | 10000 |

FIG.30

| | 1301 | 1302 | 1303 | 1304 | 1305 | 1306 |
|---|---|---|---|---|---|---|
| | FILTER NAME | VERSION | NUMBER OF PROCESSED JOBS | NUMBER OF ABNORMAL TERMINATIONS | RELIABILITY | DETERMINATION THRESHOLD |
| | FILTER A | 1.0.0.0 | 0 | 0 | HIGH | 10000 |
| | FILTER B | 1.0.0.0 | 0 | 0 | HIGH | 10000 |
| | FILTER C | 1.0.0.0 | 0 | 0 | HIGH | 10000 |
| | ... | | | | ... | |
| | FILTER Z | 1.0.0.0 | 0 | 0 | HIGH | 10000 |

FIG.34

| ANTERIOR PROCESSING FILTER NAME | VERSION | POSTERIOR PROCESSING FILTER NAME | VERSION | NUMBER OF PROCESSED JOBS | NUMBER OF ABNORMAL TERMINATIONS | RELIABILITY | DETERMINATION THRESHOLD |
|---|---|---|---|---|---|---|---|
| FILTER B | 1.0.0.0 | FILTER C | 1.0.0.0 | 40000 | 5 | LOW | 10000 |
| FILTER Z | 1.0.0.0 | FILTER C | 1.0.0.0 | 45000 | 0 | HIGH | 10000 |
| INPUT DATA | | FILTER A | 1.0.0.0 | 40000 | 2 | HIGH | 10000 |

FIG.36

| | INPUT FORM SUPPORTED BY POST-STAGE FILTER | | |
|---|---|---|---|
| OUTPUT FORM SUPPORTED BY PRE-STAGE FILTER | ONLY PASS BY MEMORY | ONLY PASS BY PATH | BOTH AVAILABLE |
| ONLY PASS BY MEMORY | DATA COMMUNICATION | PATH COMMUNICATION | DATA COMMUNICATION |
| ONLY PASS BY PATH | PATH COMMUNICATION | PATH COMMUNICATION | PATH COMMUNICATION |
| BOTH AVAILABLE | DATA COMMUNICATION | PATH COMMUNICATION | DATA COMMUNICATION |

```
<FiltersCatalog>
2701 ―― <Application id="Print">
        <Filter name="FilterA" />
2702 ―― <Filter name="FilterB" />
        <Filter name="FilterC" />
    </Application>
    <Application id="Thumbnail">
        <Filter name="FilterD" />
        <Filter name="FilterC" />
    </Application>
</FiltersCatalog>
```

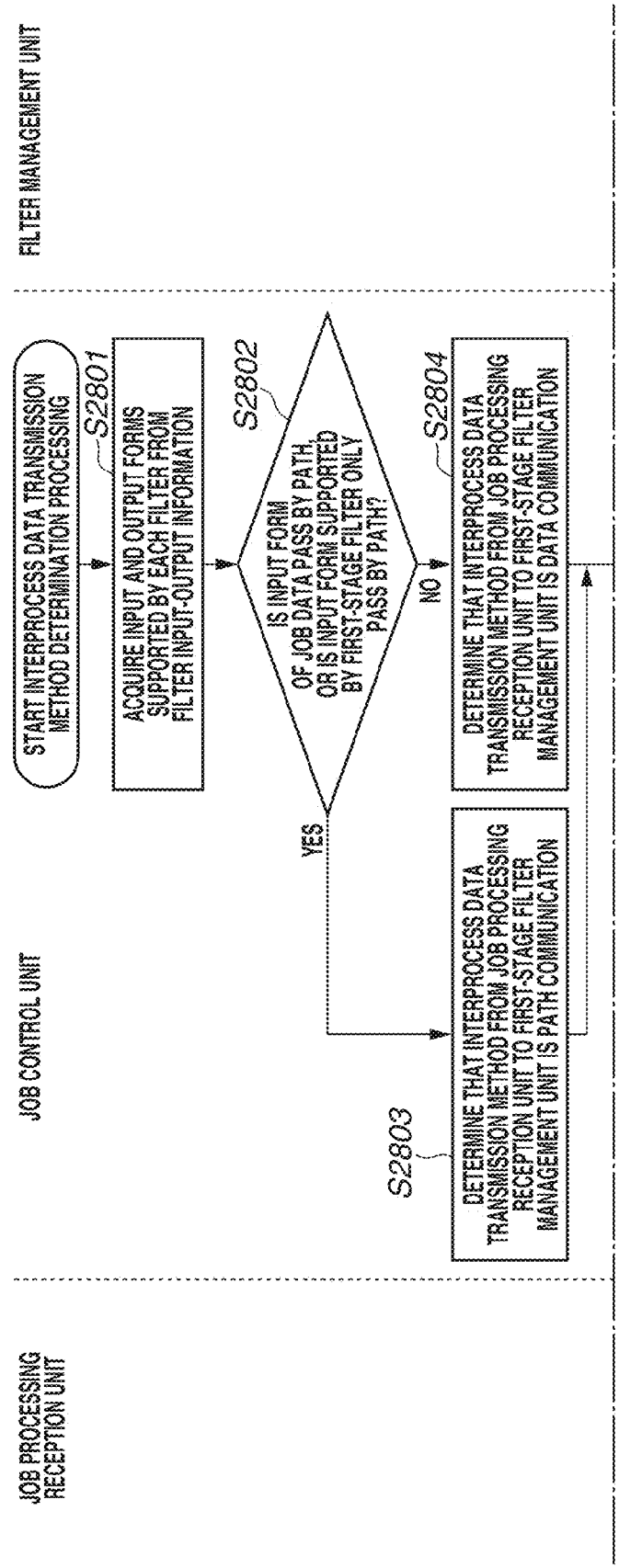

FIG.40

```
<FilterInformation>
    <Filter name="FilterA" >                                    — 2901
        <IOType memory="supported" path="supported" />          — 2904
    </Filter>
    <Filter name="FilterB" >                                    — 2902
        <IOType memory="unsupported" path="supported" />        — 2905
    </Filter>
    <Filter name="FilterC" >                                    — 2903
        <IOType memory="supported" path="supported" />          — 2906
    </Filter>
    <Filter name="FilterD" >
        <IOType memory="supported" path="unsupported" />
    </Filter>
</FilterInformation>
```

INFORMATION PROCESSING APPARATUS, INFORMATION PROCESSING METHOD, AND COMPUTER-READABLE STORAGE MEDIUM

BACKGROUND

Field of the Disclosure

The present Disclosure relates to an information processing apparatus, an information processing method, and a computer-readable storage medium for converting data.

Description of the Related Art

Web services called "cloud print service" have appeared recently in which a web service (server) generates print data based on a request from a user terminal (client) and a printer then receives and prints the print data. The cloud print service does not require users to install a device driver program (printer driver) for printer control on a user terminal and allows users to make a print request from anywhere. Therefore, the cloud print service is considered to become increasingly widespread in the future.

The implementation of the cloud print service results in the necessity of data conversion on the cloud from document data, as a print target, to print data compatible with various types of printers. Therefore, there is such a way that directly arranges, in a server on the cloud, printer drivers such as those previously used by user terminals (for example, personal computers (PCs)) and performs data conversion with a printer driver compatible with a printer to use.

However, in cases where multiple printer drivers are arranged on the cloud, since most printer drivers have common internal processing, the common portions would be redundantly retained on the cloud. Therefore, there may be considered a way to implement a data conversion service by commonalizing functions constituting the printer drivers (in the following description, the commonalized functions are referred to as "filters") and combining the commonalized functions.

Japanese Patent Application Laid-Open No. 2013-093890 discusses implementing the functions of a printer driver by combining a plurality of data conversion filters used to perform conversion of input data.

Methods for data conversion processing on the cloud include a single process-based method and a multiple process-based method. Here, the "process" means a unit of processing with which an operating system (OS) performs processing of a computer program. The single process-based method is a method in which a plurality of pieces of data conversion processing is performed within a single process. On the other hand, the multiple process-based method is a method in which a plurality of pieces of data conversion processing is respectively performed with a plurality of separate processes.

The single process-based method is generally able to have higher performance in processing than the multiple process-based method. This is because, while the multiple process-based method requires an interprocess communication in exchanging data between processes, the single process-based method does with a function call between components or data exchange for memory without performing any interprocess communication, thus enabling high-speed processing. The single process-based method also makes designing simpler than the multiple process-based method, and thus enables reducing the number of man-hour of designing and implementation.

Japanese Patent Application Laid-Open No. 2013-093890, as mentioned above, discusses a technique to implement the functions of a printer driver by combining a plurality of data conversion filters. Data conversion with such a combination of a plurality of data conversion filters is generally performed with a single process of the filter and pipeline architecture for the reasons mentioned above.

However, the "cloud print service" needs to provide services 24 hours a day, 365 days a year and, thus, has an aspect that emphasizes its availability.

For example, in a case where designing and implementation are performed with the single process-based method, if any component for data conversion runs into crash or hang-up, the entire system (user system) may be entangled. If the entire system is entangled, the entire data conversion module may crash or hang up, thus coming to an abnormal end. Here, "hang-up" means a situation in which a reaction from software ceases due to infinite loop, deadlock, infinite recursion, or circular reference.

In addition, separate software may be required to reboot the system after the abnormal end. Furthermore, even if the system can be rebooted, the user system is not able to perform processing until the system is rebooted. In particular, if one of data conversion filters contains software the quality of which was insufficiently verified, crash or hang-up may occur frequently.

Moreover, crash or hang-up of the entire system may disable collecting logs, thus complicating fault analysis.

SUMMARY

The present disclosure is directed to reducing, for an information processing apparatus that generates data, the possibility of a failure of one data conversion spreading to the entire data conversion.

According to an aspect of the present invention, an information processing apparatus includes an acquisition unit configured to acquire input data used to generate an image, a conversion unit configured to generate intermediate data by performing data conversion on the input data with a first data conversion filter activated as a first process, and to generate image data by performing data conversion on the intermediate data with a second data conversion filter activated as a second process different from the first process, and an output unit configured to output the image data.

Further features of the present invention will become apparent from the following description of exemplary embodiments with reference to the attached drawings.

BRIEF DESCRIPTION OF THE DRAWINGS

FIG. 5 illustrates an example of a configuration file in which the types and alignment sequence of filters are defined according to the first exemplary embodiment.

FIG. 8 is a schematic diagram illustrating a configuration of a service catalog according to the first exemplary embodiment.

FIG. 9 is a schematic diagram illustrating a configuration of a service inventory according to the first exemplary embodiment.

FIGS. 16A, 16B, and 16C illustrate examples of configuration files in each of which connection information is described according to the second exemplary embodiment.

FIG. 22 illustrates a table in which low reliability is set, as an initial value, to data conversion filters.

FIG. 23 illustrates a table obtained after operation results have accumulated in the data conversion filters.

FIG. 30 is a schematic diagram illustrating a table in which operation results are stored.

FIG. 34 illustrates a modification example of a table in which operation results are stored.

FIG. 36 illustrates a method for interprocess data transmission between filter management units according to the seventh exemplary embodiment.

FIG. 38 illustrates an example of filter configuration information according to the seventh exemplary embodiment.

FIG. 40 illustrates an example of filter input-output information according to the seventh exemplary embodiment.

DESCRIPTION OF THE EMBODIMENTS

A first exemplary embodiment is directed to a method for activating and executing, as separate processes, components constituting at least one data conversion processing among data conversions using a plurality of data conversion filters.

Figure 1:
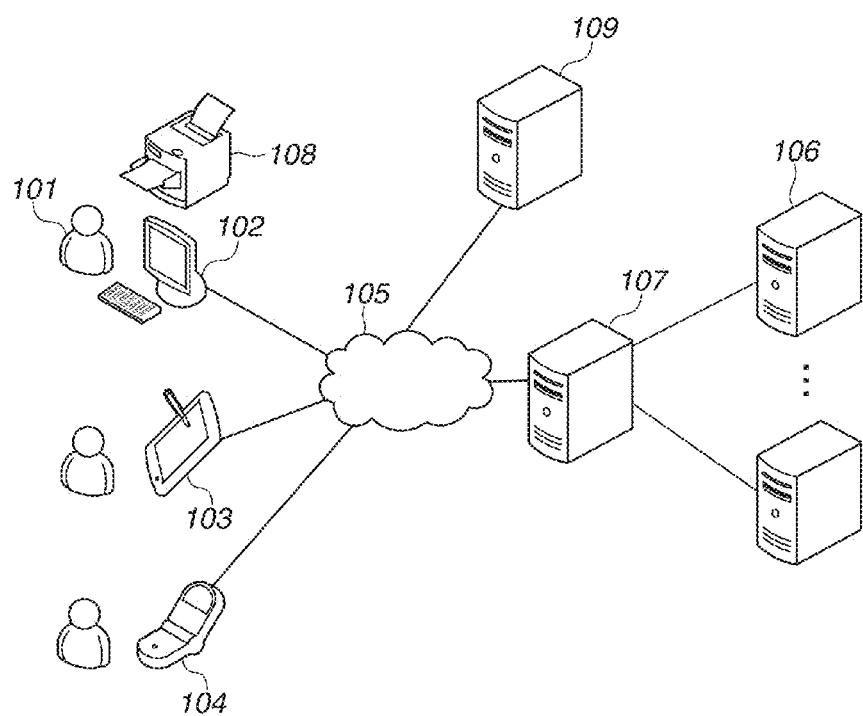
FIG. 1 is a system configuration diagram illustrating a cloud print service according to a first exemplary embodiment.

Activating, as separate processes, components constituting respective data conversion processing can prevent the entire system from being entangled even if crash or hang-up occurs in a component. Therefore, special software for rebooting the system becomes unnecessary. FIG. 1 is a system configuration diagram illustrating a cloud print service according to the first exemplary embodiment, which includes a plurality of information processing apparatuses. The cloud print service generates image data for printing by a data conversion service on the server performing conversion in response to a request from a terminal apparatus, such as a client computer. The generated image data for printing is then output to and printed by a printer connected via a network.

A client 101, who requests conversion of print data, uses, as an apparatus that sends out a request for conversion of print data, such an apparatus as a personal computer (PC) 102, a tablet PC 103, or mobile terminal 104. Such an apparatus receives an operation from the client 101 and requests a print data conversion service, which is present in a server on the network 105, to convert print data. The print data conversion service is a program running as a web service with its specific Uniform Resource Locator (URL) published on a server PC 106. On the server PC 106, a web server also runs which transfers a request that has arrived at the URL to the print data conversion service. In general, since a great number of requests normally arrive at the URL, the cloud print service is configured to allow not a single server PC 106 but a plurality of server PCs 106 to process the requests. Accordingly, a load balancer 107 is arranged in the preceding stage of the plurality of server PCs 106 to cause the transferred requests to be uniformly distributed to the respective server PCs 106.

Services that can be provided by the print data conversion service include converting data received from the client 101 into a format available for printing by a printer 108. Formats generated by a variety of application programs, such as a document and an image file, exist with regard to data that can be received from the client 101. On the other hand, data that can be received as print data by the printer 108 is not in the above-mentioned formats, and is data described in page-description language (PDL) or image data for printing used to control printing, such as the number of print copies. Thus, since there is a difference in usable data format between the client 101 and the printer 108, a program for compensating for the difference is required. The program for performing such conversion processing is generally referred to as a printer driver. The printer driver is usually allowed to run on a PC on which the above-mentioned programs operated by the client 101 run. However, since processing performed by the printer driver is heavy processing requiring many resources, such as a central processing unit (CPU) and memory, in a case where the PC operated by the client 101 holds only a few resources, the processing would be time-consuming to the extent that print processing becomes impractical. As the demand for printing via terminals having relatively a few resources, such as the tablet PC 103 and the mobile terminal 104, increases, the importance of allowing the processing by the printer driver to be performed by the server service on the Internet is also growing.

The personal computer 102, the tablet PC 103, or the mobile terminal 104, as mentioned above, receives an instruction from the client 101 and makes a request to the above-mentioned URL for converting print data into the format available for printing by the printer 108. Converted data generated by the print data conversion service, which runs on the server PC 106, in response to the request is returned to the above-mentioned terminal. Depending on an instruction from the client 101, the converted data may be stored in a file server PC 109, which is accessible by the print data conversion service.

<Hardware Configuration>

Figure 2:
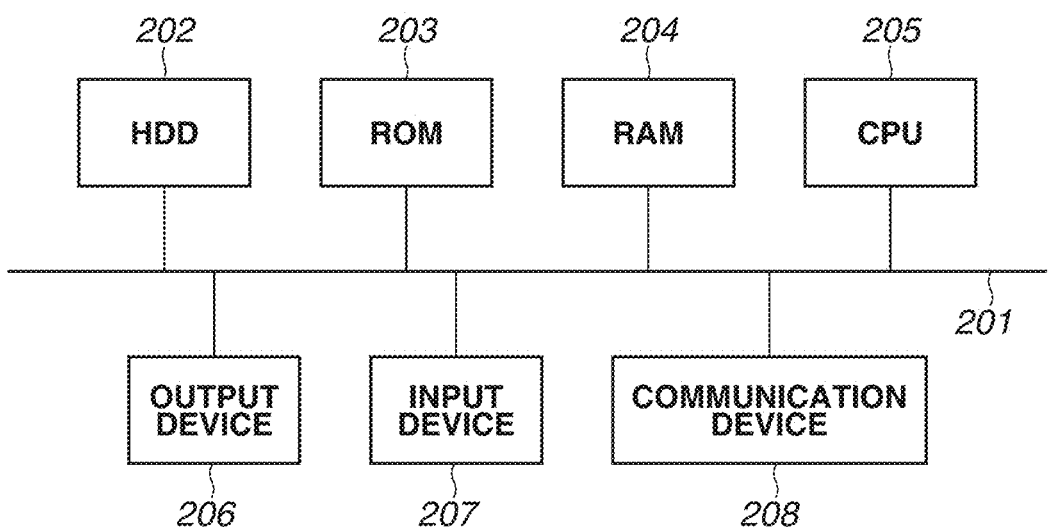
FIG. 2 is a hardware configuration diagram illustrating a server PC in which a print data conversion service runs according to the first exemplary embodiment.

FIG. 2 is a hardware configuration diagram illustrating the server PC 106, on which a group of software components, including the print data conversion service, runs.

The print data conversion service is a program running on an operating system (OS), and is stored in a hard disk drive (HDD) 202 or a read-only memory (ROM) 203. A CPU 205 reads out the OS and an application program from the HDD 202 or the ROM 203, loads them into a random access memory (RAM) 204, and executes them so that various processing operations progress and function as the print data conversion service. The processing result is stored as a file into the HDD 202 or is stored as data into the RAM 204. The application program acquires an input from the user via an input device 205 connected to the computer and various read values from the respective sensors. The application program also outputs information to an output device 206 to display the processing result. The application program further communicates with another computer or apparatus, which is connected to a network, via a communication device 208. Such hardware components are interconnected via a bus 201, and are configured to be operable by the application program.

<Software Arrangement>

Figure 3:
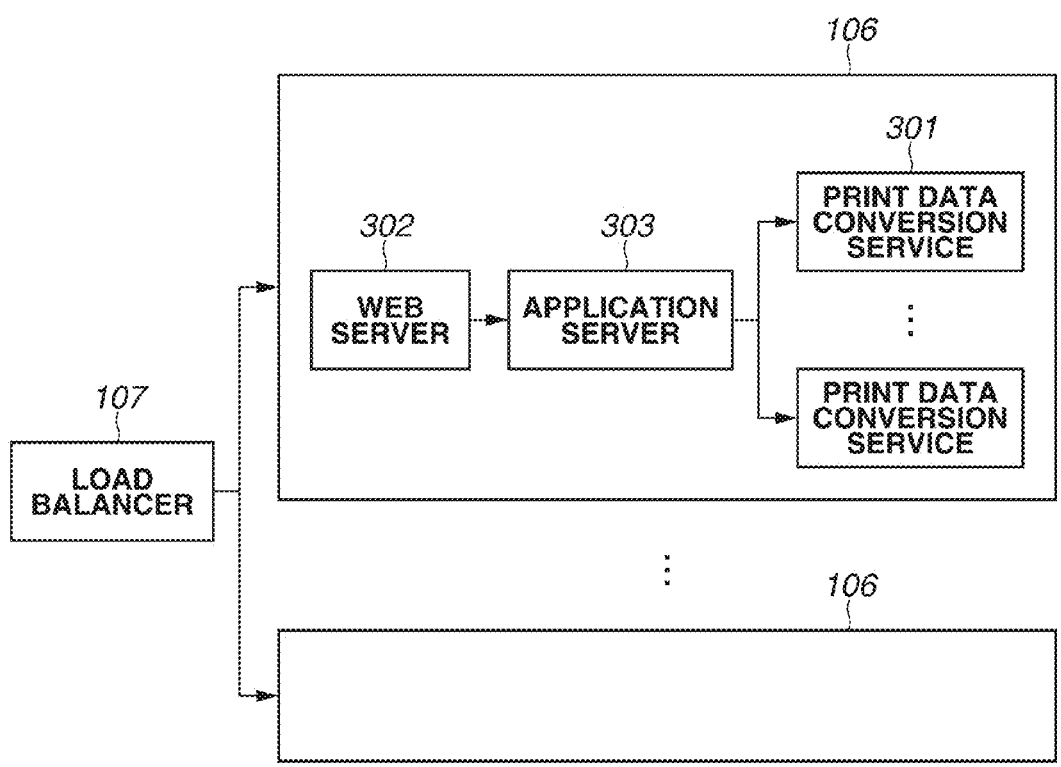
FIG. 3 is a block diagram illustrating software that runs on the server PC according to the first exemplary embodiment.

FIG. 3 is a block diagram illustrating how a group of software components, including the print data conversion service 301, is configured on the server PC 106. A web server 302 receives a request transmitted in the HyperText Transfer Protocol (HTTP) from an application on the personal computer 102 operated by the client 101. The load balancer 107, which is located in the pre-stage of the web server 302, distributes the received requests to web servers 302, which run on a plurality of server PCs 106, based on the processing loads of the respective web servers 302. Various methods for distribution by the load balancer 107 are known and are thus omitted from description.

Here, the server PC 106 does not necessarily need to mean a physically single server PC. Since such virtual technique to realize a plurality of virtual PCs on a single PC has become popular at present, software cannot or does not need to determine whether an operating system on which the software itself runs is virtually created.

Therefore, the server PC 106 according to the first exemplary embodiment may mean "a virtualized PC as the case may be". In the following description, the expression "PC" is used to means both a physical PC and a virtualized PC.

An application server 303 analyzes a URL specified as a destination of the request and determines a print data conversion service 301 associated with the URL. The print data conversion service 301 performs data conversion on input data using a plurality of data conversion filters to generate image data for output (for printing). The details of processing by the print data conversion service 301 are described below. The web server 302 and the application server 303 are generally able to deal with a plurality of types of services and are able to identify a corresponding service based on the URL to distribute the requests. In the first exemplary embodiment, one of the plurality of types of services is a print data conversion service 301. While a service or services other than the print data conversion service 301 are usually running, in the description of the first exemplary embodiment, a service or services other than the print data conversion service 301 are omitted.

The print data conversion service 301 runs as a process on an OS running on the server PC 106. To cause a plurality of requests to be performed in parallel, the application server 303 activates a plurality of print data conversion services 301 and distributes the requests to the respective print data conversion services 301.

The application server 303 further manages a session for identifying a series of requests from the client 101. More specifically, the application server 303 implements session affinity in which requests from the same client 101 are transferred to the same print data conversion service 301.

<Print Data Conversion Service>

Figure 4:
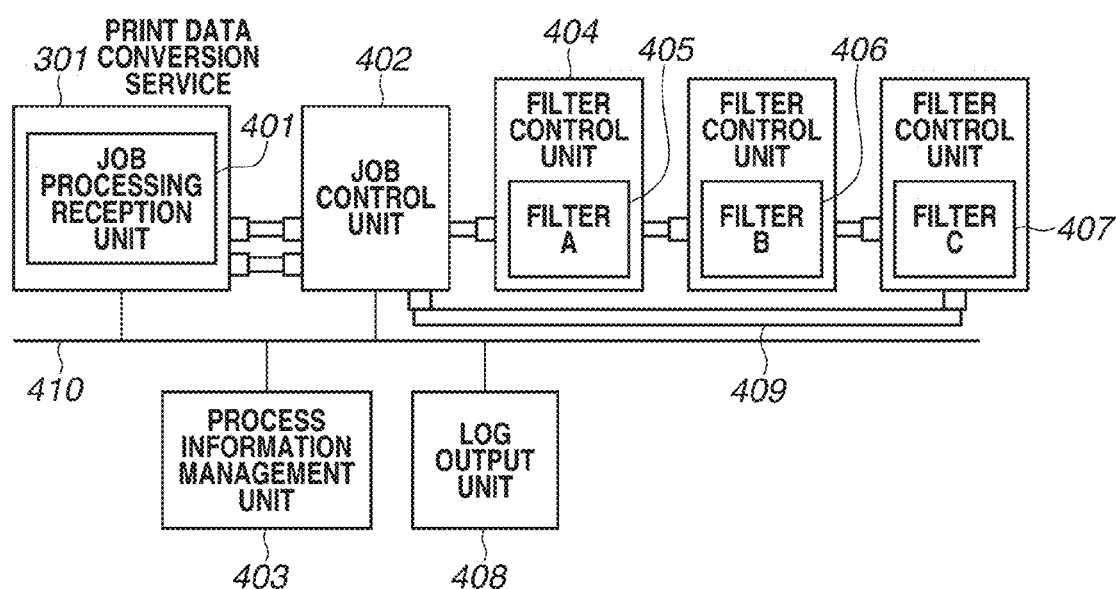
FIG. 4 is a configuration diagram illustrating a group of components associated with the print data conversion service according to the first exemplary embodiment.

FIG. 4 illustrates a group of software components, which the print data conversion service 301 uses to convert print data as requested, and a relationship between the software components. In the following description, a component activated as a process is referred to as a "component process".

The print data conversion service 301 runs as a process as described above.

Each software component which the print data conversion service 301 uses is described now with reference to FIG. 4.

<Job Processing Reception Unit 401>

A job processing reception unit 401 functions as an acquisition unit configured to acquire data and is a component that receives a series of data as a processing target from the print data conversion service 301. The series of data as a processing target is referred to as a "job". The job is composed of target data (input data) to be converted and a data structure called a "ticket" obtained by bundling setting values for conversion processing into a coherent form. The job is acquired from a mobile terminal, such as a client computer connected to a network.

The job processing reception unit 401 is loaded as a proxy for a job control unit 402, which is described below. Then, the job processing reception unit 401 requests execution of conversion processing by calling a set of functions provided by the Application Programming Interface (API) based on the received job. After completion of the conversion processing, the job processing reception unit 401 receives an execution result of the conversion processing.

<Job Control Unit 402>

The job control unit 402 is a component that is requested to execute a job via the job processing reception unit 401 and that selects a filter required for conversion based on "job type information" included in the job. The job control unit 402 runs as a process and holds a communication interface used to receive a conversion processing request from the job processing reception unit 401.

The request for a job to the communication interface uses not the HTTP but a dedicated protocol. The action of invoking the API of the job processing reception unit 401 is converted as an interprocess communication with the communication interface for receiving a conversion processing request held by the job control unit 402. In other words, for the print data conversion service 301, the conversion processing appears to be performed by the job processing reception unit 401. However, actually, the conversion processing is implemented by the interaction of the job control unit 402, a plurality of filter groups, which is described below, and some components used by the filter groups.

<Process Information Management Unit 403>

A process information management unit 403 is a component that functions to activate each component as a process. The activation of a process is performed based on a process activation condition including the number of activatable processes and the necessity or unnecessity of constant activation for each process. Accordingly, the process information management unit 403 functions as an activation condition acquisition unit configured to acquire an activation condition of a process and an activation unit configured to activate the process. Also, the process information management unit 403 provides the functionality of returning an end point of another component in response to a request from a different component. The term "end point" refers to a listen port in the Transmission Control Protocol/Internet Protocol (TCP/IP). A component is able to use a service provided by a different component by acquiring an end point released by the different component and accessing the acquired end point. An operation of a component inquiring of the process information management unit 403 about the end point of a different component is referred to as a "query".

As illustrated in FIG. 4, a plurality of types of components exist as processes, and a plurality of same components also exist on the same PC. Therefore, the port number of a service interface (I/F) released by each component cannot be made fixed and thus has no choice but to be dynamically generated. The dynamically-generated end point cannot be referred to by another component without the help of a management mechanism. The process information management unit 403 takes care of such a management operation. Also, a tool used for a component to acquire an end point dynamically generated by another component is required. This tool is a query.

For example, a log output unit 408 provides a service to record logging data as a log file, and the job processing reception unit 401, the job control unit 402, and a filter control unit 404 query the log output unit 408 to use the service. Similarly, the job processing reception unit 401 queries the job control unit 402, and the job control unit 402 queries a filter A 405, a filter B 406, and a filter C 407. The flow of processing for query is described below with reference to FIGS. 7A, 7B, 7C, 7D, 7E, 7F, 7G, 7H, 7I, and 7J and FIG. 10.

The process information management unit 403 is a special component, which solely has already been activated at the time of activation of the application server 303. An operating system (OS) running on the server PC 106 is set, and a process of the process information management unit 403 is automatically activated at the time of activation of the OS.

<Filter Control Unit 404>

The filter control unit 404 runs as a process, and is a component that loads a filter for data conversion specified at the time of execution. The filter for data conversion is prepared in the form of a library module in which only data conversion processing is implemented. The filter control unit 404 takes care of processing operations, such as connection and message exchange with a control bus 410, communication with the job control unit 402, and transfer of a log output of each filter to the log output unit 408.

The filter control unit 404 controls data conversion to be performed by the filter A 405, which functions as a first data conversion filter, the filter B 406, which functions as a second data conversion filter, and the filter C 407, which functions as a third data conversion filter. Intermediate data generated by the first data conversion filter performing data conversion is subjected to data conversion by the second data conversion filter, and intermediate data generated by the second data conversion filter performing data conversion is subjected to data conversion by the third data conversion filter. Data generated by the filter control unit 404 performing data conversion becomes image data for printing.

<Log Output Unit 408>

The log output unit 408 is a component that acquires a log transmitted from each component via a network and that accumulates the acquired logs. At least one log output unit 408 exists as a process on the control bus 410. Each component transmits log data to the log output unit 408 via the network, and the log output unit 408 outputs log data to a log file once a predetermined amount of log data has been accumulated. The log output unit 408 may successively output log data to a log file without accumulating log data.

The settings for an output path of the log file are specified by a configuration file passed to the log output unit 408 when the log output unit 408 is activated. While each component on the control bus 410 performs log output during execution of a job, if each component is associated with an individual log output unit, log files are separated by components, so that it becomes difficult to analyze logs. Hence, for the first exemplary embodiment, the log output unit 408 is configured to collectively output log data to a log file.

<Control Bus 410>

The control bus 410 is a communication channel between the above-mentioned components. The communication channel allows, for example, a query request, a response to the query request, a heartbeat, and a message, such as a status change notification of each component process, to flow.

The control bus 410 uses multicast communication. Each component process specifies the same address and port for multicast to participate in the control bus 410. When a component participating in the control bus 410 passes a message, the message is delivered to all the participating components.

<Outline of Data Conversion Processing>

The outline of data conversion processing according to the first exemplary embodiment is described next.

First, the job control unit 402, which has been requested, via the job processing reception unit 401, to execute a job, selects filters required for conversion based on "job type information" included in the job. Combinations of the required filters and their alignment sequences are held as, for example, a configuration file, by the job control unit 402.

FIG. 5 illustrates an example of a configuration file used to describe combinations of the required filters and their alignment sequences. An element 501 is an element used to describe job type information. The id attribute specifies the job type information. An element group 502 is an element used to describe a combination of filters and its alignment sequence. The name attribute is used to describe the type of a filter, and the version attribute is used to describe which version filter is to be used. The element group 502 specifies the alignment sequence of filters with the description order of elements. In the example of the element group 502, processing is performed in the order of Filter A, Filter B, and Filter C. The job control unit 402 searches for an element 501 that matches the job type information included in the job, and then employs a combination of filters and its alignment sequence described below the matching element 501.

The job control unit 402 may determine a combination of the required filters and its alignment sequence by analyzing print data instead of using the job type information. In such a case, the job control unit 402 reads out a predetermined size from the head of the print data and determines the type of the print data based on characteristic contents included in the read-out size.

For example, the job control unit 402 receives, as input data, data in the Joint Photographic Experts Group (JPEG) format or the Portable Document Format (PDF). Then, the job control unit 402 acquires a post-conversion print data format included in the job, and selects a group of filters required for conversion at the time of determination of both a pre-conversion print data format and the post-conversion print data format.

After selecting a plurality of filters required for conversion, the job control unit 402 acquires filter control units 404 into which the selected filters are loaded. In the example illustrated in FIG. 4, the filters required for conversion include the filter A 405, the filter B 406, and the filter C 407, which are respectively loaded into the filter control units 404.

The job control unit 402 creates a data transfer channel called a "pipeline 409" between the filter A 405, the filter B 406, and the filter C 407. For example, the TCP/IP is used as the protocol for the pipeline 409. The pipeline 409 transfers data only in one direction. The pipeline 409 is configured in such a way as to circulate in the order of the job control unit 402, the filter A 405, the filter B 406, the filter C 407, and the job control unit 402. Also, the job control unit 402 creates a pipeline 409 between the job processing reception unit 401 and the job control unit 402.

The thus-formed pipeline 409 enables print data from the job processing reception unit 401 to circulate among a plurality of components and, finally, to return to the job processing reception unit 401 after being completely converted. The above description is the outline of the data conversion processing 0622

<Data Conversion Processing Flow>

Next, a specific processing flow of the data conversion processing is described with reference to FIG. 6.

Figure 6:
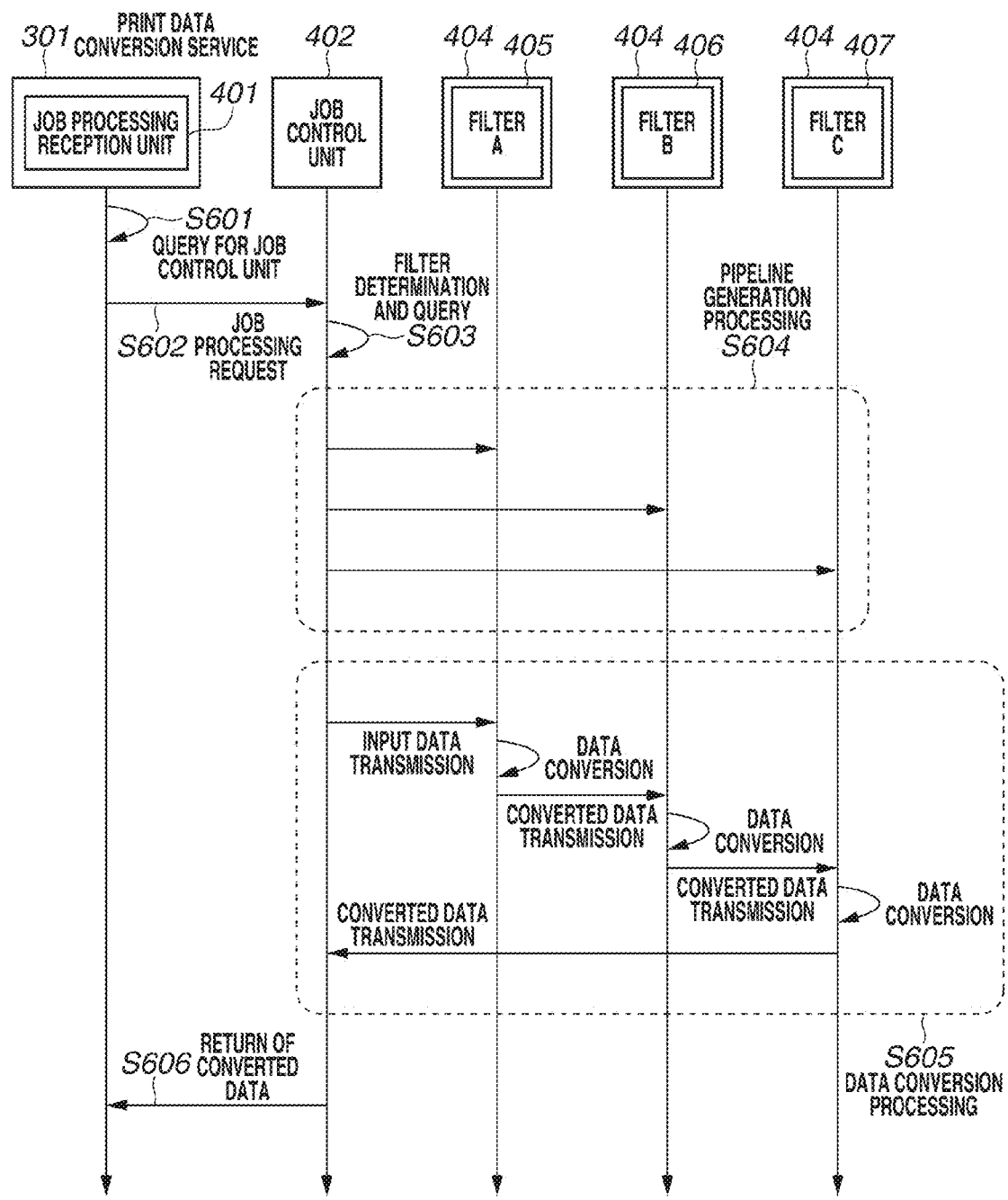
FIG. 6 is a sequence diagram illustrating the flow of processing by a filter and pipeline architecture according to the first exemplary embodiment.

FIG. 6 is a sequence diagram illustrating the outline of data conversion processing performed after the job processing reception unit 401 has received a job processing request from the print data conversion service 301.

In step S601, the job processing reception unit 401 makes a query request for the job control unit 402. The job processing reception unit 401 makes the query request to the process information management unit 403 to acquire the end point of the job control unit 402. The flow of processing for the query is described below with reference to FIGS. 7A, 7B, 7C, 7D, 7E, 7F, 7G, 7H, 7I, and 7J and FIG. 10.

In step S602, the job processing reception unit 401 makes a job processing request to the job control unit 402. Here, data of a job is passed from the job processing reception unit 401 to the job control unit 402. The data of a job is composed of target data (input data) to be converted and a data structure called a "ticket" obtained by bundling setting values for conversion processing into a coherent form, as previously mentioned. The input data in the first exemplary embodiment is, for example, document data created by an application for word processing or image data created by drawing software.

Passing of data may be performed via a path of data of the job or via a memory or interprocess communication.

In step S603, the job control unit 402 determines types of filters and their alignment sequences based on the contents of the job and makes a query request for the filters. The types of filters and their alignment sequences have already been described with reference to FIG. 5. The job control unit 402 makes, to the process information management unit 403, a query request for the filter control units 404 corresponding to the respective filters, and then acquires their respective end points. Here, a description is made supposing that the processing proceeds in the order of the filter A 405, the filter B 406, and the filter C 407. As illustrated in FIG. 4, the respective data conversion processing operations of the filter A 405, the filter B 406, and the filter C 407 are respectively performed by filter control units of different processes. The different processes being used for data conversion can prevent a failure of one data conversion filter from spreading to all the data conversion filters.

In step S604, which is pipeline generation processing, the job control unit 402 instructs the filter control units 404 to generate their respective pipelines. Each filter control unit 404 generates pipelines used for adjacent component processes. After completing the generation of pipelines, each filter control unit 404 notifies the job control unit 402 of the completion of generation of pipelines, and then waits for the job to come from the input pipeline for that filter control unit 404. Furthermore, when instructing each filter control unit 404 to generate its pipelines, the job control unit 402 also notifies each filter control unit 404 of the end point of a service interface of the job control unit 402. When an error occurs in a filter control unit 404, the filter control unit 404 notifies the job control unit 402 of the error via the service interface of the job control unit 402.

In step S605, which is data conversion processing, the job control unit 402 functions as an acquisition unit configured to acquire input data included in data of the job, and transmits the input data to a pipeline connected to the first-stage filer control unit 404. The filter A 405 (first data conversion filter) receives the data via the filter control unit 404 and performs data conversion processing with a first process. Then, the filter A 405 passes data (intermediate data), via the filter control unit 404, to a pipeline connected to the filter B 406 (second data conversion filter). Similarly, the filter B 406 and the filter C 407 also perform data conversion processing with a second process and a third process, respectively, different from the first process. Here, all the filters function as a conversion unit configured to perform data conversion. Finally, the filter C 407 transmits, to the job control unit 402 via the filter control unit 404, the generated converted data as image data for output. The image data for output is, for example, bitmap data available for printing with a printer or the like.

In step S606, the job control unit 402 returns the converted data to the job processing reception unit 401.

<Generation of Components>

Generation of components is described now. FIGS. 7A, 7B, 7C, 7D, 7E, 7F, 7G, 7H, 7I, and 7J illustrate sequences for generating components as processes.

Figure 7A:
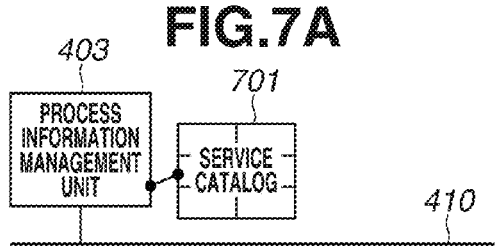
FIGS. 7A, 7B, 7C, 7D, 7E, 7F, 7G, 7H, 7I, and 7J are schematic diagrams each illustrating exchange of messages between components according to the first exemplary embodiment.

In a situation illustrated in FIG. 7A, only the process information management unit 403 exits. This situation corresponds to the one immediately after the server PC 106 is activated in FIG. 3. At this point of time, it is supposed that the print data conversion service 301 is not yet activated. Thus, the process information management unit 403 solely participates in the control bus 410.

The process information management unit 403 holds a service catalog 701. The service catalog 701 is a catalog composed of a list of components installed on the server PC 106. The service catalog 701 is stored, for example, as a file in the HDD 202 of the server PC 106, and is readable by the process information management unit 403. FIG. 8 is a conceptual diagram of the service catalog 701.

Referring to FIG. 8, an entry 801 in the service catalog 701 exists for every component.

Component name 802 indicates the component name of the target entry.

Version 803 of the service indicates the version of a component. Even a component having the same name, while having a different version, provides a different function, and is thus dealt with as a different entry on the service catalog 701.

Execution file path 804 indicates the execution file path of the component.

Configuration file path 805 indicates the path of a configuration file passed from the process information management unit 403 to the component when the component is activated as a process.

Termination condition 806 of the component indicates a condition under which the process of the component terminates. The condition is described with a time or the number of jobs. The process information management unit 403 passes the content of the termination condition 806 to the activated component process. The details of the termination condition 806 are described below with reference to FIG. 7J.

Activation mode 807 indicates whether to activate the component process on demand or to leave the component process in hot standby. If the activation mode 807 is "On demand", when a query for a component designating the component is issued, the component process is activated. Also, if the activation mode 807 is "Hot Standby", the component process is activated when the process information management unit 403 is activated.

Maximum number of activations 808 indicates up to what number of component processes can be activated. Activating a plurality of component processes of the same type enables, for example, a component process of the same type to receive a processing request even if another component process has crashed and is being activated again. In a case where the activation mode 807 is "Hot Standby" for a component, a number of component processes corresponding to the maximum number of activations 808 are activated when the process information management unit 403 is activated. Also, in a case where the activation mode 807 is "On demand" for a component, a process of the component is activated if the maximum number of activations 808 is not exceeded when the process information management unit 403 has received a query.

Figure 7F:
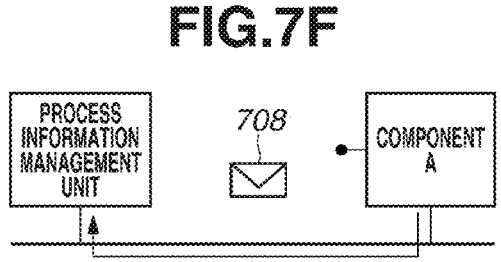
Figure 7B:
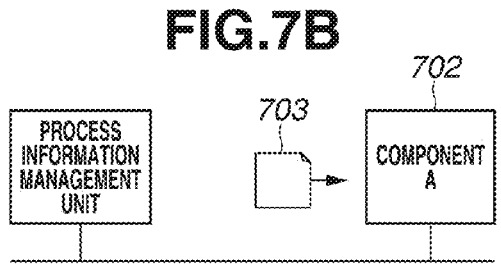

FIG. 7B illustrates an example case where the activation mode of a component A 702 is set to "Hot Standby". The process information management unit 403, after being activated, refers to the service catalog 701 and finds the component A 702, the activation mode of which is set to "Hot Standby". Then, the process information management unit 403 acquires the configuration file path 805 and the termination condition 806 from the service catalog 701, assigns them to the activation arguments, and activates the component A 702 as a process. A unique identification (ID) is assigned to the component A 702 when the component A 702 is activated and connected to the control bus 410. The ID includes, for example, a globally unique identifier (GUID). The component A 702 refers to a configuration file 703 based on the configuration file path 805, retrieves the required initial values, and activates itself using the initial values.

Figure 7G:
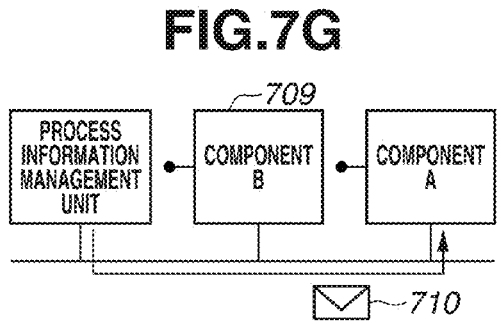
Figure 7C:
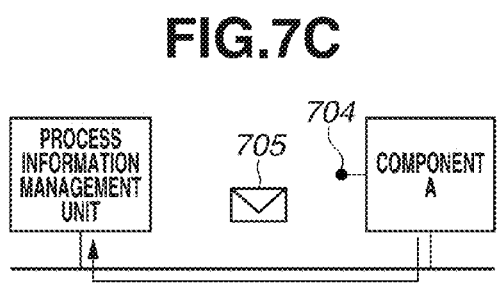

In a situation illustrated in FIG. 7C, to provide a service, the component A 702 acquires the port of the TCP/IP and starts standby of the service interface 704. The component A 702, thus having been ready to provide a service to another component, creates and transmits its own advertise message 705 to the control bus 410. On the advertise message 705, there are described the name, ID, and version of the component A 702 and the end point (address and port number) of the service interface 704. The advertise message 705 is transmitted to the process information management unit 403. The advertise message 705 is an action to declare the completion of activation of a component itself and the start of service providing. Upon receipt of the advertise message 705, the process information management unit 403 can confirm the activation of the component A 702 and acquire the end point of the service interface 704.

Figure 7H:
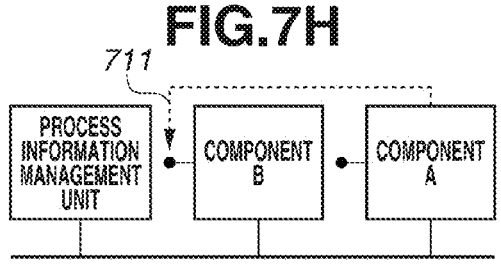
Figure 7D:
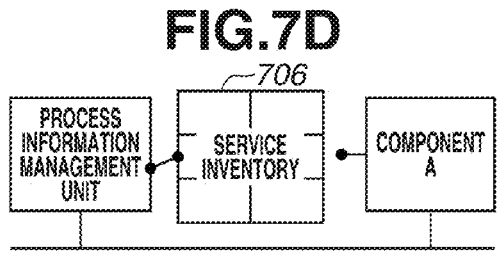

FIG. 7D illustrates a situation in which the process information management unit 403 receives the advertise message 705 from the component A 702 and registers the content of advertise message 705 with a service inventory 706, which is a management table, for subsequent management.

FIG. 9 schematically illustrates the content of the service inventory 706.

Referring to FIG. 9, the service inventory 706 includes an entry 901. Each entry 901 exists for every component process. At the time of receipt of the advertise message 705, the process information management unit 403 creates an entry of the component process, which is a transmission source of the advertise message 705, within the service inventory 706. Then, the process information management unit 403 writes the content of the advertise message 705 into the created entry. More specifically, the content of the advertise message 705 is written into an ID 902, a name 903, a version 904, and an end point 905.

On a lifetime 906, a lifetime (expressed by seconds) from the creation of a component process is recorded. This lifetime is generated based on the content of a heartbeat message 707, which is described below.

On a status 907, the process information management unit 403 records the status of the component process when receiving a state change message, which is described below. The status 907 can take such values as "idling", "busy", and "missing". The value "idling" is a status in which the component process can receive a processing request. The value "busy" is a status in which the component process cannot receive a processing request. The value "missing" is a status in which it is not clear whether the component process is running. Each component process is activated in the "idling" status. The "busy" status and the "missing" status are described below with reference to FIG. 7H and FIG. 7E, respectively.

On a last contact time 908, the process information management unit 403 records time of receipt of a message last received from the component process. In the first exemplary embodiment, system time obtained from the operating system is stored. In general, a plurality of component processes with the same name and the same version are generated. However, such component processes can be discriminated because at least the ID and the port number have respective different values in the entry 901 on the service inventory 706.

Figure 7I:
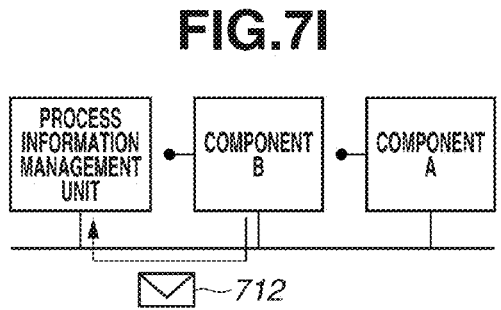
Figure 7E:
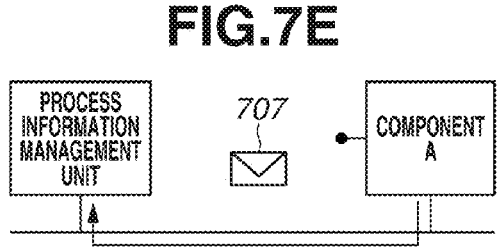

FIG. 7E illustrates a situation in which the process information management unit 403 receives a heartbeat message 707 from the component A 702. Each component is configured to periodically transmit the heartbeat message 707 to the process information management unit 403. Upon receipt of the heartbeat message 707, the process information management unit 403 confirms the living of a transmission-source component and updates the lifetime 906 and the last contact time 908 of the service inventory 706. If the heartbeat message 707 from a component is stuck for a predetermined time, the process information management unit 403 changes the status 907 of the component process to "missing". In this state, if the heartbeat message 707 is further stuck for a predetermined time, the component process is automatically deleted together with its entry from the service inventory 706. The component process deleted from the service inventory 706 can no longer be searched for in response to a query from another component, and thus becomes unable to provide its service. The deletion of an entry is performed based on the ID of a target component process and, therefore, does not affect the entry of another component process having the same name.

FIG. 7F illustrates a situation in which the component A 702, while intending to use a component B 709, transmits a query message 708 to the process information management unit 403. The query message 708 contains descriptions of the name of the component B 709 and its version to be used. A plurality of versions can be produced with respect to a certain component. In other words, a plurality of components with same name but having respective different functions can be produced and released as different versions in the market. Accordingly, the component A 702 can specify a version of the component B 709, which the component A 702 desires to use, as "2.0.0.1" to make a query. If it is not necessary to specify any particular version, the component A 702 can specify the version field in blank. At the time of the situation illustrated in FIG. 7F, since the component B 709 is not yet generated, the process information management unit 403 generates the component B 709 as a new component. The component B 709 is generated in a generation procedure similar to that of the component A 702 illustrated in FIGS. 7B to 7D. The details of processing for a query by the process information management unit 403 are described below with reference to FIG. 10.

FIG. 7G illustrates a situation in which the process information management unit 403 returns, to the component A 702, a response to the query as a query response message 710. The query response message 710 contains descriptions of the name and version of the component B 709 and an end point indicating its service interface.

FIG. 7H illustrates a situation in which the component A 702, having received the query response message 710, uses the acquired service interface 711 of the component B 709. Some components can simultaneously deal with a service request from another service accessing the service interface, and some components cannot do so. For example, the log output unit 408 has the ability to receive logging data from a plurality of services simultaneously in parallel and record the logging data in a log file. On the other hand, filters that constitute pipelines and convert a job has no ability to perform simultaneous and parallel processing. Accordingly, if the component B 709 is a component having no simultaneous and parallel processing ability, the component B 709 transitions to a state in which the component B 709 cannot receive a request from another component, i.e., the busy status, at the time of access from the component A 702. This status continues until the component A 702 declares explicit access termination to the component B 709 via the service interface. The component B 709, after transitioning to the busy status, transmits a state change message 712 to the process information management unit 403, as illustrated in FIG. 7I, so as to prevent the component B 709 itself from being detected via a query. The state change message 712 contains a message indicating that the component B 709 has transitioned to the busy status. The process information management unit 403, having received the state change message 712, searches the entry of the component B 709 in the service inventory 706 and changes the status 907 in the service inventory 706 to the "busy" status. Furthermore, the process information management unit 403 also updates the last contact time 908. Since the status 907 of the component B 709 has been changed to the "busy" status, after that, the process information management unit 403 does not select the process of the component B 709 even when receiving a query specifying the name thereof. However, a plurality of processes of another component B may exist in the service inventory 706. Unless any one of the plurality of processes is in the busy status, that component is returned as a "usable component B" to a component that has issued the query. With regard to which process is to be selected from among a group of component processes having the same name and the same version, for example, a process found for the first time can be returned. Alternatively, the number of times of return to components that issued queries may be counted for every component process, and a process having the least counted value may be returned.

Figure 7J:
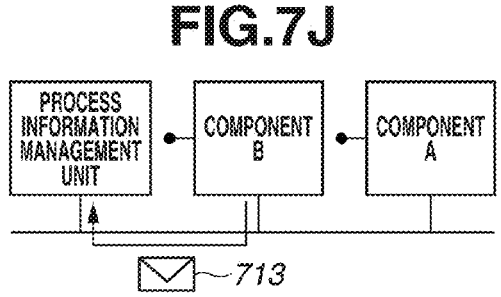

FIG. 7J illustrates a situation in which the component B 709, having met the termination condition 806, transmits a Goodbye message 713 to the process information management unit 403 immediately before the component B 709 itself terminates. The process information management unit 403, having received the Goodbye message 713, deletes the entry of the component B 709 in the service inventory 706.

Each component periodically checks whether it has met the termination condition 806. The termination condition 806 is specified with a time or the number of jobs, and is used to terminate a process if the process has been activated for the time specified in the termination condition 806 or more, or if a number of jobs equal to or greater than the number of jobs specified in the termination condition 806 have been processed. The job control unit 402 or the filter control unit 404 specifies a finite time or a finite number of jobs as the termination condition 806 so as to periodically perform refresh. The log output unit 408, which is resident to receive a log output request, thus specifies an infinite (or a very great value of) time as the termination condition 806. The log output unit 408 does not process jobs and, therefore, does not specify the number of jobs as the termination condition 806.

<Details of Processing of Query>

Figure 10:
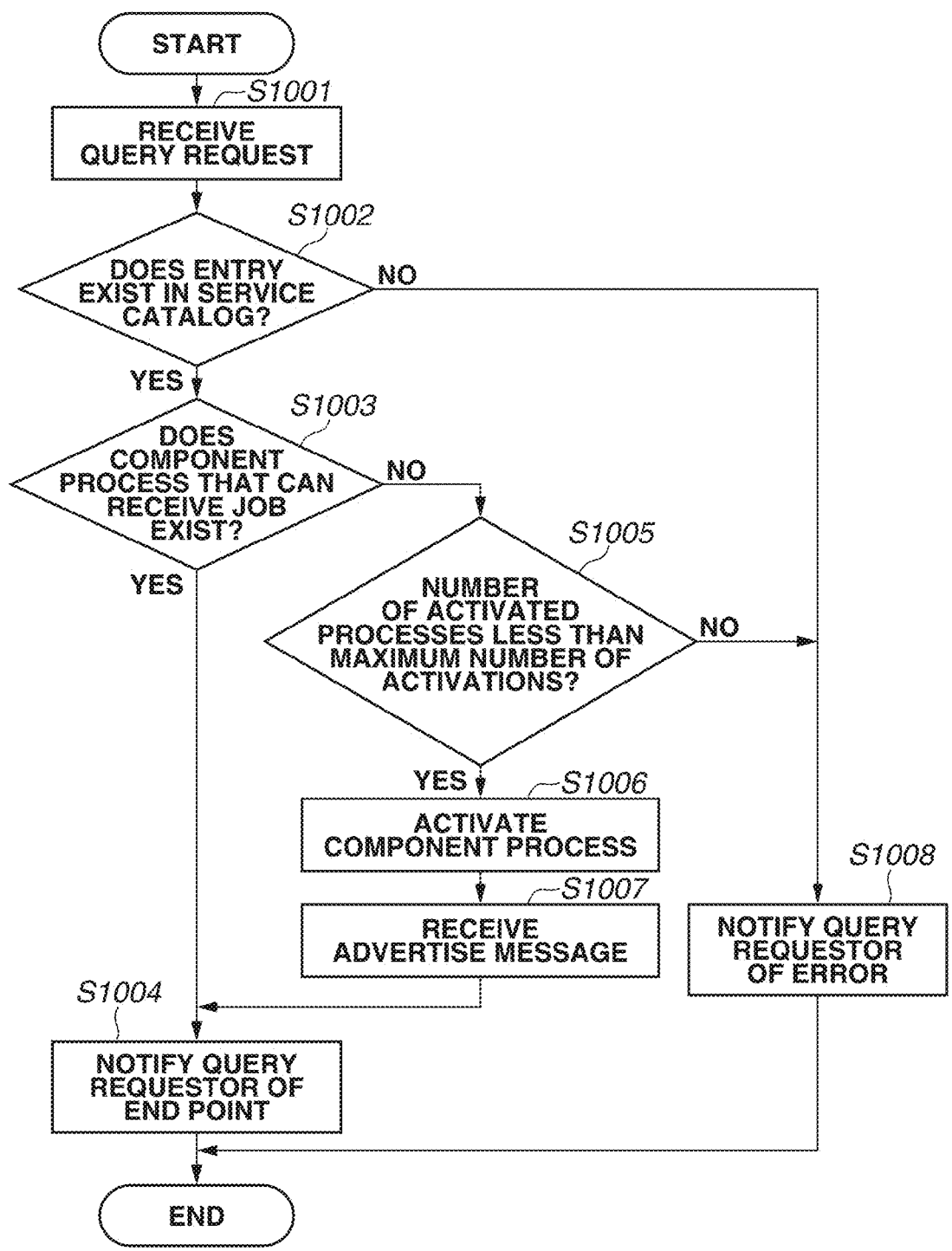
FIG. 10 is a flowchart illustrating the flow of processing of a query according to the first exemplary embodiment.

FIG. 10 is a flowchart illustrating the details of processing of a query.

In step S1001, the process information management unit 403 receives a query request from another component. The query includes the name of a component and a version thereof to be used.

In step S1002, the process information management unit 403 searches the service catalog 701 and determines whether an entry 801 corresponding to the component name and version received in step S1001 exists. If the entry 801 exists (YES in step S1002), the processing proceeds to step S1003. If the entry 801 does not exist (NO in step S1002), the processing proceeds to step S1008.

In step S1003, the process information management unit 403 determines whether a component process that can receive a job exists. The process information management unit 403 searches the service inventory 706 and searches for an entry 901 corresponding to the component name and version received in step S1001. Then, the process information management unit 403 determines whether one or more component processes with the status 907 being "idling" exist. If one or more component processes with the status 907 being "idling" exist (YES in step S1003), the processing proceeds to step S1004. If no component process with the status 907 being "idling" exists (NO in step S1003), the processing proceeds to step S1005. In step S1004, the process information management unit 403 selects one of the component processes found in step S1003 and notifies a query requestor of the end point of the selected component process. The process selection method includes, for example, returning a component process found for the first time. Alternatively, the process selection method may include, for example, storing, in the service inventory 706, information indicating how many times the end point was returned to the query requestor and returning a component process in which the end point thereof was returned the least number of times.

Thus, in step S1004, the process information management unit 403 notifies the query requestor of the end point of the component process for which the query request has been made.

In step S1005, the process information management unit 403 determines whether the number of activated processes of the component for which the query request has been made is less than the maximum number of activations recorded in the service catalog 701. If the number of activated processes is less than the maximum number of activations (YES in step S1005), the processing proceeds to step S1006. Otherwise (NO in step S1005), the processing proceeds to step S1008.

In step S1006, the process information management unit 403 activates, as a process, the component for which the query request has been made.

In step S1007, the process information management unit 403 receives the advertise message 705 from the component process activated in step S1006. After step S1007, the processing proceeds to step S1004, in which the process information management unit 403 notifies the query requestor of the component process activated in step S1006. Although not illustrated in FIG. 10, if the advertise message 705 does not arrive at the process information management unit 403 within a predetermined time, the process information management unit 403 may determine that an error has occurred, so that the processing may proceed to step S1008.

In step S1008, the process information management unit 403 notifies the query requestor of an error.

<Event of Crash>

Figure 11:
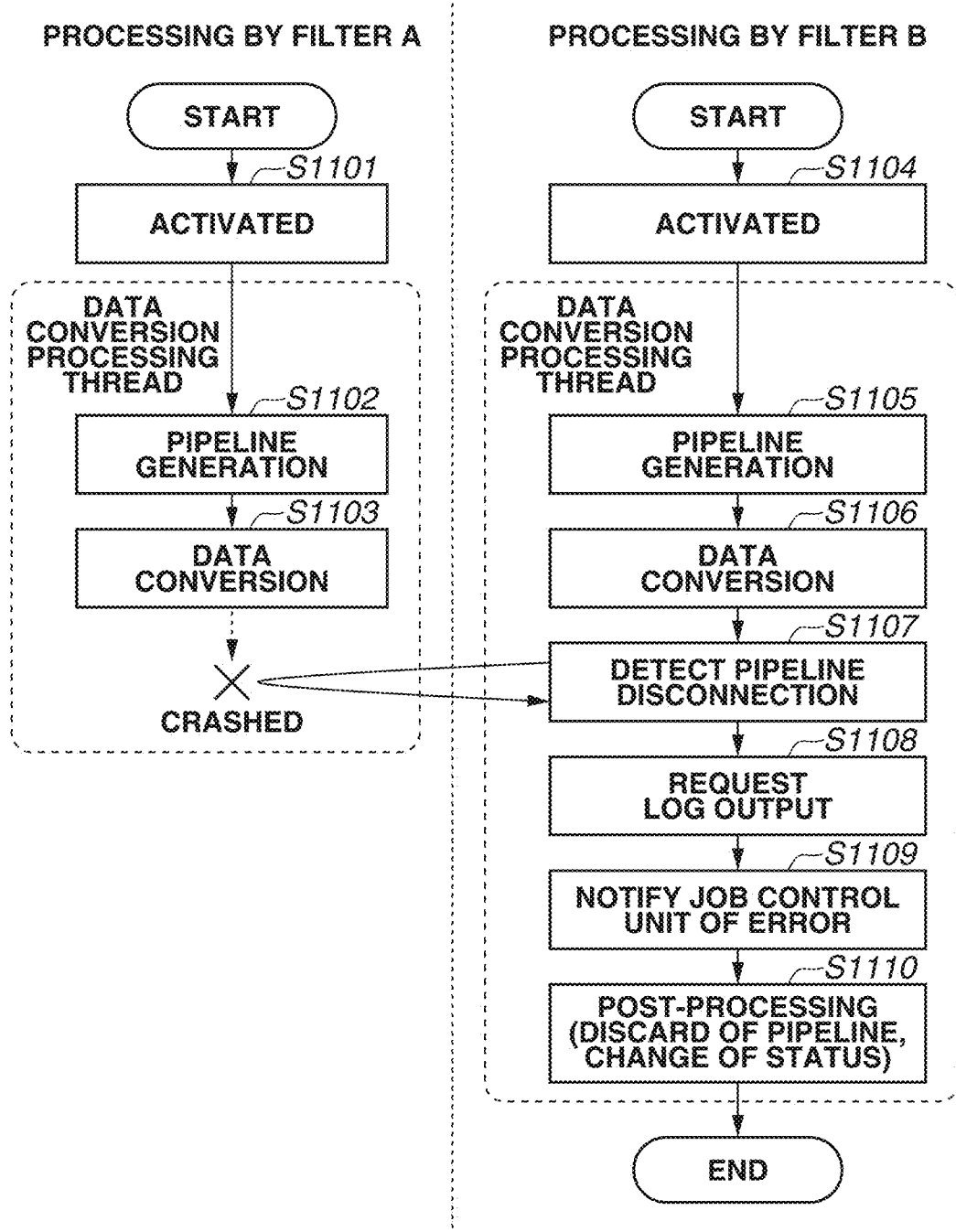
FIG. 11 illustrates the flow of processing in a case where a filter has crashed according to the first exemplary embodiment.

FIG. 11 illustrates the flow of processing in the event of a crash in a case where the filter A and the filter B jointly perform data conversion processing. Here, it is supposed that a pipeline is connected between the filter A and the filter B and the filter B receives a processing result from the filter A.

In step S1101, the filter A is activated.

In step S1102, the filter A performs pipeline generation. The filter A performs pipeline generation upon receipt of a request from the job control unit 402. Step S1102 corresponds to step S604 illustrated in FIG. 6.

In step S1103, the filter A performs, in a data conversion processing thread, data conversion on a job. Step S1103 corresponds to step S605 illustrated in FIG. 6. In the case of FIG. 11, the filter A crashes during the data conversion processing.

In step S1104, the filter B is activated.

In step S1105, the filter B performs pipeline generation. As described above in step S604 illustrated in FIG. 6, here, the filter B receives the end point of the service interface of the job control unit 402.

In step S1106, the filter B performs data conversion. The filter B waits for data to be transmitted from the pipeline.

In step S1107, the filter B detects disconnection of the pipeline of the filter A. More specifically, the filter A and the filter B periodically exchange a packet for living confirmation and detect that the packet has ceased based on time out.

In step S1108, the filter B requests the log output unit 408 to output a log message indicating the pipeline disconnection. The log output unit 408 receives this message and writes information indicative of the pipeline disconnection to the log file.

In step S1109, the filter B notifies the job control unit 402 of an error. In the event of an error notification, the filter B notifies the job control unit 402 via the end point of the service interface of the job control unit 402 of an error.

In step S1110, the filter B performs post-processing. More specifically, the filter B discards the pipeline or notifies the process information management unit 403 of a change to the "idling" status. The process information management unit 403 receives such a change notification and changes the status 907 of the target component process to "idling".

As described above, even if the filter A has crashed, the other components (the filter B, the job control unit 402, and the process information management unit 403) do not crash, and a message indicating the disconnection of the pipeline can be left in the log file.

<Event of Hang-Up>

Figure 12:
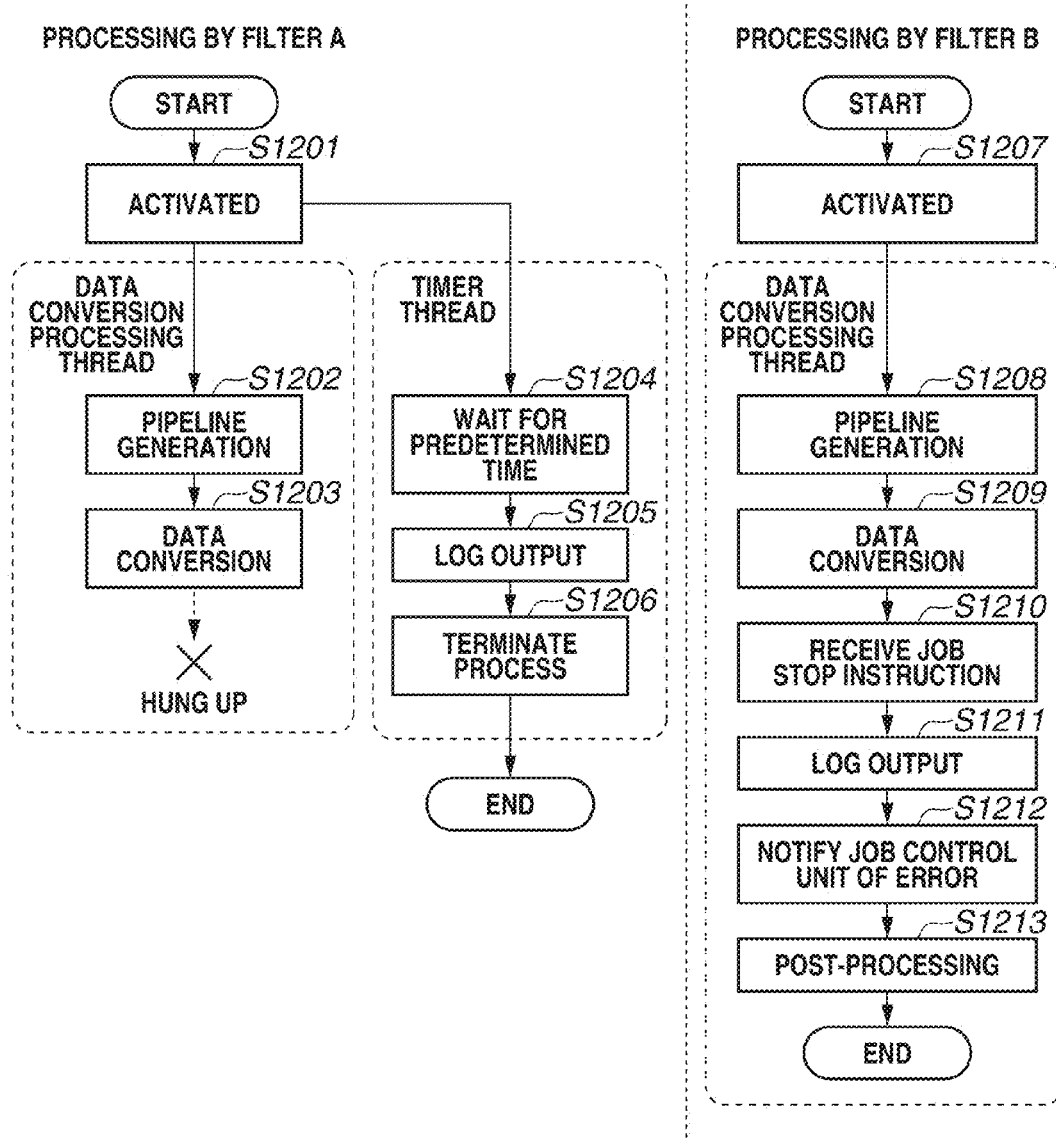
FIG. 12 illustrates the flow of processing in a case where the filter has hung up according to the first exemplary embodiment.

FIG. 12 illustrates the flow of processing in a case where a hang-up has occurred in a filter. Like FIG. 11, it is supposed that a pipeline is connected between the filter A and the filter B and the filter B receives a processing result from the filter A.

In step S1201, the filter A is activated. Here, the termination condition 806 is passed from the process information management unit 403 to the filter A.

In step S1202, the filter A performs, in a data conversion processing thread, pipeline generation.

In step S1203, the filter A performs data conversion on a job. It is supposed that the filter A has hung up in the middle of this step.

In step S1204, the filter A waits for the time specified in the termination condition 806 received in step S1201. In the case of FIG. 12, since it is supposed that the data conversion processing by the filter A has hung up, the time specified in the termination condition 806 has elapsed while the data conversion processing thread has not yet been completed, so that the processing proceeds to step S1205. If the data conversion processing thread has already been completed, the filter A performs the necessary post-processing and then terminates the process.

In step S1205, the filter A requests the log output unit 408 to output a log message indicating that the filter A has hung up.

In step S1206, the filter A forcibly terminates the process.

In step S1207, the filter B is activated.

In step S1208, the filter B performs, in a data conversion processing thread, pipeline generation.

In step S1209, the filter B performs data conversion. The filter B waits for data to be transmitted from the pipeline.

In step S1210, the filter B receives a job stop instruction. The job control unit 402 has a timer and transmits a job stop instruction to each filter control unit 404 if it takes a predetermined time or more to process the job. Upon receipt of the job stop instruction, the filter B terminates job processing.

In step S1211, the filter B requests the log output unit 408 to output a log message indicating that the job has been stopped in response to the job stop instruction.

In step S1212, the filter B notifies the job control unit 402 of an error.

In step S1213, the filter B performs post-processing.

As described above, even if the filter A has hung up, The other components do not hang up, and information indicating that the filter A has hung up or information indicating that the filter B has stopped processing the job can be left in the log file.

Figure 13:
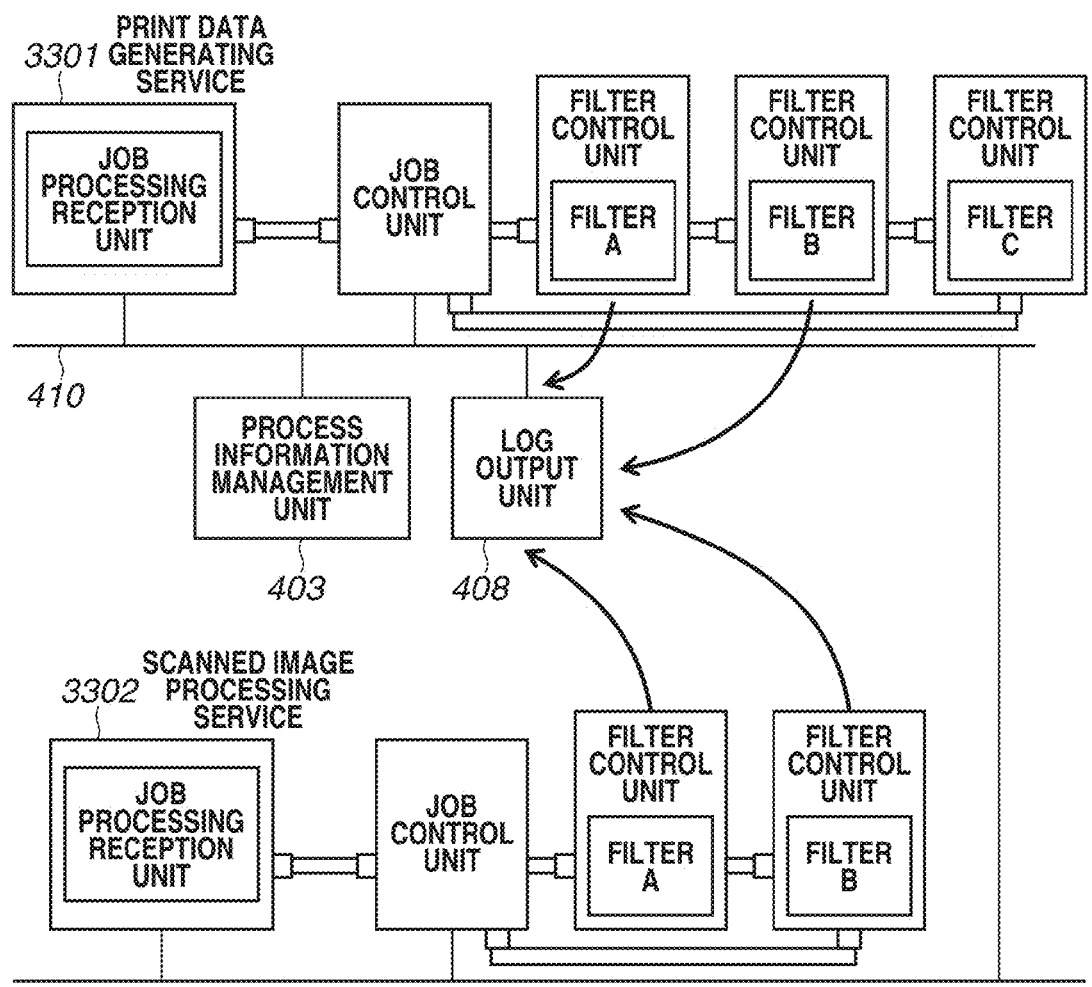
FIG. 13 is a configuration diagram in a case where a log output unit is shared by two groups according to a second exemplary embodiment.

The system described in the first exemplary embodiment is configured to output logs requested from the respective components to a single file. However, a case may also be considered where, as illustrated in FIG. 13, a plurality of user systems exist on a single PC. For example, a case is considered where both a user system for print data generation and a user system for scanned image processing exist. In the following description, a group of components associated with each user system is referred to as a "group". FIG. 13 illustrates a relationship between components in a case where two user systems exist on a single PC.

A print data generating service 3301 and a scanned image processing service 3302 exist on a single PC. As illustrated in FIG. 13, generally, the process information management unit 403 and the log output unit 408 are shared by such two groups. Also, all component processes are connected to a common control bus 410.

In this case, when component processes belonging to each group output logs to the single log output unit 408, logs of components of all the groups are output to a single log file. Such a case may result in a decrease in readability of logs. Also, if the log output unit 408 has crashed, logs cannot be left for both groups.

<Relationship between Components for Every Group>

Figure 14:
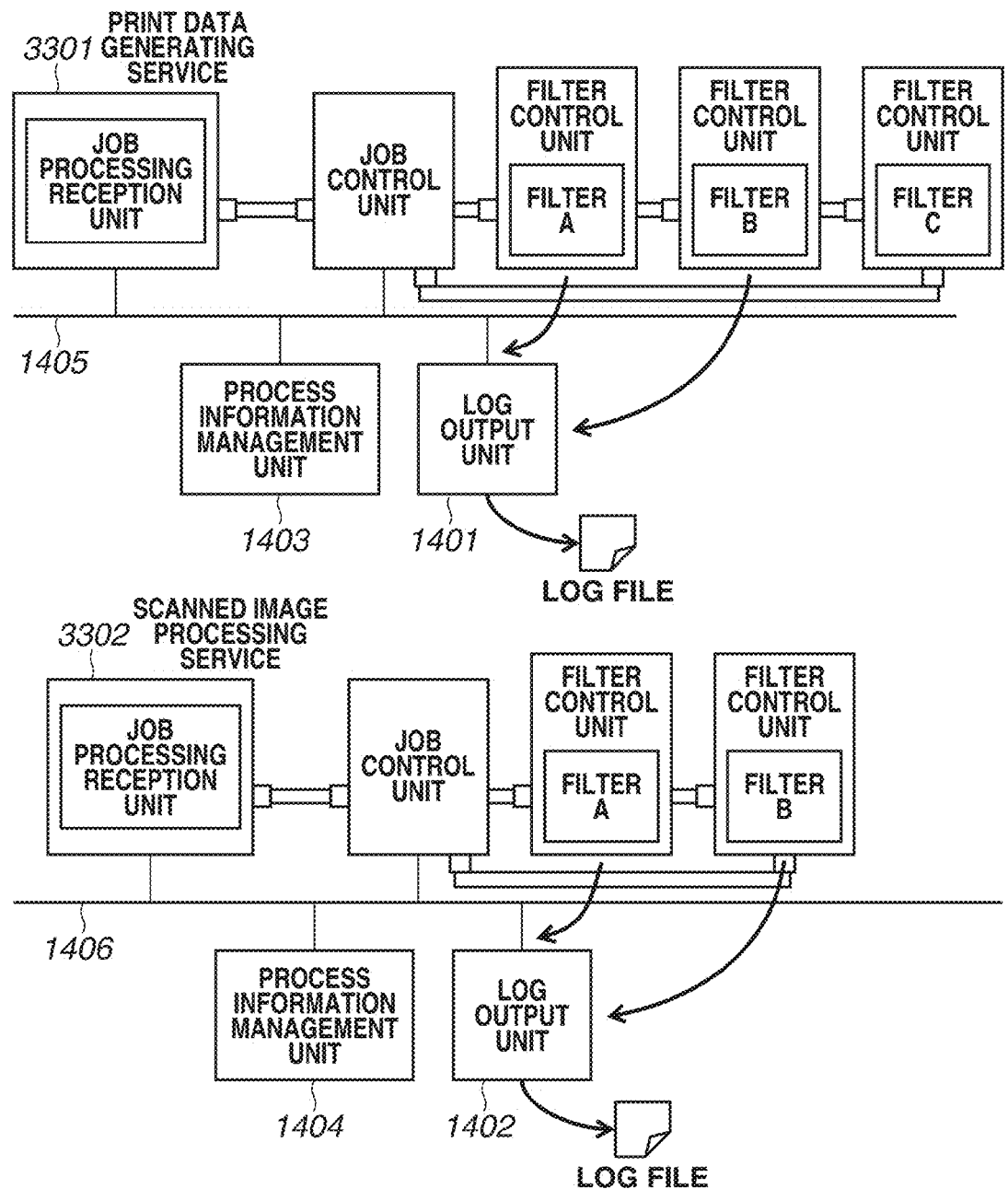
FIG. 14 is a configuration diagram in a case where log output units are allocated to respective groups according to the second exemplary embodiment.

To address this issue, a second exemplary embodiment provides a scheme to prepare a log output unit 408 for every group as illustrated in FIG. 14. More specifically, the second exemplary embodiment performs processing for allotting, exclusively for every process, a connection address and a port used to connect to a control bus in making a query.

Although not illustrated in FIG. 14, there exists a group setting unit configured to group a plurality of processes for every service. The group setting unit groups processes included in each of the print data generating service 3301 and the scanned image processing service 3302. A group of processes obtained by the group setting unit is exclusively controlled independently of the other groups.

FIG. 14 illustrates a relationship between components for every group according to the second exemplary embodiment.

The print data generating service 3301 is provided with a log output unit 1401, a process information management unit 1403, and a control bus 1405. Also, the scanned image processing service 3302 is provided with a log output unit 1402, a process information management unit 1404, and a control bus 1406.

Processing for configuring component process groups illustrated in FIG. 14 is described now.

<Processing for Allotting, to Job Processing Reception Unit, Connection Address and Port Used to Connect to Control Bus>

Figure 15:
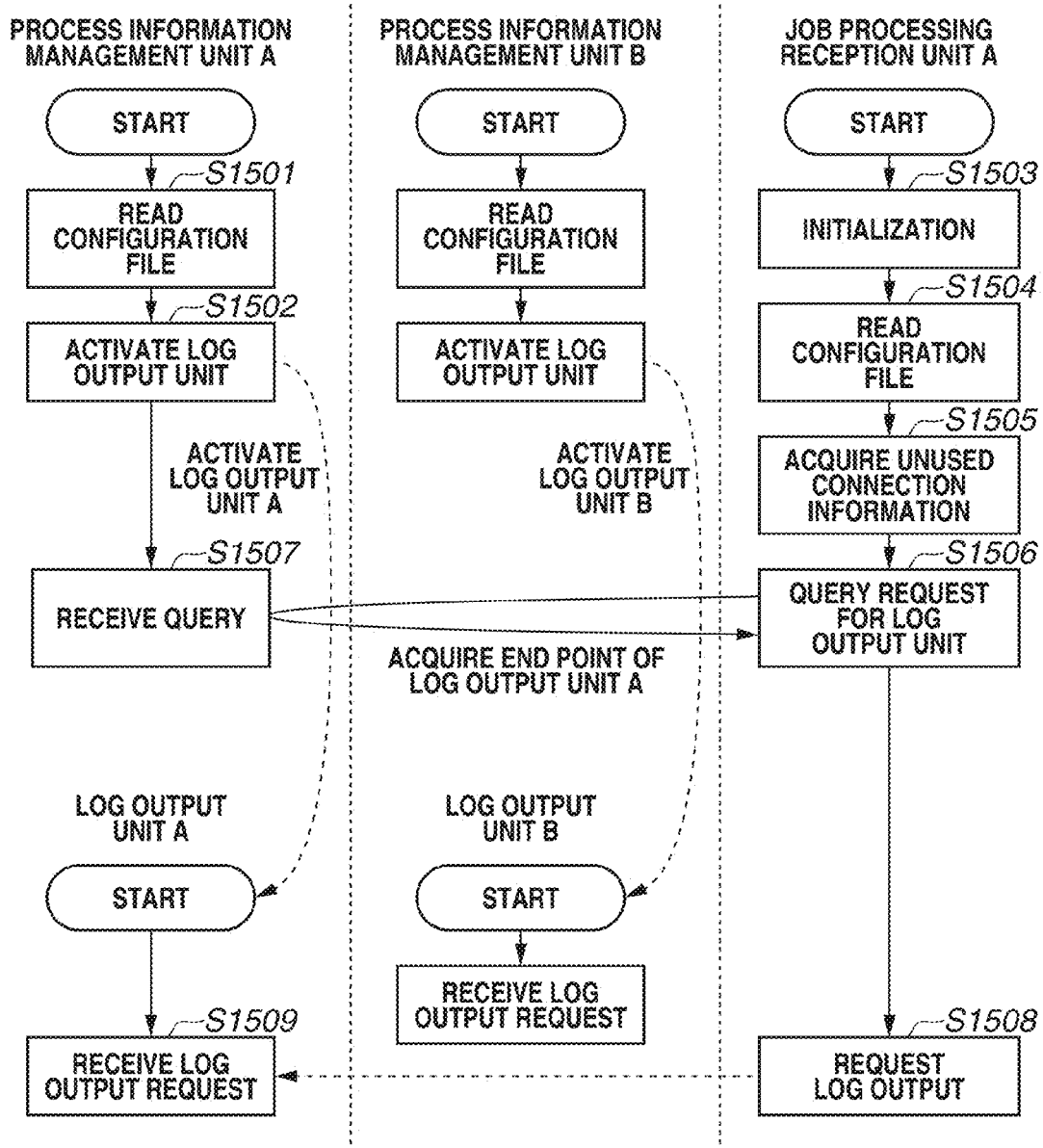
FIG. 15 illustrates the flow of processing for allocating connection information according to the second exemplary embodiment.

FIG. 15 illustrates processing for allotting, to a job processing reception unit, connection information (address and port) used to connect to a control bus.

In the second exemplary embodiment, it is necessary to activate in advance processes of process information management units that are equal in number to the number of processes of a job processing reception unit scheduled to be activated. In the second exemplary embodiment, since it is supposed that two job processing reception units are activated, two processes of process information management units are activated.

In the second exemplary embodiment, the components are divided into a group A and a group B, and "A" and "B" are suffixed to components belonging to the respective groups A and B. Referring to FIG. 15, two process information management units belonging to the respective groups A and B are referred to as a "process information management unit A" and a "process information management unit B", respectively. It is necessary to load, onto the respective process information management units, a configuration file having, written therein, connection information used to connect to the control bus.

FIGS. 16A and 16B illustrate configuration files to be read by the process information management unit A and the process information management unit B, respectively. Referring to FIGS. 16A and 16B, each of connection information 1601 and connection information 1602 is connection information used to connect to the control bus. Here, the process information management unit A connects to the control bus via the address "225.0.0.0" and the port "54567", and the process information management unit B connects to the control bus via the address "225.0.0.0" and the port "54569".

In the first exemplary embodiment, as mentioned in the foregoing, it is necessary to set the process information management unit 403 on the OS such that the process information management unit 403 is activated by the OS. In the second exemplary embodiment, different configuration files are set to be read by the respective processes of process information management units.

Referring to FIG. 15, in step S1501, the process information management unit A, when being activated, reads a configuration file illustrated in FIG. 16A. The process information management unit A stores, into the RAM 204, the read connection information used to connect to the control bus. The process information management unit B also reads a configuration file illustrated in FIG. 16B.

In step S1502, the process information management unit A activates a process of a log output unit. This process is referred to as a "log output unit A". Here, it is supposed that the log output unit is activated in hot standby. Similarly, the process information management unit B activates a process of a log output unit. This process is referred to as a "log output unit B".

In step S1503, one of processes of job processing reception units, when being activated, is initialized. This process is referred to as a "job processing reception unit A" in FIG. 15.

In step S1504, the job processing reception unit A reads a configuration file illustrated in FIG. 16C. FIG. 16C illustrates a configuration file to be read by a process of a job processing reception unit. This configuration file contains connection information usable to connect to the control bus. In the second exemplary embodiment, since it is supposed that two processes of job processing reception units start up, two pieces of connection information are contained as connection information 1603 and connection information 1604.

In step S1505, the job processing reception unit A acquires unused connection information based on the content of the configuration file illustrated in FIG. 16C. The job processing reception unit A checks the connection information 1603 and the connection information 1604 in order from the top to determine whether each of the connection information 1603 and the connection information 1604 is unused by a process of any other job processing reception unit. More specifically, for example, in a case where a mutex is provided as a function of the OS, the job processing reception unit A uses pieces of connection information in order from the top to try to create a mutex object based on a character string generated from target connection information. If the job processing reception unit A was able to create the mutex object, the target connection information is unused by a process of any other job processing reception unit. Accordingly, the job processing reception unit A stores the target connection information into the RAM 204. If the job processing reception unit A was not able to create the mutex object, the job processing reception unit A tries to create a mutex object for next connection information. If the job processing reception unit A was not able to create a mutex object for all pieces of connection information, the job processing reception unit A returns an error message to a user system that uses the job processing reception unit A. It is supposed that, in step S1505, the job processing reception unit A has stored the connection information 1603, i.e., address "225.0.0.0", port "54567".

A character string used to create a mutex object can be compliant with a common rule between processes of job processing reception units, and may be generated as, for example, "JobReceiver_(address)_(port number)".

In step S1506, the job processing reception unit A connects to the control bus using the connection information 1603 and makes a query request for a log output unit. The query request arrives at only the process information management unit A, which uses the same connection information. In step S1507, the process information management unit A receives the query and then returns, to the job processing reception unit A, the end point of the log output unit A, which the process information management unit A itself manages. The job processing reception unit A acquires and stores the end point of the log output unit A.

In step S1508, the job processing reception unit A makes a log output request to the log output unit A. Here, for example, the job processing reception unit A requests the log output unit A to transmit a message indicating the completion of initialization. In step S1509, the log output unit A receives the log output request and writes the message into the log file.

As described above, since the connection information used to connect to the control bus is allotted to the job processing reception unit A, the process information management unit A and the log output unit A, which use the same connection, become available. In a case where a process of another job processing reception unit is activated, in step S1505, the connection information 1604, which is different from that for the job processing reception unit A, is allotted, so that the process information management unit B and the log output unit B become available.

<Flow of Processing for Allotting, to Job Control Unit A, Connection Information Used to Connect to Control Bus>

Figure 17:
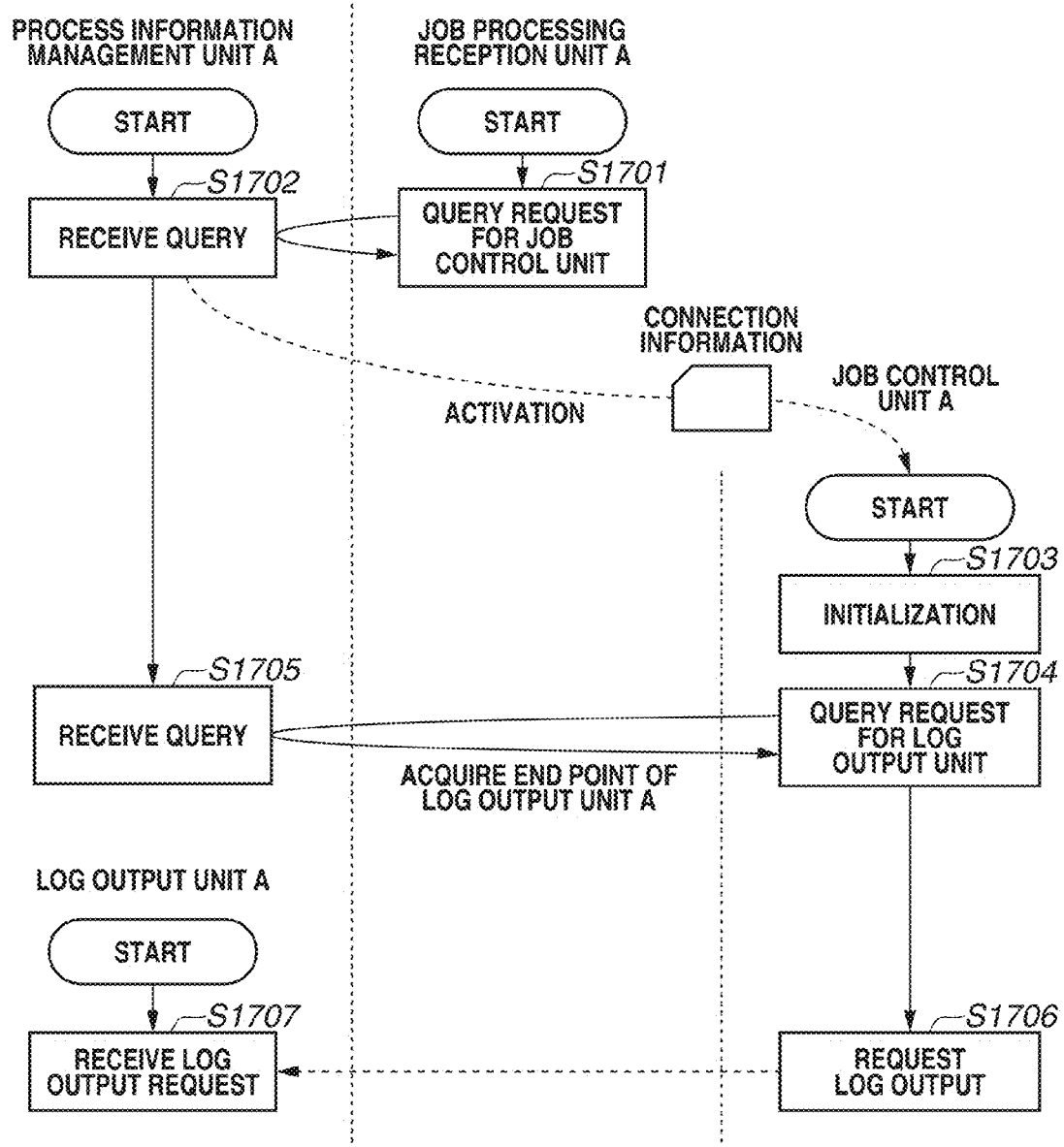
FIG. 17 illustrates the flow of processing for allocating connection information to a job control unit according to the second exemplary embodiment.

Next, the flow of processing for allotting, to the job control unit A, connection information used to connect to the control bus is described with reference to FIG. 17. FIG. 17 illustrates the flow of processing following that illustrated in FIG. 15.

In step S1701, upon receipt of a job from the user system, the job processing reception unit A, makes a query request for the job control unit A. In step S1702, the process information management unit A receives the query request and activates a process of the job control unit A.

At this time, as an activation option, the process information management unit A passes, to the job control unit A, connection information 1601 used to connect to the control bus, which is held in the process information management unit A.

In step S1703, the job control unit A is activated to perform initialization.

In step S1704, the job control unit A connects to the control bus using the connection information 1601 and makes a query request for the log output unit A. This query request arrives at only the job processing reception unit A, which uses the same connection information as the connection information 1601. In step S1705, the process information management unit A receives the query, and then returns, to the job control unit A, the end point of the log output unit A, which is managed by the process information management unit A. The job control unit A acquires and stores the end point of the log output unit A.

In step S1706, the job control unit A makes a log output request to the log output unit A. Here, for example, the job control unit A requests the log output unit A to transmit a message indicating that the reception of a job has become possible. In step S1707, the log output unit A receives the log output request and writes the message to the log file.

While, here, a method for allotting, to the job control unit A, connection information used to connect to the control bus has been described, the same method can also be used to allot connection information when the job control unit A make a query for a process of the filter control unit A.

In the above-described way, connection information used to connect to a common control bus can be allotted to the job control unit A, which is used by the job processing reception unit A, and the filter control unit A, which is used by the job control unit A.

As a result, the components belonging to the group A can use a process of the common log output unit A.

A third exemplary embodiment also provides a method for allotting a log output unit for every group as with the second exemplary embodiment.

In the above-described second exemplary embodiment, it is necessary to set the OS in such a manner that processes of the same number of process information management units as the number of processes of job processing reception units scheduled to be activated are activated in advance. Therefore, if the number of user systems has become greater than supposed, it is necessary to perform settings again. Also, it is necessary to modify the contents of the configuration files illustrated in FIGS. 16A, 16B, and 16C.

Figure 18:
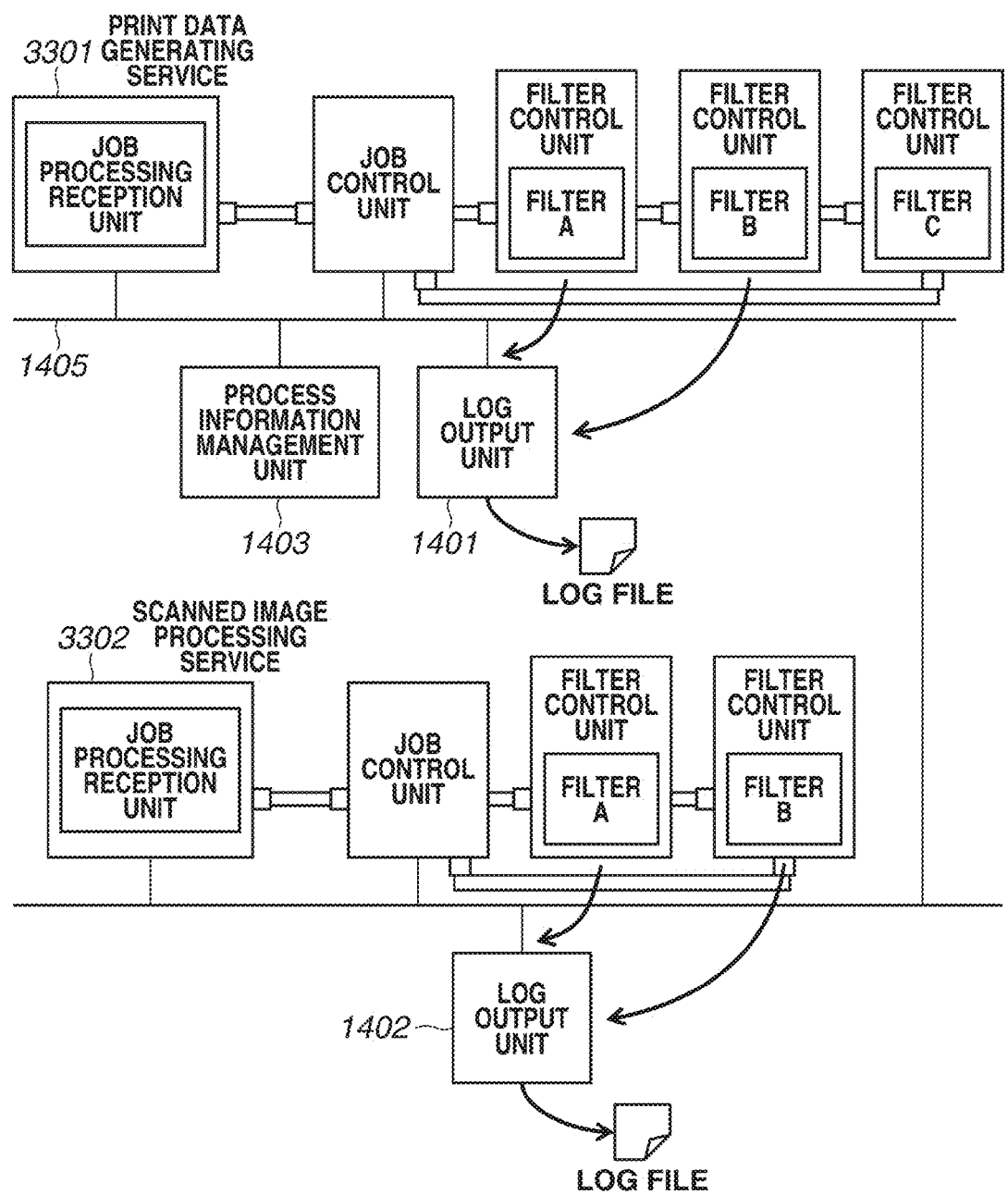
FIG. 18 is a configuration diagram in a case where log output units are allocated to respective groups according to a third exemplary embodiment.

The third exemplary embodiment provides a method for activating only a single process information management unit 1403 and allowing the process information management unit 1403 to manage groups, as illustrated in FIG. 18. FIG. 18 illustrates a configuration of components in a case where groups are managed by the process information management unit 1403. A common control bus 1405 is also used to manage the groups.

<Flow of Group Generation>

Figure 19:
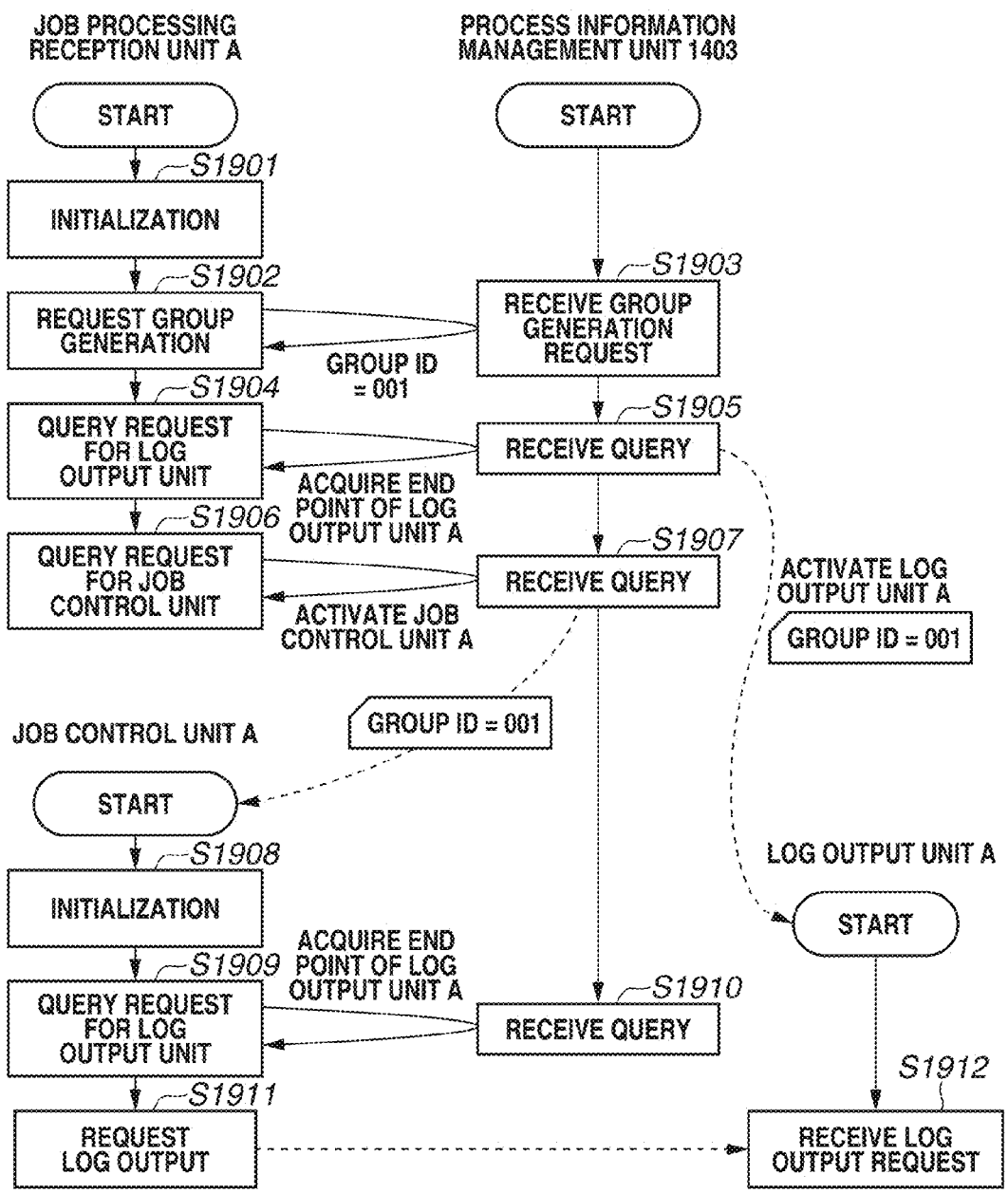
FIG. 19 illustrates the flow of processing for group generation according to the third exemplary embodiment.

FIG. 19 illustrates the flow of group generation.

Here, a description starts with a state in which a process of the process information management unit 1403 has been activated in advance and the print data generating service 3301 has loaded the job processing reception unit 401. Also in the third exemplary embodiment, as in the second exemplary embodiment, a process with which the job processing reception unit runs is referred to as a "job processing reception unit A".

In step S1901, the job processing reception unit A performs initialization.

In step S1902, the job processing reception unit A makes a group generation request to the process information management unit 1403. In step S1903, the process information management unit 1403 receives the group generation request, and then generates a group ID, stores the group ID into the RAM 204, and notifies the job processing reception unit A of the group ID. Here, the process information management unit 1403 functions as a group setting unit configured to set groups. Like the second exemplary embodiment, the grouped processes are exclusively controlled independently of other groups.

A unique character string, such as a globally unique identifier (GUID), is used as the group ID. However, here, it is supposed that a group ID of "001" is generated for descriptive purposes. Also, in the following description, the value "001" of the group ID is referred to as "group ID: 001". The job processing reception unit A stores the group ID, for example, in a list form on the RAM 204.

In step S1904, the job processing reception unit A makes a query request for the log output unit A. At this time, the job processing reception unit A specifies "001" as the group ID to make the query request. In step S1905, the process information management unit 1403 receives the query request. The process information management unit 1403 checks whether there is an activated component process belonging to the group ID specified by the job processing reception unit A. In the third exemplary embodiment, a group ID of each component process is recorded in the service inventory 706 illustrated in FIG. 9. The process information management unit 1403 searches the service inventory 706. If there exists a process in the "idling" status belonging to the specified Group ID, the process information management unit 1403 returns the end point of that process to the job processing reception unit A. If such a process does not exist, the process information management unit 1403 activates, as a process, a component for which the query request has been made. In the third exemplary embodiment, since a case is supposed where a process of the log output unit A in the "idling" status belonging to the specified Group ID does not exist, the process information management unit 1403 activates the log output unit A as a process. This process is referred to as the "log output unit A". When activating the log output unit A, the process information management unit 1403 passes the "group ID: 001" as an activation option to the log output unit A. Upon receipt of the advertise message 705 from the activated log output unit A, the process information management unit 1403 creates an entry corresponding the service inventory 706, and records, in the entry, information indicating that the log output unit A belongs to the group ID: 001.

Furthermore, also in the third exemplary embodiment, the maximum number of activations 808 can be set for every component, as in the first exemplary embodiment. In such a case, the maximum number of activations may be set for every group.

In step S1906, the job processing reception unit A makes a query request for the job control unit A. At this time, the job processing reception unit A specifies "001" as the group ID to make the query request. In step S1907, the process information management unit 1403 receives the query request. The processing following the receipt of the query request is similar to that in step S1905 and is, therefore, omitted from the description. In the third exemplary embodiment, the process information management unit 1403 specifies the group ID: 001 as an activation option and activates a process of the job control unit 402. The activated process is referred to as the "job control unit A".

In step S1908, the job control unit A is activated by itself.

In step S1909, the job control unit A specifies the group ID: 001 and makes a query request for the log output unit A. In step S1910, the process information management unit 1403 receives the query request. Here, since the log output unit 408 belonging to the group ID: 001, i.e., the log output unit A, exists, the process information management unit 1403 returns the end point of the log output unit A to the job control unit A.

In step S1911, the job control unit A makes a log output request to the log output unit A. In step S1912, the log output unit A receives the log output request and writes the message of the log output request to the log file.

<Flow of Group Deletion>

Referring to FIG. 18, while the print data generating service 3301 is generally resident on the system to provide a service, there may be a case where it is necessary to shut down the print data generating service 3301, for example, for the purpose of maintenance of a running server. The following describes the flow of processing for deleting a group when the process of the print data generating service 3301 is shut down.

Figure 20:
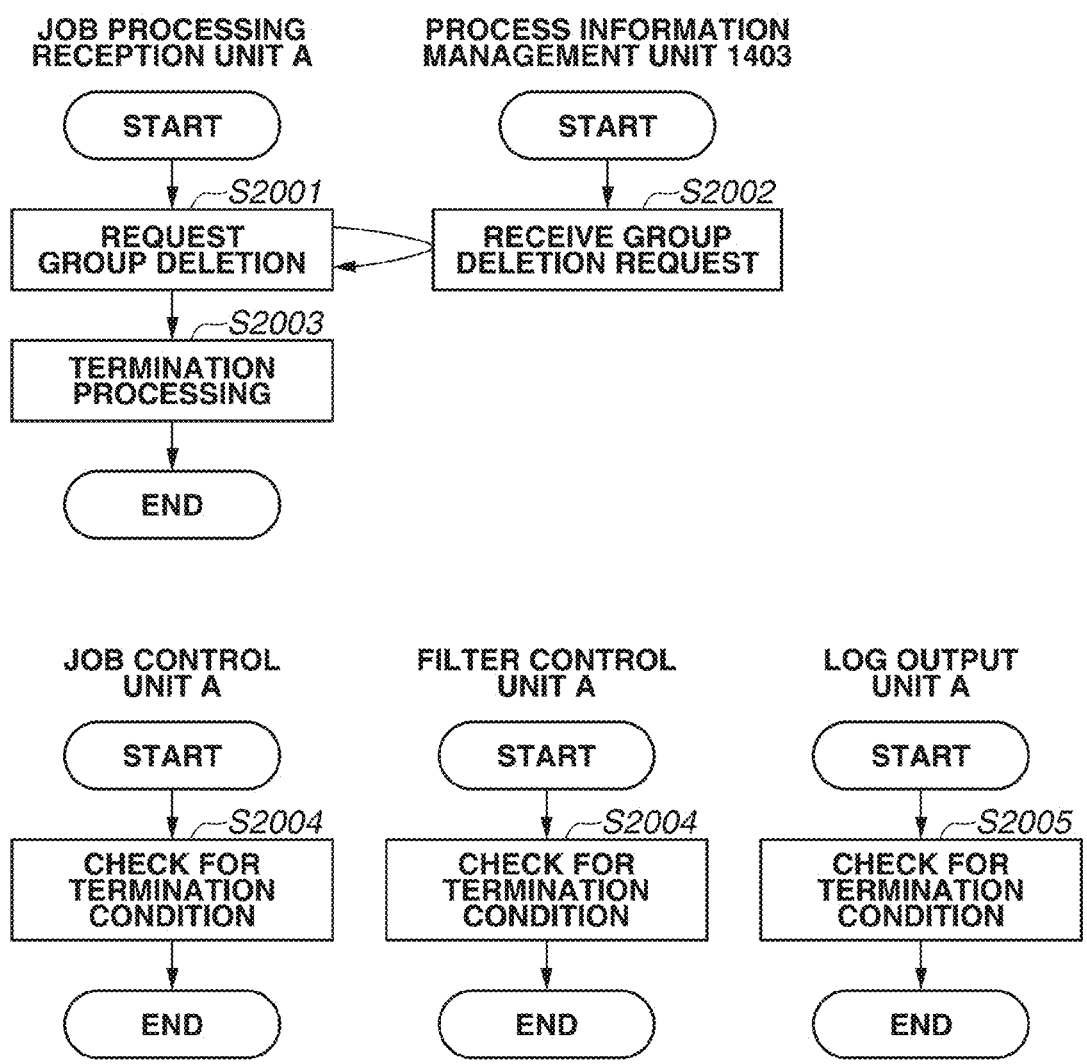
FIG. 20 illustrates the flow of processing for group deletion according to the third exemplary embodiment.

FIG. 20 illustrates the flow of group deletion processing. Here, it is supposed that the respective processes of the job processing reception unit A, the process information management unit A, the job control unit A, the filter control unit A, and the log output unit A have been activated and all of them belong to the same group ID: 001. Also, it is supposed that the whole job processing has been completed.

In step S2001, the job processing reception unit A specifies the group ID: 001 and makes a group deletion request.

In step S2002, the process information management unit 1403 receives the group deletion request, and functions as a deletion unit configured to delete a set group, thus deleting the group ID: 001 from a list of groups.

In step S2003, the job processing reception unit A performs termination processing.

In step S2004, each of the job control unit A and the filter control unit A checks for a termination condition. Each of the job control unit A and the filter control unit A checks whether to terminate based on the termination condition 806 passed from the process information management unit 1403 at the time of activation of the job control unit A and the filter control unit A. If the termination condition 806 is satisfied, each of the job control unit A and the filter control unit A terminates the process. If the termination condition 806 is not satisfied, each of the job control unit A and the filter control unit A checks for the termination condition 806 again after a predetermined time.

In step S2005, the log output unit A checks for a termination condition. In the third exemplary embodiment, the log output unit A terminates the process if a log output request from any other component is not made within a predetermined time.

The method in which the job control unit A acquires the log output unit A belonging to the group ID: 001 has been described above with reference to FIG. 19. Also, the method for deleting a group has been described above with reference to FIG. 20.

The processing similar to that illustrated in FIG. 19 can be performed when the job control unit A queries the process of the filter control unit A. In other words, the process information management unit 1403 causes the filter control unit A to belong to the group ID: 001. Also, the filter control unit A queries the log output unit A belonging to the group ID: 001, thus enabling the log output unit A to be used. As described above, a process of the common log output unit A becomes able to be used in a group.

In the above-described exemplary embodiments, since respective processing operations by a plurality of data conversion filters are performed with respective different processes, the possibility of spreading of a failure of one data conversion filter to the entire system can be reduced.

As described in the above exemplary embodiments, performing a plurality of data conversion operations with respective different processes can reduce the possibility of spreading of a failure of one data conversion filter to the entire system. However, the execution speed may be sometimes lower than when performing a plurality of data conversion operations with a single process. This is because an interprocess communication occurs more frequently and a delay due to processing for the interprocess communication occurs. In a fourth exemplary embodiment, data conversion filters to be performed with different processes are selected based on the reliability of each of a plurality of data conversion filters. According to the technique described in the fourth exemplary embodiment, since data conversion filters to be performed with different processes are selected based on the reliability of each of a plurality of data conversion filters, both the maintenance of processing speed of data conversion and the prevention of spreading of a failure of one data conversion filter can be satisfied.

The details of the fourth exemplary embodiment are described in the following.

Figure 21:
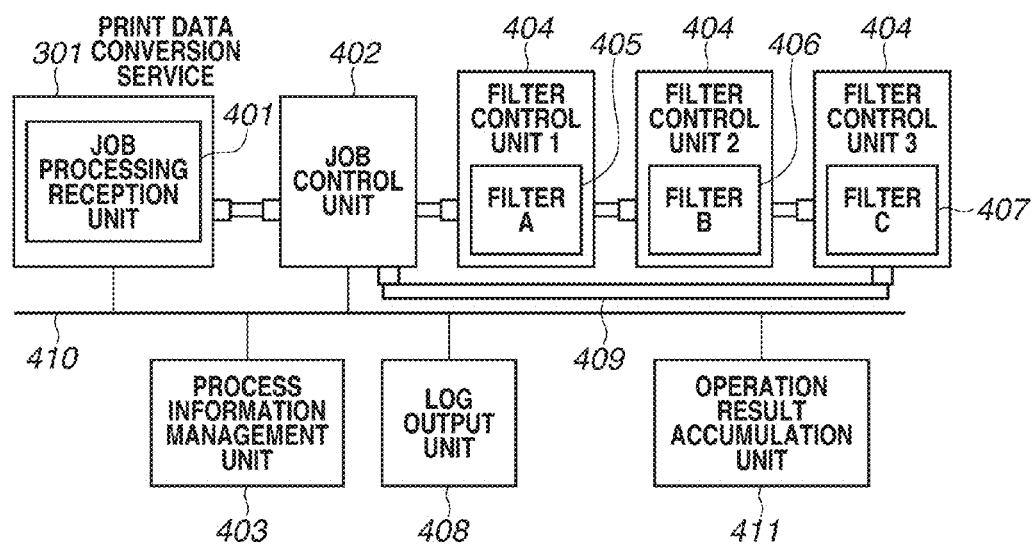
FIG. 21 is a configuration diagram illustrating a group of components associated with the print data conversion service according to a fourth exemplary embodiment.

FIG. 21 illustrates a relationship between software components used by the print data conversion service 301 to convert requested print data according to the fourth exemplary embodiment.

The outline of each software component used by the print data conversion service 301 is described now with reference to FIG. 21. The relationship between software components illustrated in FIG. 21 is almost similar to that in the first exemplary embodiment illustrated in FIG. 4. Here, a difference from FIG. 4 in the first exemplary embodiment is described.

The difference from FIG. 4 in the first exemplary embodiment is the addition of an operation result accumulation unit 411. The details of the operation result accumulation unit 411 according to the fourth exemplary embodiment are described now.

<Operation Result Accumulation Unit>

The operation result accumulation unit 411 exists as a process on the control bus 410.

The operation result accumulation unit 411 holds, on the RAM 204, a table storing operation results such as those illustrated in FIG. 22. In the table illustrated in FIG. 22, each data conversion filter is low in reliability.

The table is read from an external setting file at the time of activation of the operation result accumulation unit 411 and is then written to the external setting file at the time of termination.

The table contains descriptions of items of filter name 1301, version 1302, the number of processed jobs 1303, the number of abnormal terminations 1304, reliability 1305, and determination threshold 1306. The filter name 1301 holds the name of a filter used in a data conversion module, and the version 1302 holds the version of each filter. Also, the number of processed jobs 1303 holds the number of jobs processed by each filter, the number of abnormal terminations 1304 holds the number of times each filter abnormally terminated, the reliability 1305 holds a reliability of each filter, and the determination threshold 1306 holds a threshold used to determine reliability.

In the fourth exemplary embodiment, in the default setting at the time of start of a service of the data conversion module, as illustrated in FIG. 22, the number of processed jobs 1303 and the number of abnormal terminations 1304 are set to "0" in all the filters, and the reliability 1305 is set to "low" in all the filters.

The operation result accumulation unit 411 functions to send, to the job control unit 402, a response about the reliability of each filter about which an inquiry has been received from the job control unit 402.

When receiving a "job termination notification" or an "abnormal termination filter notification" from the job control unit 402, the operation result accumulation unit 411 updates the table storing operation results. More specifically, the operation result accumulation unit 411 refers to the "job termination notification" and increments, by one, the number of processed jobs 1303 of each filter used for conversion in the job. Also, the operation result accumulation unit 411 refers to the "abnormal termination filter notification" and increments, by one, the number of abnormal terminations of a filter that has abnormally terminated.

The operation result accumulation unit 411 refers to the table to determine reliability and overwrites the reliability 1305. A method for determining reliability is described in the following.

<Method for Determining Reliability>

The operation result accumulation unit 411 calculates a reliability determination value of a filter by using a predetermined reliability determination formula (1). An example of the reliability determination formula is as follows:

Reliability determination value=Number of processed jobs/(Number of abnormal terminations+1)      (1)

If the reliability determination value calculated by using the formula (1) based on values in the table storing operation results is equal to or greater than the determination threshold 1306, the operation result accumulation unit 411 determines that the reliability is "high". If the reliability determination value is less than the determination threshold 1306, the operation result accumulation unit 411 determines that the reliability is "low".

FIG. 23 illustrates an example of the table obtained after operation results have been accumulated. As for a filter A, since the number of processed jobs 1303 is "50000" and the number of abnormal terminations 1304 is "2", the reliability determination value becomes "50000/3", which is greater than the determination threshold "10000", and, thus, it is determined that the reliability is "high". Also, as for a filter Z, since the number of processed jobs 1303 is "10" and the number of abnormal terminations 1304 is "0", the reliability determination value becomes "10/1", which is less than the determination threshold "10000", and, thus, it is determined that the reliability is "low".

Here, the reason why the denominator of the formula (1) is defined as "(Number of abnormal terminations+1)" is to prevent the operation result accumulation unit 411 from determining that the reliability of a filter having a small number of processed jobs and a number of abnormal terminations of "0", such as the filter Z, is "high".

<Job Control Unit 402>

The job control unit 402 has a function similar to that of the job control unit 402 in the first exemplary embodiment.

However, the job control unit 402 in the fourth exemplary embodiment searches for an element 501 that matches the job type information included in the job and inquires the operation result accumulation unit 411 of the reliability of each filter written below the matching element 501. Then, the job control unit 402 determines the number of filter control units 404 and the names of filter control units, into which the respective filters are loaded, based on the reliability of each filter about which a response has been received from the operation result accumulation unit 411. A method for determining such number and names is described below with reference to FIGS. 24 and 25. The job control unit 402 overwrites the determined number of filter control units 404 to the Filter Host num attribute of the element 501 of the configuration file and overwrites the names of filter control units, into which the respective filters are loaded, to the Filter Host name attribute of the element 502.

Furthermore, the job control unit 402 may determine the number of filter control units 404 used for conversion, the types and alignment sequences of filters, and the names of filter control units, into which the respective filters are loaded, by analyzing print data instead of the job type information.

The job control unit 402 functions to record the "number of filter conversion completions" on the RAM 204. The "number of filter conversion completions" is used to determine a filter that has abnormally terminated, in a case where abnormal termination, such as crash or hang-up, has occurred during processing of a job. Processing for recording the "number of filter conversion completions" is described here. The job control unit 402 initializes the "number of filter conversion completions" to "0" after allowing data to flow to a pipeline connected to the first-stage filter control unit 404. After that, the job control unit 402 increments the "number of filter conversion completions" by one upon each receipt of a "filter conversion completion notification" from every filter control unit 404. The "filter conversion completion notification" is described below.

The job control unit 402 transmits a "job termination notification" to the operation result accumulation unit 411 when processing of the job has been normally completed. The "job termination notification" contains descriptions of the filter name and version of each filter used for conversion in the job.

If abnormal termination has occurred during processing of the job, the job control unit 402 determines a filter that has abnormally terminated, and transmits a "job termination notification" and an "abnormal termination filter notification" to the operation result accumulation unit 411. The "abnormal termination filter notification" contains descriptions of the filter name and version of the filter that has abnormally terminated. Processing performed when abnormal termination has occurred is described below with reference to FIGS. 26 and 27.

<Method for Determining Number of Filter Control Units and Names of Filter Control Units into which Respective Filters are Loaded>

A method for determining the number of filter control units 404 and the names of filter control units, into which the respective filters are loaded, based on the configuration file and the reliability of each filter about which a response is received from the operation result accumulation unit 411, and overwriting the configuration file is described in detail.

Figure 24:
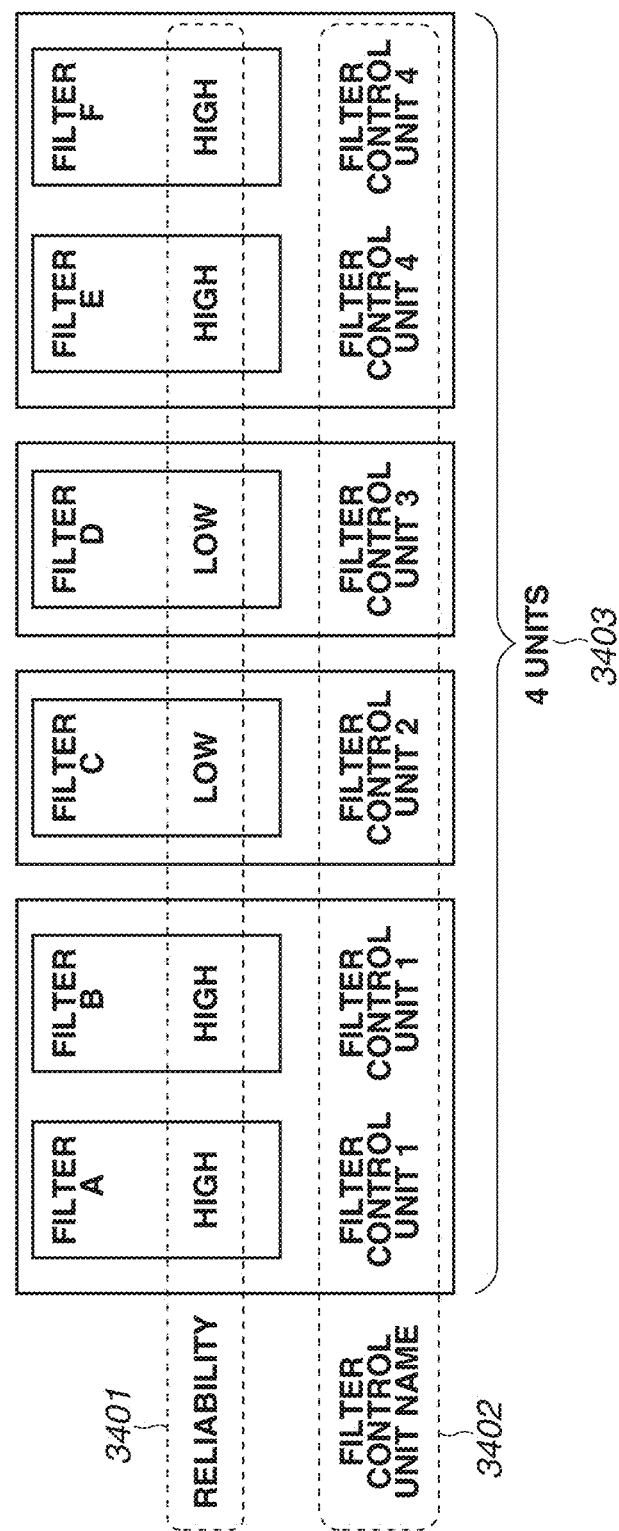
FIG. 24 is a schematic diagram illustrating a method for determining the number of filter control units and the names of filter control units into which respective filters are loaded.

A case is described where six types of filters, including a filter A to a filter F, are processed in order and the reliability of each filter is indicated in a field 3401, as illustrated in FIG. 24. The job control unit 402 determines the number 3403 of filter control units and the names 3402 of filter control units, into which the respective filters are loaded, in such a manner that, if the reliabilities of adjacent filters are "high" and "high", those filters are processed as the same process, if the reliabilities of adjacent filters are "low" and "low", "low" and "high", and "high" and "low", those filters are processed as different processes. Filters determined as having the same filter control unit name 3402 (in this example, the filters A and B and the filters E and F) are processed as the same process.

Figure 25:
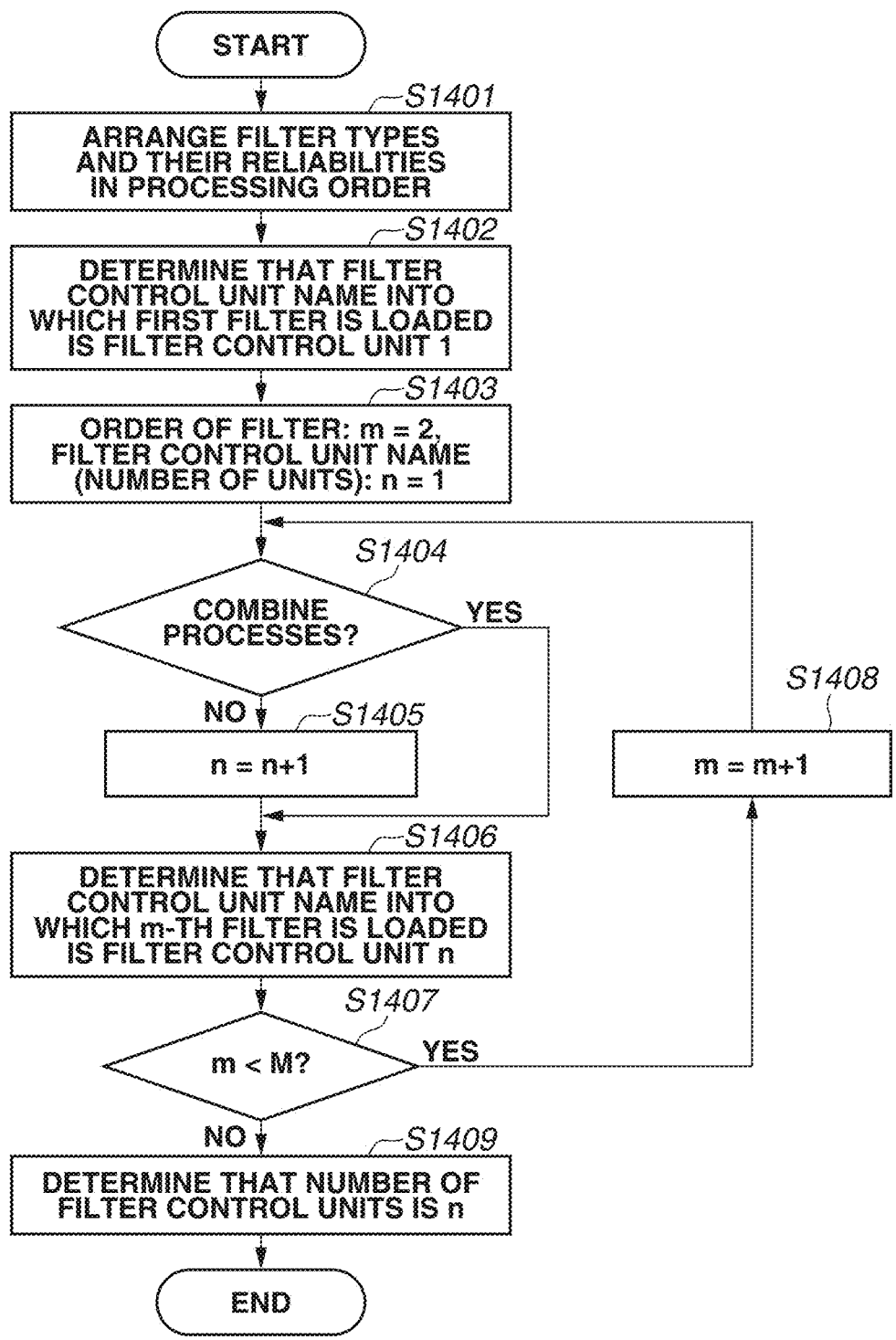
FIG. 25 is a flowchart illustrating the method for determining the number of filter control units and the names of filter control units into which respective filters are loaded.

Processing for determining the number 3403 of filter control units and the names 3402 of filter control units, into which the respective filters are loaded, is described with reference to the flowchart of FIG. 25.

First, in step S1401, the job control unit 402 arranges filter types and their reliabilities in a processing order based on the configuration file and the reliability of each filter about which a response is received from the operation result accumulation unit 411.

In step S1402, the job control unit 402 determines that the filter control unit name into which the first filter (in this example, the filter A) is loaded is a filter control unit 1, and overwrites the determined filter control unit name to the Filter Host name attribute of the element 502 of the configuration file.

In step S1403, the job control unit 402 sets initial values of parameters m and n as m=2 and n=1. The parameters m and n denote the following meanings:

m: a parameter indicating the order of a filter when the filters are arranged in the processing order; and n: a parameter used to determine the filter control unit name and the number of filter control units.

Next, in step S1404, the job control unit 402 determines whether to combine processes of adjacent filters. More specifically, if the reliabilities of the adjacent (m−1)th filter and m-th filter are "high" and "high", the job control unit 402 determines to combine processes of the filters (YES in step S1404), and the processing proceeds to step S1406. If the reliabilities of the adjacent filters are "high" and "low", "low" and "high", or "low" and "low", the job control unit 402 determines not to combine processes of the filters (NO in step S1404), and the processing proceeds to step S1405. In the example illustrated in FIG. 24, since the reliability of the (m−1)th filter A is "high" and the reliability of the m-th filter B is "high", the job control unit 402 determines to combine processes of the filters, and the processing proceeds to step S1406.

In step S1406, the job control unit 402 determines that the filter control unit name into which the m-th filter (here, the filter B) is loaded is a filter control unit n (here, the filter control unit 1). Also, the job control unit 402 overwrites the determined filter control unit name to the Filter Host name attribute of the element 502 of the configuration file.

In step S1407, the job control unit 402 determines whether m<M. If m<M (YES in step S1407), the processing proceeds to step S1408. If not m<M (NO in step S1407), the processing proceeds to step S1409. Here, M denotes the number of filters used in the job (here, 6 filters). In this example, since m=2<6 (YES in step S1407), the processing proceeds to step S1408.

In step S1408, the job control unit 402 increments by one the value of the parameter m (here, m=3 results). Next, in step S1404, the job control unit 402 determines whether to combine processes of adjacent filters. In the example illustrated in FIG. 24, since the reliability of the (m−1)th filter B is "high" and the reliability of the m-th filter C is "low", the job control unit 402 determines not to combine processes of the filters, and the processing proceeds to step S1405.

In step S1405, the job control unit 402 increments by one the value of the parameter n (here, n=2 results).

In step S1406, the job control unit 402 determines that the filter control unit name into which the m-th filter (here, the filter C) is loaded is a filter control unit n (here, the filter control unit 2). Also, the job control unit 402 overwrites the determined filter control unit name to the Filter Host name attribute of the element 502 of the configuration file.

The job control unit 402 repeats processing from step S1404 to step S1408 until m<M becomes unsatisfied.

In step S1409, the job control unit 402 determines that the number of filter control units is n (in the example illustrated in FIG. 24, 4 units), and overwrites the determined number to the Filter Host num attribute of the element 502 of the configuration file.

Furthermore, the filter control unit 404 transmits a "filter conversion completion notification" to the job control unit 402 when the filter loaded into the filter control unit 404 itself has completed processing of the job. In a case where a plurality of filters is loaded into a single filter control unit 404, the filter control unit 404 transmits a "filter conversion completion notification" to the job control unit 402 each time each of the plurality of filters has sequentially completed processing of the job.

The end of data of a job includes end discrimination data indicating the end of data. The filter control unit 404 can identify the end discrimination data to determine that each filter has completed processing of the job.

<Data Processing in the Case of Normal Termination>

Figure 28:
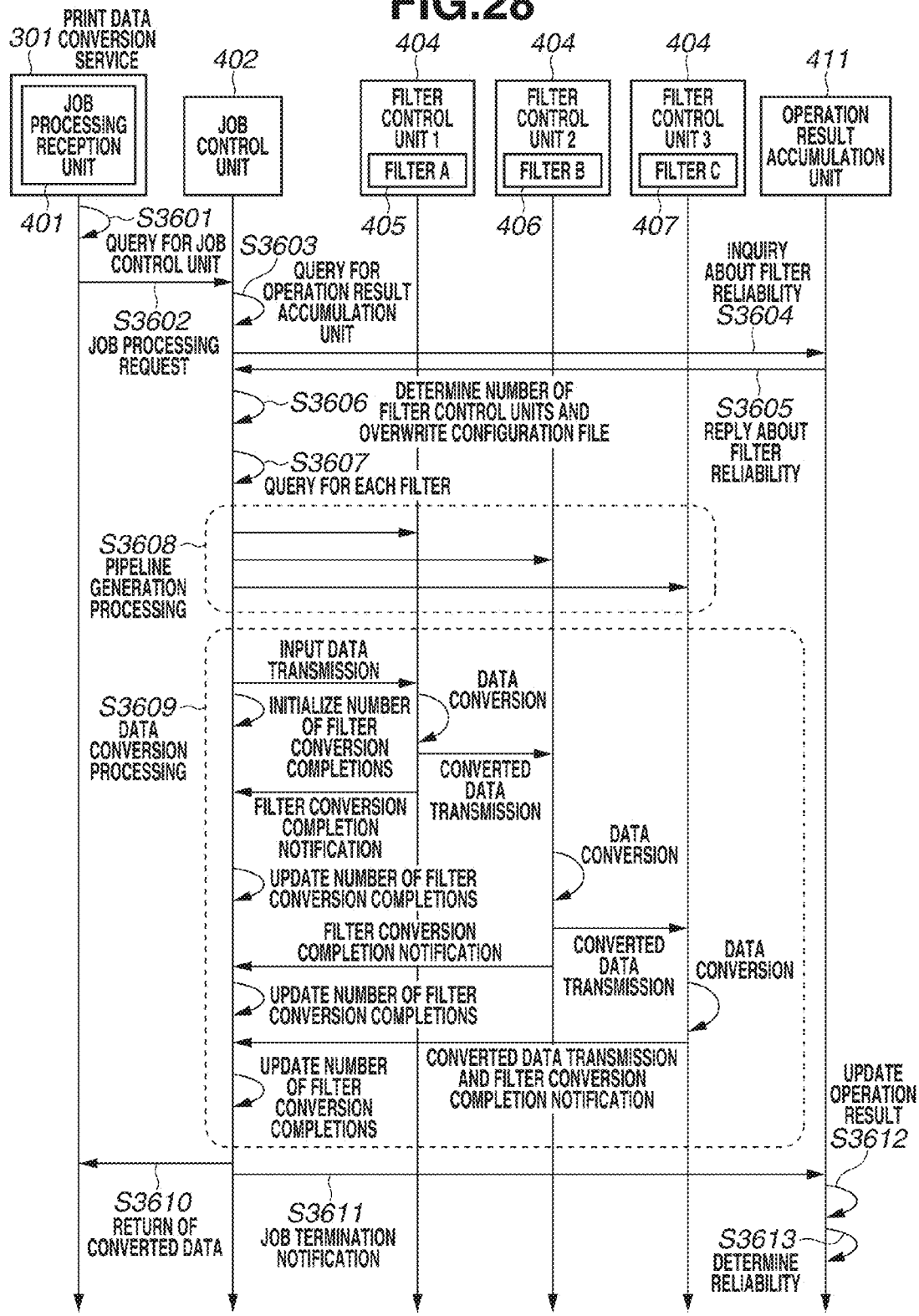
FIG. 28 is a sequence diagram illustrating the flow of data conversion processing in a case where a job normally terminates in an early stage of service start.

FIG. 28 is a sequence diagram illustrating the outline of data conversion processing performed after the job processing reception unit 401 receives a job processing request from the print data conversion service 301.

In step S3601, the job processing reception unit 401 makes a query request for the job control unit 402. The job processing reception unit 401 makes a query request to the process information management unit 403 and acquires the end point of the job control unit 402.

In step S3602, the job processing reception unit 401 makes a job processing request to the job control unit 402. Here, data of a job is passed from the job processing reception unit 401 to the job control unit 402. Passing of the data may be performed via a path of the data or via a memory or interprocess communication.

In step S3603, the job control unit 402 makes a query request for the operation result accumulation unit 411. The job control unit 402 makes a query request to the process information management unit 403 and acquires the end point of the operation result accumulation unit 411.

In step S3604, the job control unit 402 inquires the operation result accumulation unit 411 of the reliability of each filter used for the job, based on job type information included in data of the job. Here, it is supposed that the job type is "conversion for print service A". The job control unit 402 searches for the element 501 of the configuration file (FIG. 5) that matches the "conversion for print service A". Then, the job control unit 402 inquires the operation result accumulation unit 411 of the reliability of each filter written below the found matching element 501 (here, the filter A, the filter B, and the filer C). At that time, the job control unit 402 also notifies the operation result accumulation unit 411 of the filter name and version of each filter and the end point of a service interface of the job control unit 402.

In step S3605, the operation result accumulation unit 411 sends, to the job control unit 402, a response about the reliability of each filter, about which an inquiry has been received, via the service interface of the job control unit 402. Since in the default setting at the time of start of a service of the data conversion module, the reliability 1305 written in the table storing operation results is set to "low" in all the filters, the response indicates that the reliability is "low" in all of the filter A, the filter B, and the filter C.

In step S3606, the job control unit 402 determines the number of filter control units 404 and the filter control unit names, into which the respective filters are loaded, based on the reliability of each filter. Also, the job control unit 402 overwrites the determined number of filter control units 404 to the Filter Host num attribute of the element 501 of the configuration file (FIG. 5) and overwrites the names of filter control units, into which the respective filters are loaded, to the Filter Host name attribute of the element 502. Here, overwriting is performed in such a way as to indicate that the number of filter control units 404 is three, the filter A 405 is loaded into the filter control unit 1, the filter B 406 is loaded into the filter control unit 2, and the filter C 407 is loaded into the filter control unit 3.

In step S3607, the job control unit 402 makes a query request to the process information management unit 403 for the filter control unit 404 corresponding to each filter based on the configuration file (FIG. 5), and acquires the end point of each filter control unit 404. Here, the job control unit 402 acquires the end points of the filter control unit 1, into which the filter A 405 has been loaded, the filter control unit 2, into which the filter B 406 has been loaded, and the filter control unit 3, into which the filter C 407 has been loaded.

In step S3608, the job control unit 402 generates pipelines. The job control unit 402 instructs each filter control unit 404 to generate pipelines. Each filter control unit 404 generates pipelines used for adjacent component processes. After completing the generation of pipelines, each filter control unit 404 notifies the job control unit 402 of the completion of generation of pipelines, and then waits for the job to come from the input pipeline for that filter control unit 404. Furthermore, when instructing each filter control unit 404 to generate its pipelines, the job control unit 402 also notifies each filter control unit 404 of the end point of a service interface of the job control unit 402. When an error occurs in a filter control unit 404, the filter control unit 404 notifies the job control unit 402 of the error via the service interface of the job control unit 402. Also, when a filter loaded into the filter control unit 404 has completed processing of the job, the filter control unit 404 transmits a "filter conversion completion notification" to the job control unit 402 via the service interface of the job control unit 402.

In step S3609, which is data conversion processing, the job control unit 402 transmits data to a pipeline connected to the first-stage filer control unit 1 and, after that, initializes the "number of filter conversion completions" to "0". The filter control unit 1 receives the data and performs data conversion processing on the data using the filter A. Then, the filter control unit 1 passes data to a pipeline connected to the filter control unit 2 and, after that, transmits a "filter conversion completion notification" to the job control unit 402. Upon receipt of the "filter conversion completion notification", the job control unit 402 increments the "number of filter conversion completions" by one. Also, the filter control unit 2 and the filter control unit 3 similarly perform data conversion processing. Finally, the filter control unit 3 transmits the converted data to the job control unit 402.

In step S3610, the job control unit 402 returns the converted data to the job processing reception unit 401.

In step S3611, the job control unit 402 transmits a "job termination notification" to the operation result accumulation unit 411. The "job termination notification" contains descriptions of the filter name and version of each filter used for the job.

In step S3612, upon receipt of the "job termination notification" from the job control unit 402, the operation result accumulation unit 411 updates the table storing operation results, such as that illustrated in FIG. 22. More specifically, the operation result accumulation unit 411 refers to the "job termination notification" and increments, by one, the number of processed jobs 1303 of each filter used for conversion in the job. Here, the operation result accumulation unit 411 increments, by one, the number of processed jobs 1303 of each of the filter A, the filter B, and the filter C.

In step S3613, each time the table storing operation results is updated, the operation result accumulation unit 411 determines the reliability of each filter based on the updated numbers and overwrites the reliability 1305.

<Processing in the Case of Crash>

Figure 26:
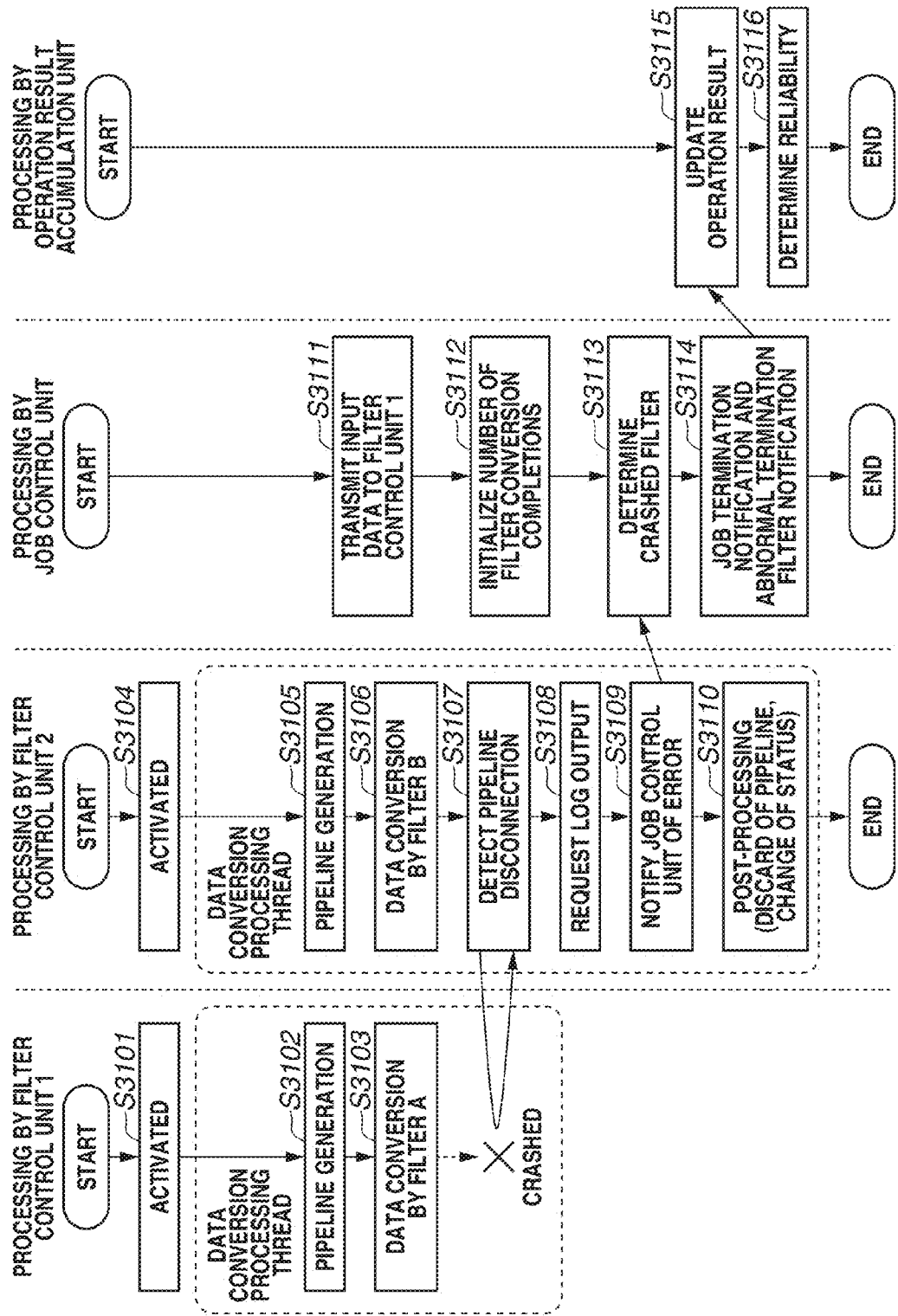
FIG. 26 illustrates the flow of processing in a case where a filter has crashed.

FIG. 26 illustrates the flow of processing when a crash has occurred during data conversion processing, i.e., during processing in step S3607 and subsequent steps of the processing flow illustrated in FIG. 28. Here, it is supposed that the filter control unit 1, into which the filter A is loaded, has crashed during the process of data conversion.

In step S3101, which corresponds to step S3607 in FIG. 28, the filter control unit 1, into which the filter A is loaded, is activated.

In step S3102, which corresponds to step S3608 in FIG. 28, the filter control unit 1 generates a pipeline. The filter control unit 1 generates a pipeline in response to a request from the job control unit 402.

In step S3103, the filter control unit 1 performs data conversion of a job with a data conversion processing thread using the filter A. In the example illustrated in FIG. 26, it is supposed that the filter control unit 1, into which the filter A is loaded, has crashed during data conversion processing.

In step S3104, the filter control unit 2, into which the filter B is loaded, is activated.

In step S3105, the filter control unit 2 generates a pipeline. As previously described in step S3608 in FIG. 28, here, the filter control unit 2 receives the end point of the service interface of the job control unit 402.

In step S3106, the filter control unit 2 performs data conversion using the filter B. The filter control unit 2 waits for data to be transmitted from the pipeline.

In step S3107, the filter control unit 2 detects disconnection of the pipeline of the filter control unit 1. More specifically, the filter control unit 2 and the filter control unit 1 periodically exchange a packet for living confirmation and detect that the packet has ceased based on time out.

In step S3108, the filter control unit 2 requests the log output unit 408 to output a log message indicating the pipeline disconnection. The log output unit 408 receives this message and writes information indicative of the pipeline disconnection to the log file.

In step S3109, the filter control unit 2 notifies the job control unit 402 of an error. In the event of an error notification, the filter control unit 2 notifies the job control unit 402 via the end point of the service interface of the job control unit 402.

In step S3110, the filter control unit 2 performs post-processing. More specifically, the filter control unit 2 discards the pipeline or notifies the process information management unit 403 of a change to the "idling" status. The process information management unit 403 receives such a change notification and changes the status 907 of the target component process to "idling".

In step S3111, which corresponds to "INPUT DATA TRANSMISSION" in step S3609 in FIG. 28, the job control unit 402 transmits input data to the filter control unit 1.

In step S3112, which corresponds to "INITIALIZE NUMBER OF FILTER CONVERSION COMPLETIONS" in step S3609 in FIG. 28, the job control unit 402 initialize the number of filter conversion completions to "0".

In step S3113, the job control unit 402 receives an error notification from the filter control unit 2, refers to the configuration file (FIG. 5) and the number of filter conversion completions, and determines a filter that has crashed. Here, since the number of filter conversion completions is "0", the job control unit 402 determines that the filter A, which is the first filter in the configuration file item 502, has crashed.

In step S3114, the job control unit 402 transmits a "job termination notification" and an "abnormal termination filter notification" to the operation result accumulation unit 411. The "job termination notification" contains descriptions of the filter name and version of each filter used for conversion in the job. The "abnormal termination filter notification" contains descriptions of the filter name and version of the crashed filter.

In step S3115, upon receipt of the "job termination notification" and the "abnormal termination filter notification" from the job control unit 402, the operation result accumulation unit 411 updates the table storing operation results, such as that illustrated in FIG. 22. More specifically, the operation result accumulation unit 411 refers to the "job termination notification" and increments, by one, the number of processed jobs 1303 of each filter used for conversion in the job. Here, the operation result accumulation unit 411 increments, by one, the number of processed jobs 1303 of each of the filter A, the filter B, and the filter C. Also, the operation result accumulation unit 411 refers to the "abnormal termination filter notification" and increments, by one, the number of abnormal terminations 1304 of the crashed filter. Here, the operation result accumulation unit 411 increments, by one, the number of abnormal terminations 1304 of the filter A.

In step S3116, the operation result accumulation unit 411 determines the reliability of each filter based on the updated numbers and overwrites the reliability 1305.

As described above, even if the filter control unit 1 has crashed, the other components (the filter control unit 2, the job control unit 402, and the job processing reception unit 401) do not crash, so that information indicating that the pipeline has been disconnected can be left in the log file. Furthermore, operation results can be accumulated.

In the above-described example, the filter control unit 1 crashes and, then, the filter control unit 2, which is a subsequent component process, detects disconnection of the pipeline and transmits an error notification. Similarly, if the filter control unit 2 or the filter control unit 3 has crashed, the filter control unit 3 or the job control unit 402, respectively, can detect disconnection of the pipeline and transmit an error notification. In other words, a component process that follows the crashed filter control unit can detect disconnection of the pipeline and transmit an error notification.

<Processing in the Case of Hang-Up>

Figure 27:
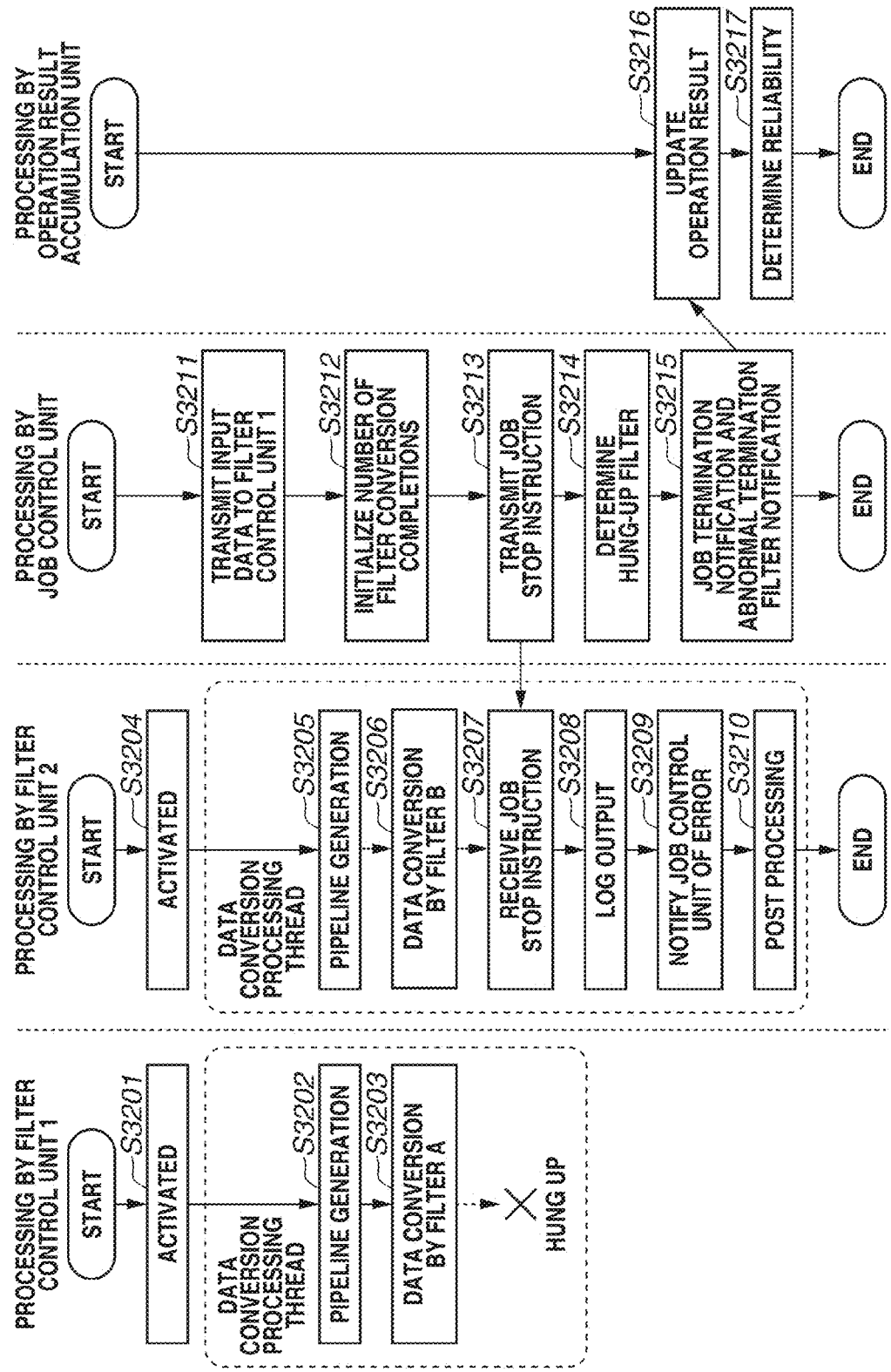
FIG. 27 illustrates the flow of processing in a case where a filter has hung up.

FIG. 27 illustrates the flow of processing when a hang-up has occurred during data conversion processing, i.e., during processing in step S3607 and subsequent steps of the processing flow illustrated in FIG. 28. Here, it is supposed that the filter control unit 1, into which the filter A is loaded, has hung up during the process of data conversion.

In step S3201, the filter control unit 1, into which the filter A is loaded, is activated. Here, the termination condition 806 is passed from the process information management unit 403 to the filter control unit 1.

In step S3202, the filter control unit 1 generates a pipeline with a data conversion processing thread.

In step S3203, the filter control unit 1 performs data conversion of a job using the filter A. It is supposed that the filter A has hung up in the middle of this step.

In step S3204, the filter control unit 2, into which the filter B is loaded, is activated.

In step S3205, the filter control unit 2 generates a pipeline with a data conversion processing thread.

In step S3206, the filter control unit 2 performs data conversion using the filter B. The filter control unit 2 waits for data to be transmitted from the pipeline.

In step S3207, the filter control unit 2 receives a job stop instruction transmitted from the job control unit 402, and then terminates job processing.

In step S3208, the filter control unit 2 requests the log output unit 408 to output a log message indicating that the job has been stopped in response to the job stop instruction.

In step S3209, the filter control unit 2 notifies the job control unit 402 of an error.

In step S3210, the filter control unit 2 performs post-processing.

In step S3211, which corresponds to "INPUT DATA TRANSMISSION" in step S3609 in FIG. 28, the job control unit 402 transmits input data to the filter control unit 1.

In step S3212, which corresponds to "INITIALIZE NUMBER OF FILTER CONVERSION COMPLETIONS" in step S3609 in FIG. 28, the job control unit 402 initialize the number of filter conversion completions to "0".

In step S3213, the job control unit 402 transmits a job stop instruction. The job control unit 402 has a timer and transmits the job stop instruction to each filter control unit 404 if it takes a predetermined time or more to process the job.

In step S3214, the job control unit 402 refers to the configuration file (FIG. 5) and the number of filter conversion completions, and determines a filter that has hung up. Here, since the number of filter conversion completions is "0", the job control unit 402 determines that the filter A, which is the first filter in the configuration file item 502, has hung up.

In step S3215, the job control unit 402 transmits a "job termination notification" and an "abnormal termination filter notification" to the operation result accumulation unit 411. The "job termination notification" contains descriptions of the filter name and version of each filter used for conversion in the job. The "abnormal termination filter notification" contains descriptions of the filter name and version of the hung-up filter.

In step S3216, upon receipt of the "job termination notification" and the "abnormal termination filter notification" from the job control unit 402, the operation result accumulation unit 411 updates the table storing operation results, such as that illustrated in FIG. 22. More specifically, the operation result accumulation unit 411 refers to the "job termination notification" and increments, by one, the number of processed jobs 1303 of each filter used for conversion in the job. Here, the operation result accumulation unit 411 increments, by one, the number of processed jobs 1303 of each of the filter A, the filter B, and the filter C. Also, the operation result accumulation unit 411 refers to the "abnormal termination filter notification" and increments, by one, the number of abnormal terminations 1304 of the hung-up filter. Here, the operation result accumulation unit 411 increments, by one, the number of abnormal terminations 1304 of the filter A.

In step S3217, the operation result accumulation unit 411 determines the reliability of each filter based on the updated numbers and overwrites the reliability 1305.

As described above, even if the filter control unit 1 has hung up, the other components do not hang up, so that information indicating that the filter control unit 1 has hung up and information indicating that the filter control unit 2 has stopped the job can be left in the log file. Furthermore, operation results can be accumulated.

<Processing after Accumulation of Operation Results>

Figure 29:
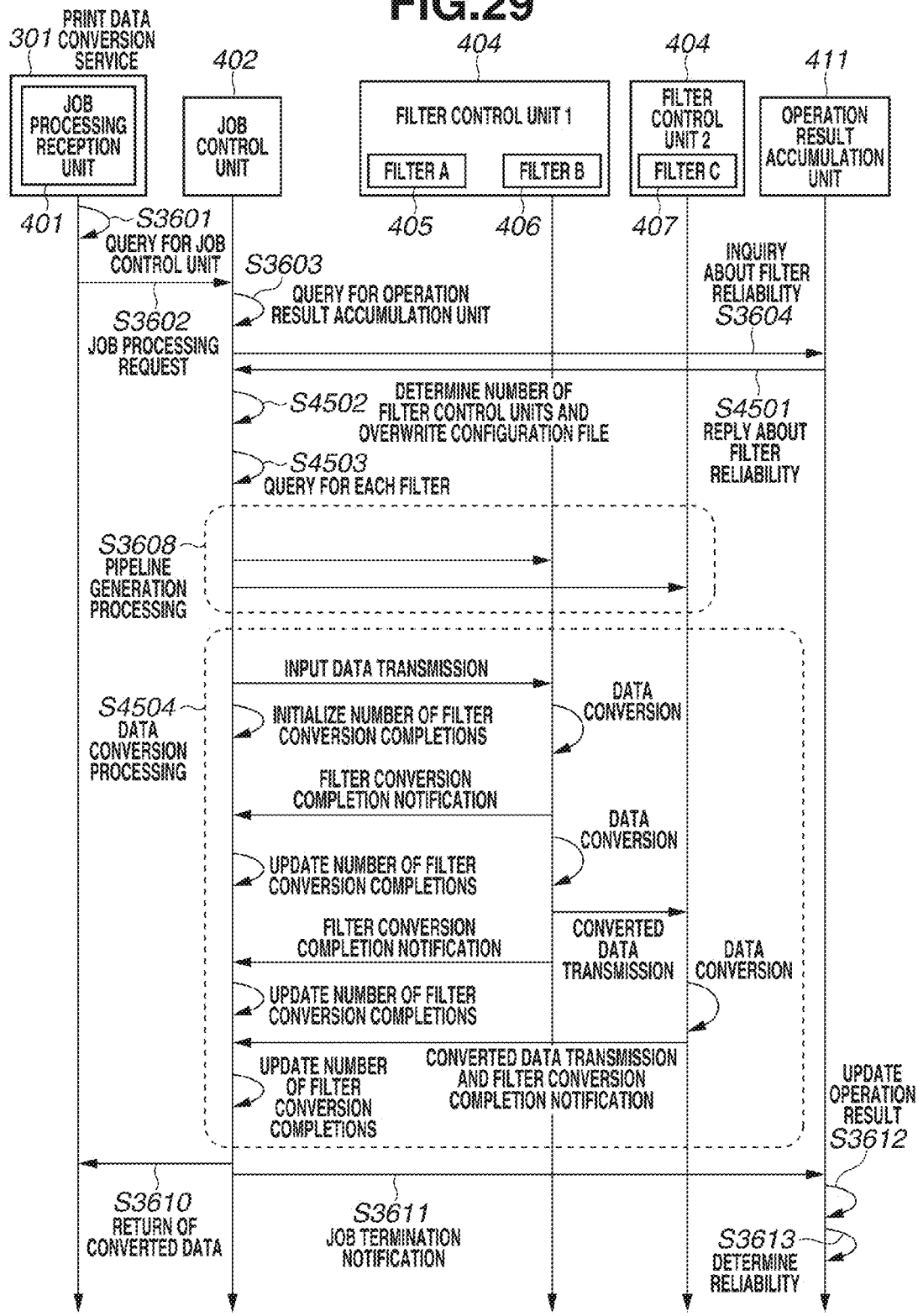
FIG. 29 is a sequence diagram illustrating the flow of data conversion processing in a case where a job normally terminates after operation results have accumulated.

FIG. 29 illustrates an example of processing a job with the job type "conversion for print service A" in a case where the table obtained after accumulation of operation results lists the values illustrated in FIG. 23.

The same processing operations as those illustrated in FIG. 28 are assigned the respective same reference numerals and are not repeated in the description.

In step S4501, the operation result accumulation unit 411 sends, to the job control unit 402, a response about the reliability of each filter, about which an inquiry has been received, via the service interface of the job control unit 402. The response indicates that the reliability of the filter A is "high", the reliability of the filter B is "high", and the reliability of the filter C is "low".

In step S4502, the job control unit 402 determines the number of filter control units 404 and the filter control unit names, into which the respective filters are loaded, based on the reliability of each filter. Also, the job control unit 402 overwrites the determined number of filter control units 404 to the Filter Host num attribute of the element 501 of the configuration file (FIG. 5) and overwrites the names of filter control units, into which the respective filters are loaded, to the Filter Host name attribute of the element 502.

Here, overwriting is performed in such a way as to indicate that the number of filter control units 404 is tow, the filter A 405 is loaded into the filter control unit 1, the filter B 406 is loaded into the filter control unit 1, and the filter C 407 is loaded into the filter control unit 2.

In step S4503, the job control unit 402 makes a query request to the process information management unit 403 for the filter control unit 404 corresponding to each filter based on the configuration file (FIG. 5), and acquires the end point of each filter control unit 404. Here, the job control unit 402 acquires the end points of the filter control unit 1, into which the filter A 405 and the filter B 406 have been loaded, and the filter control unit 2, into which the filter C 407 has been loaded.

In step S4504, which is data conversion processing, the job control unit 402 transmits data to a pipeline connected to the first-stage filer control unit 1 and, after that, initializes the "number of filter conversion completions" to "0". The filter control unit 1 performs data conversion using the filter A. Upon completion of the data conversion processing using the filter A, the filter control unit 1 transmits a "filter conversion completion notification" to the job control unit 402. Upon receipt of the "filter conversion completion notification", the job control unit 402 increments the "number of filter conversion completions" by one. The filter control unit 1 performs data conversion using the filter B. Then, the job control unit 402 transmits data to a pipeline connected to the filter control unit 2 and, after that, transmits a "filter conversion completion notification" to the job control unit 402.

Upon receipt of the "filter conversion completion notification", the job control unit 402 increments the "number of filter conversion completions" by one.

Subsequently, the filter control unit 2 performs data conversion using the filter C. Upon completion of the data conversion processing using the filter C, the filter control unit 2 transmits the "converted data" and a "filter conversion completion notification" to the job control unit 402.

Upon receipt of the "filter conversion completion notification", the job control unit 402 increments the "number of filter conversion completions" by one.

As described above, since the filter A and the filter B, the reliability of each of which is "high", are processed as the same process and, therefore, no interprocess communication occurs, the deterioration of performance can be reduced. Also, since the filter C, the reliability of which is "low", is processed as a different process, availability can be secured.

Furthermore, while there has been described a method for accumulating operation results in the operation result accumulation unit 411 and determining the reliability of each filter based on the operation results, the job control unit 402 can previously store information indicative of the reliability of each filter in the configuration file. In a case where filters with a low reliability are previously known, the job control unit 402 storing information indicative of the reliability of each filter in the configuration file can secure availability and reduce the deterioration of performance.

In addition, although the formula (1) is used as the reliability determination formula, this is not restrictive. For example, the mean time between failures (MTBF) such as that expressed by the following formula (2) can be used as the reliability determination formula:

Reliability determination value=Operating time of system/Number of abnormal terminations    (2)

Moreover, although, as a method for determining a filter that has abnormally terminated, there has been described a method in which the job control unit 402 receives the "filter conversion completion notification" from the filter control unit 404 and updates the "number of filter conversion completions", this is not restrictive. For example, the filter control unit 404 can have the function to determine a filter that has abnormally terminated and to write the type of the filter as a dump file, and the job control unit 402 can refer to the dump file and transmit an "abnormal termination filter notification".

Furthermore, although there has been described an example in which operation results are updated each time processing of one job is completed, this is not restrictive. For example, in a case where a plurality of pieces of input data to be converted is included in a single job, operation results can be updated each time processing of a piece of input data is completed. For example, in a case where the data amount of input data to be converted is large and data divided in a unit is processed at a time, operation results can be updated each time processing of the unit of divided data is completed.

In addition, although there has been described an example of determining the reliability each time operation results are updated, this is not restrictive. For example, the reliability can be determined each time the number of processed jobs 1303 increases by a predetermined number (for example, 1000 jobs).

Moreover, although there has been described an example of determining the number of filter control units and the names of filter control units, into which the respective filters are loaded, for every job and making a query (activation) for each filer control unit, this is not restrictive. For example, in a case where a series of jobs with the same "job type information" is input, the determination of the number of filter control units and the names of filter control units, into which the respective filters are loaded, and the query (activation) for each filter control unit can be performed only once. Operation results can be accumulated even during processing of jobs with the same "job type information", and the determination of the number of filter control units and the names of filter control units, into which the respective filters are loaded, and the query (activation) for each filter control unit can be performed when abnormal termination has occurred.

At the time of start of a "cloud print service" in the fourth exemplary embodiment, components constituting the data conversion processing are activated as different processes. After activation, operation results indicating the number of times for which each filter crashed or hung up are accumulated, and the reliability is determined based on the operation results. Then, filters the reliability of which is higher than a predetermined value, i.e., with the "high" reliability, are activated as the same process, and filters the reliability of which is lower than the predetermined value, i.e., with the "low" reliability, are activated as different processes.

However, according to the method in the fourth exemplary embodiment, in an early stage of start of the service, all the components are processed as different processes, so that performance may deteriorate.

To address this issue, a method according to a fifth exemplary embodiment activates components constituting the data conversion processing as the same process at the time of start of the "cloud print service". After that, the method accumulates operation results indicating the number of times for which each filter crashed or hung up. Then, only after the number of processed jobs in each filter exceeds a predetermined number (for example, 20000 jobs), the method determines the reliability based on the operation results. The method activates filters with the high reliability as the same process, and activates filters with the low reliability as different processes.

With such processing performed, in an early stage of start of the service, operation results can be accumulated with the deterioration of performance minimized, and, after accumulation of the operation results, the deterioration of performance can be reduced while securing availability.

The hardware configuration, software configuration, and functions of components are similar to those of the fourth exemplary embodiment, and are, therefore, assigned the respective same reference numerals and not repeated in the description.

At the time of start of the "cloud print service", to activate filters constituting the data conversion processing as the same process, the reliability 1305 in the table storing operation results is set to "high" in all of the filters, as illustrated in FIG. 30.

<Data Conversion Processing in the Case of Normal Termination>

Figure 31:
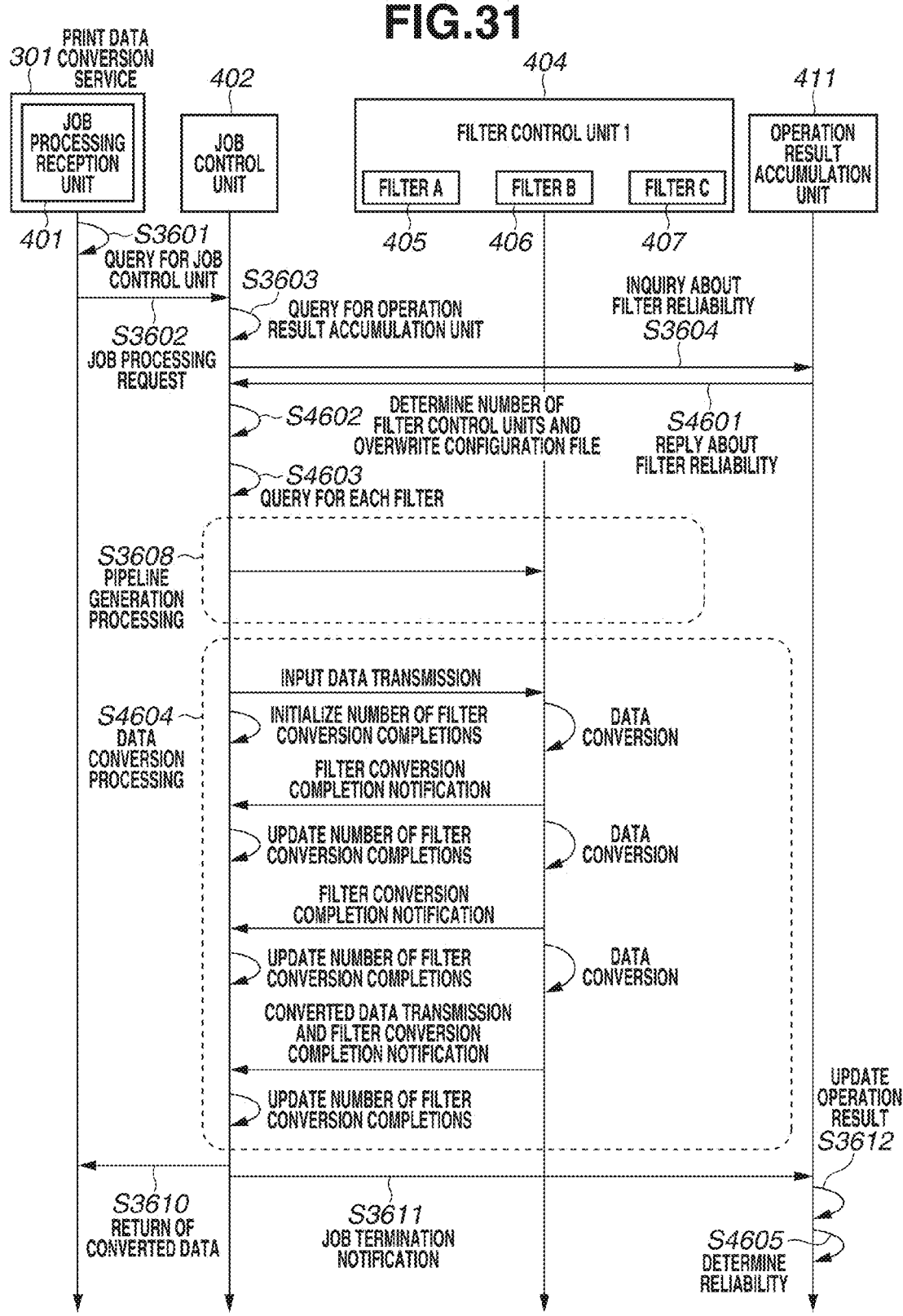
FIG. 31 is a sequence diagram illustrating the flow of data conversion processing in a case where a job normally terminates in an early stage of service start according to a fifth exemplary embodiment.

FIG. 31 is a sequence diagram illustrating the flow of data conversion processing in a case where a job normally terminates in an early stage of start of the service according to the fifth exemplary embodiment. The same processing operations as those described in the fourth exemplary embodiment illustrated in FIG. 28 are assigned the respective same reference numerals and are not repeated in the description.

In step S4601, the operation result accumulation unit 411 sends, to the job control unit 402, a response about the reliability of each filter, about which an inquiry has been received, via the service interface of the job control unit 402. The response indicates that the reliability of the filter A is "high", the reliability of the filter B is "high", and the reliability of the filter C is "high".

In step S4602, the job control unit 402 determines the number of filter control units 404 and the filter control unit names, into which the respective filters are loaded, based on the reliability of each filter. Also, the job control unit 402 overwrites the determined number of filter control units 404 to the Filter Host num attribute of the element 501 of the configuration file (FIG. 5) and overwrites the names of filter control units, into which the respective filters are loaded, to the Filter Host name attribute of the element 502. Here, overwriting is performed in such a way as to indicate that the number of filter control units 404 is one, the filter A 405 is loaded into the filter control unit 1, the filter B 406 is loaded into the filter control unit 1, and the filter C 407 is loaded into the filter control unit 1.

In step S4603, the job control unit 402 makes a query request to the process information management unit 403 for the filter control unit 404 corresponding to each filter based on the configuration file (FIG. 5), and acquires the end point of each filter control unit 404. Here, the job control unit 402 acquires the end point of the filter control unit 1, into which the filter A 405, the filter B 406, and the filter C 407 have been loaded.

In step S4604, which is data conversion processing, the job control unit 402 transmits data to a pipeline connected to the first-stage filer control unit 1 and, after that, initializes the "number of filter conversion completions" to "0". The filter control unit 1 performs data conversion processing using the filter A. Upon completion of the data conversion processing using the filter A, the filter control unit 1 transmits a "filter conversion completion notification" to the job control unit 402. Upon receipt of the "filter conversion completion notification", the job control unit 402 increments the "number of filter conversion completions" by one. The filter control unit 1 performs data conversion processing using the filter B. Upon completion of the data conversion processing using the filter B, the filter control unit 1 transmits a "filter conversion completion notification" to the job control unit 402. Upon receipt of the "filter conversion completion notification", the job control unit 402 increments the "number of filter conversion completions" by one. The filter control unit 1 performs data conversion processing using the filter C.

Upon completion of the data conversion processing using the filter C, the filter control unit 1 transmits a "filter conversion completion notification" to the job control unit 402. Upon receipt of the "filter conversion completion notification", the job control unit 402 increments the "number of filter conversion completions" by one.

In step S4605, only after the number of processed jobs in each filter exceeds a predetermined number (for example, 20000 jobs), each time the table storing operation results is updated, the operation result accumulation unit 411 determines the reliability of each filter based on the updated numbers and overwrites the reliability 1305.

As described above, since, in an early stage of start of the service, the filter A, the filter B, and the filter C, the reliability of each of which is "high", are processed as the same process and, therefore, no interprocess communication occurs, the deterioration of performance can be minimized, and operation results can be accumulated. Also, after accumulation of the operation results, the deterioration of performance can be reduced while securing availability.

<Event of Crash>

Figure 32:
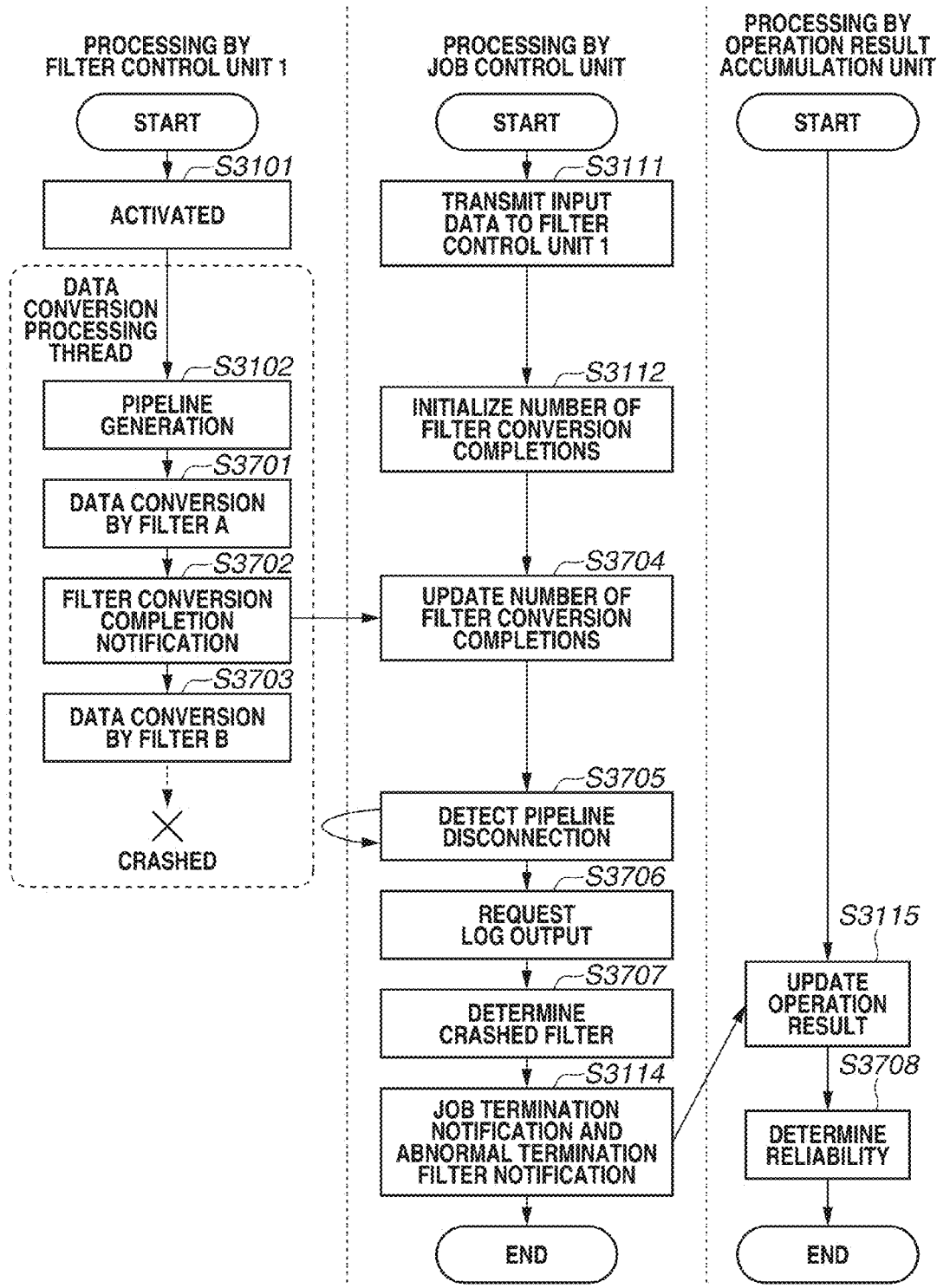
FIG. 32 illustrates the flow of processing in a case where a filter has crashed according to the fifth exemplary embodiment.

FIG. 32 illustrates the flow of processing when a crash has occurred during data conversion processing, i.e., during processing in step S3607 and subsequent steps of the processing flow illustrated in FIG. 28.

Here, it is supposed that the filter control unit 1, into which the filter A, the filter B, and the filter C are loaded, has crashed during the process of data conversion by the filter B after the completion of data conversion by the filter A.

The same processing operations as those described in the fourth exemplary embodiment illustrated in FIG. 26 are assigned the respective same reference numerals and are not repeated in the description.

In step S3701, the filter control unit 1 performs data conversion of a job with a data conversion processing thread using the filter A.

In step S3702, upon completion of the data conversion processing using the filter A, the filter control unit 1 transmits a "filter conversion completion notification" to the job control unit 402.

In step S3703, the filter control unit 1 performs data conversion of the job with the data conversion processing thread using the filter B. In the example illustrated in FIG.

32, it is supposed that the filter control unit 1 has crashed during data conversion processing using the filter B.

In step S3704, upon receipt of the "filter conversion completion notification" from the filter control unit 1, the job control unit 402 increments the "number of filter conversion completions" by one. Here, the "number of filter conversion completions" is updated to "1".

In step S3705, the job control unit 402 detects disconnection of the pipeline of the filter control unit 1. More specifically, the filter control unit 1 and the job control unit 402 periodically exchange a packet for living confirmation and detect that the packet has ceased based on time out.

In step S3706, the job control unit 402 requests the log output unit 408 to output a log message indicating the pipeline disconnection. The log output unit 408 receives this message and writes information indicative of the pipeline disconnection to the log file.

In step S3707, the job control unit 402 refers to the configuration file (FIG. 5) and the number of filter conversion completions, and determines a filter that has crashed. Here, since the number of filter conversion completions is "1", the job control unit 402 determines that the filter B, which is the second filter in the configuration file item 502, has crashed.

In step S3708, the operation result accumulation unit 411 determines the reliability of each filter if the updated number of processed jobs of each filter exceeds a predetermined number (for example, 20000 jobs).

The operation result accumulation unit 411 determines the reliability based on the operation results if the number of processed jobs 1303 of each filter exceeds the predetermined number (for example, 20000 jobs), and overwrites the reliability 1305. Thus, if the number of processed jobs 1303 of each filter is equal to or less than the predetermined number (for example, 20000 jobs), the operation result accumulation unit 411 does not determine the reliability, so that the reliability 1305 remains "high", which is an initial value.

As described above, even if the filter control unit 1 has crashed, the other components (the job control unit 402 and the job processing reception unit 401) do not crash, so that information indicating that the pipeline has been disconnected can be left in the log file. Furthermore, operation results can be accumulated.

<Event of Hang-Up>

Figure 33:
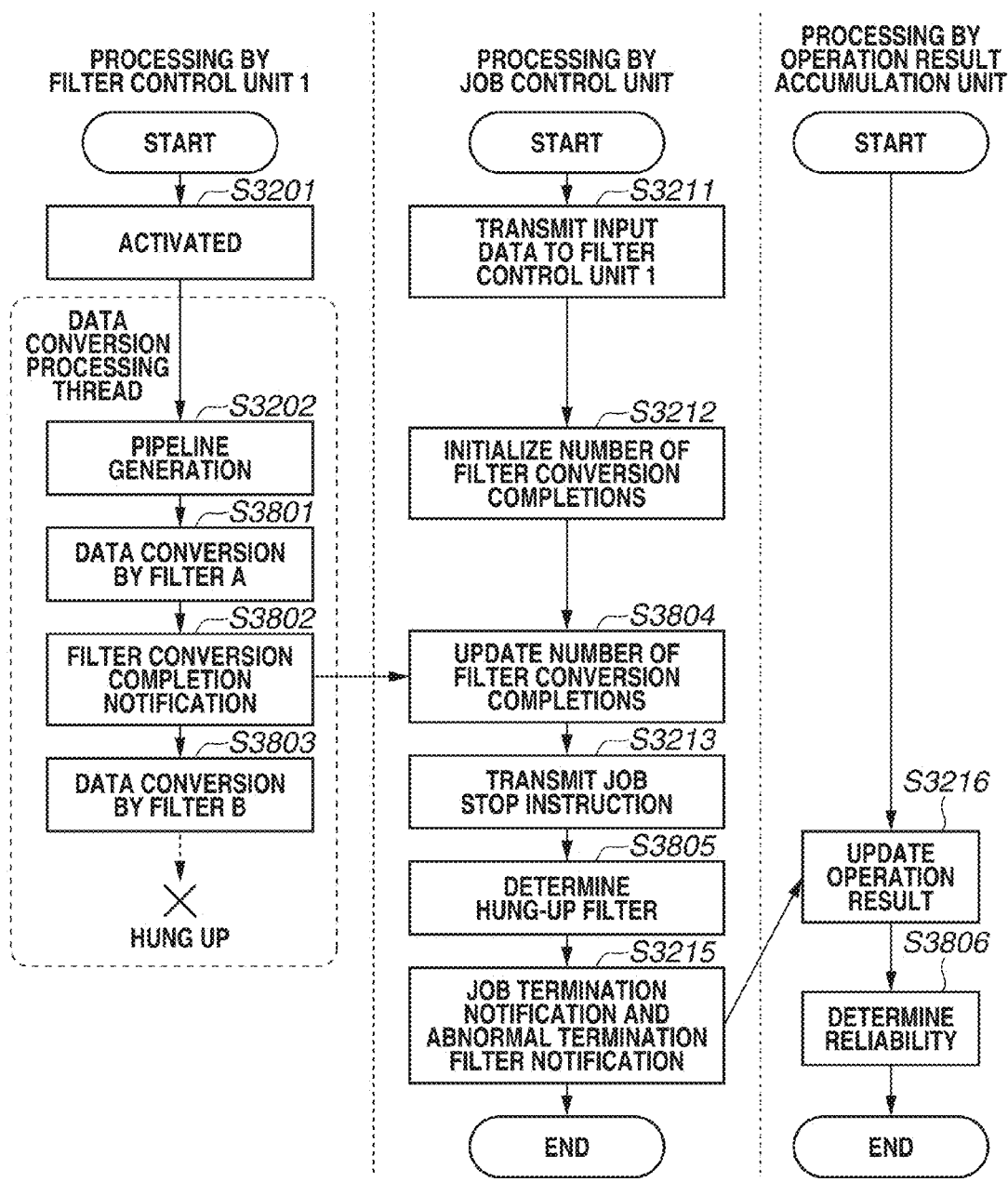
FIG. 33 illustrates the flow of processing in a case where a filter has hung up according to the fifth exemplary embodiment.

FIG. 33 illustrates the flow of processing when a hang-up has occurred during data conversion processing, i.e., during processing in step S3607 and subsequent steps of the processing flow illustrated in FIG. 28.

Here, it is supposed that the filter control unit 1, into which the filter A, the filter B, and the filter C are loaded, has hung up during the process of data conversion by the filter B after the completion of data conversion by the filter A.

The same processing operations as those described in the fourth exemplary embodiment illustrated in FIG. 27 are assigned the respective same reference numerals and are not repeated in the description.

In step S3801, the filter control unit 1 performs data conversion of a job with a data conversion processing thread using the filter A.

In step S3802, upon completion of the data conversion processing using the filter A, the filter control unit 1 transmits a "filter conversion completion notification" to the job control unit 402.

In step S3803, the filter control unit 1 performs data conversion of the job with the data conversion processing thread using the filter B. In the example illustrated in FIG. 33, it is supposed that the filter control unit 1 has hung up during data conversion processing using the filter B.

In step S3804, upon receipt of the "filter conversion completion notification" from the filter control unit 1, the job control unit 402 increments the "number of filter conversion completions" by one. Here, the "number of filter conversion completions" is updated to "1".

In step S3805, the job control unit 402 refers to the configuration file (FIG. 5) and the number of filter conversion completions, and determines a filter that has hung up. Here, since the number of filter conversion completions is "1", the job control unit 402 determines that the filter B, which is the second filter in the configuration file item 502, has hung up.

In step S3806, the operation result accumulation unit 411 determines the reliability of each filter if the updated number of processed jobs of each filter exceeds a predetermined number (for example, 20000 jobs).

The operation result accumulation unit 411 determines the reliability based on the operation results if the number of processed jobs 1303 of each filter exceeds the predetermined number (for example, 20000 jobs), and overwrites the reliability 1305. Thus, if the number of processed jobs 1303 of each filter is equal to or less than the predetermined number (for example, 20000 jobs), the operation result accumulation unit 411 does not determine the reliability, so that the reliability 1305 remains "high", which is an initial value. As described above, even if the filter control unit 1 has hung up, the other components (the job control unit 402 and the job processing reception unit 401) do not hang up, so that information indicating that the pipeline has been disconnected can be left in the log file. Furthermore, operation results can be accumulated.

With such processing performed in the above-described way, in an early stage of start of the service, operation results can be accumulated with the deterioration of performance minimized, and, after accumulation of the operation results, the deterioration of performance can be reduced while securing availability.

In the examples described in the fourth and fifth exemplary embodiments, the operation result accumulation unit 411 holds the table that stores operation results for every "filter name 1301" and "version 1302", as illustrated in FIGS. 22, 23, and 30.

However, such operation results may be considered that even the same filter C is likely to abnormally terminate for the job type "conversion for print service A" but do not abnormally terminate for the job type "conversion for print service C".

For example, the filter C abnormally terminates for the job type "conversion for print service A" if the output value of the filter B, which is the preceding processing of the filter C, does not conform to the input form allowable for the filter C and the input value check in the filter C is not correctly implemented. However, the filter C may run all right for the job type "conversion for print service C" if the output value of the filter Z, which is the preceding processing of the filter C, conforms to the input form allowable for the filter C.

In such a case, it is not appropriate to determine the reliability based on operation results for every "filter name 1301" and "version 1302". In other words, although the filter C has never abnormally terminated for the job type "conversion for print service C", the filter C may be processed as a different process. Therefore, performance may deteriorate.

Accordingly, a sixth exemplary embodiment is configured such that the operation result accumulation unit 411 holds a table storing operation results for every "job type", "filter name 1301", and "version 1302". The other processing operations are similar to those in the fourth exemplary embodiment are, therefore, not repeated in the description.

With this configuration, for the job type "conversion for print service C", the filter C with the version "1.0.0.0" is determined as "high" in reliability and is, therefore, processed as the same process. Thus, the deterioration of performance does not occur.

Furthermore, the sixth exemplary embodiment can be modified to obtain a similar effect in such a manner that the operation result accumulation unit 411 holds a table storing operation results for every "sequence of an anterior processing filter and a posterior processing filter", as indicated by columns 1902 illustrated in FIG. 34.

The column 1903 indicates the filter name of an anterior processing filter. The column 1904 indicates the version of the anterior processing filter. The column 1905 indicates the filter name of a posterior processing filter. The column 1906 indicates the version of the posterior processing filter. The row 1907 indicates operation results in a case where the filter B is processed and, then, the filter C is processed. The row 1908 indicates operation results in a case where input data is input from the job control unit 402 and, then, the filter A is processed first in the job. As described above, according to the sixth exemplary embodiment, in an information processing apparatus that generates image data for output, the possibility of a failure of one data conversion operation spreading to all the data conversion operations can be reduced.

Figure 41:
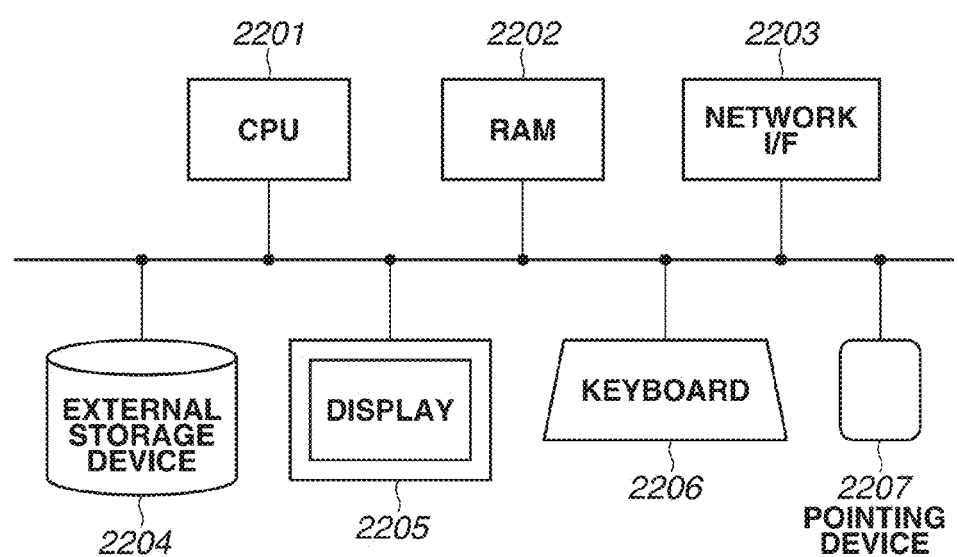
FIG. 41 illustrates an example configuration of a computer apparatus according to the seventh exemplary embodiment.

FIG. 41 illustrates an example configuration of a computer apparatus according to a seventh exemplary embodiment.

A CPU 2201 controls the entire apparatus according to a control program stored in a RAM 2202. The RAM 2202 is a volatile, main storage device that stores programs to be executed by the CPU 2201 and data such as document data and image data. A network interface (I/F) 2203 connects to a network and transmits and receives data under the control of the CPU 2201. An external storage device 2204 is a non-volatile memory, such as a magnetic disk or flash memory, that stores processing-target data and programs to be loaded into the RAM 2202. A display 2205 displays a processing result obtained by the apparatus. A keyboard 2206 is operable by the user instructing and operating the apparatus. A pointing device 2207, including a mouse, is also operable by the user instructing and operating the apparatus. The user can perform an operation on the content displayed by the display 2205 with the use of the keyboard 2206 or the pointing device 2207. In a case where the computer apparatus in the seventh exemplary embodiment is a data conversion server, the display 2205, the keyboard 2206, and the pointing device 2207 are not required. In other words, the user can operate the apparatus with an external apparatus via a network, or can confirm information acquired via a network with a display of another information apparatus.

The CPU 2201, which executes programs stored in the RAM 2202, invokes and uses, as appropriate, a part of the functions of an OS stored in the RAM 2202. Also, the CPU 2201 reads and writes the content of data to be temporarily stored in the RAM 2202 or reads and writes data from and to the external storage device 2204 based on a computer program stored in the RAM 2202. Furthermore, the CPU 2201 can transmit and receive data to and from another apparatus via the network interface 2203 based on a computer program stored in the RAM 2202. Moreover, the CPU 2201 can receive an input from the keyboard 2206 or the pointing device 2207 or can provide display on the display 2205 based on a program stored in the RAM 2202.

Figure 42:
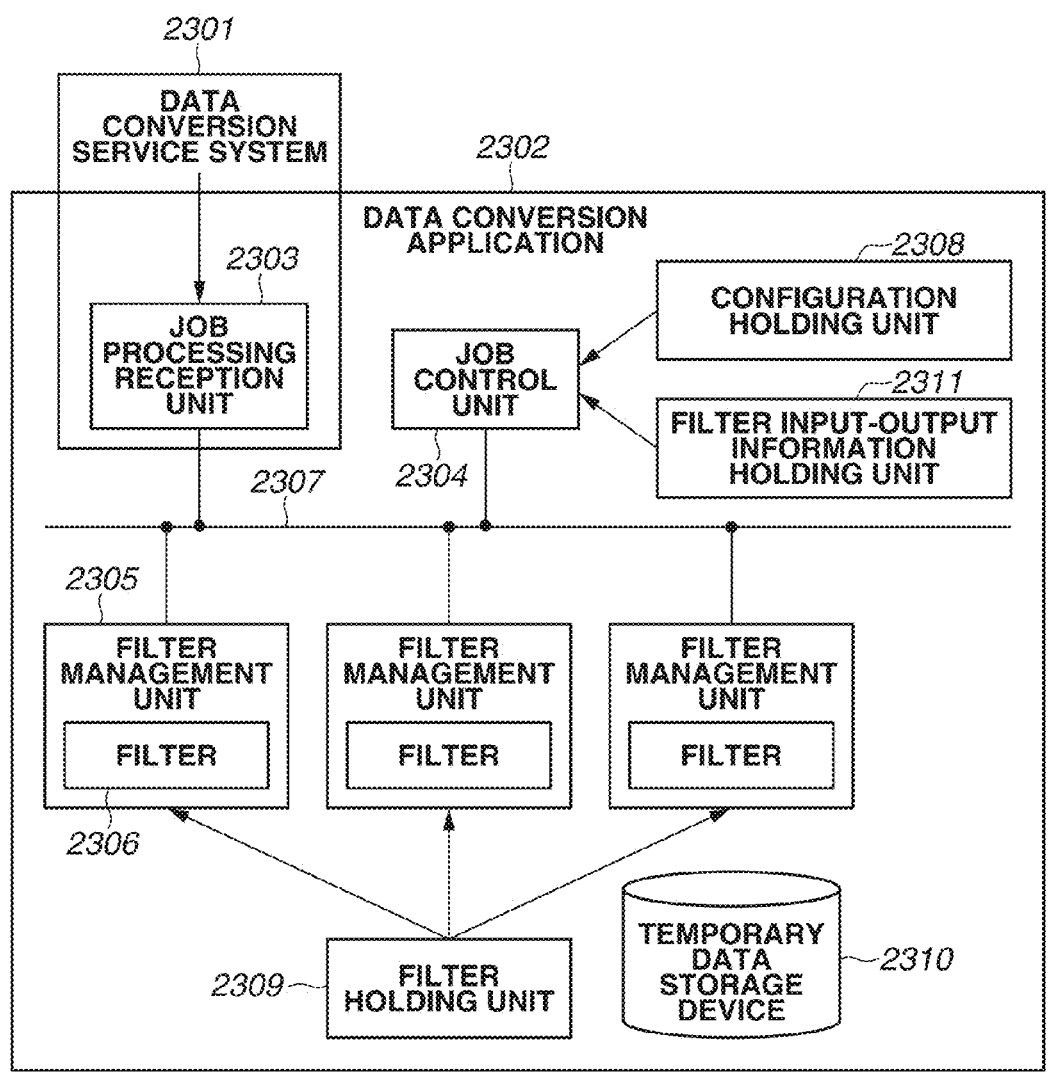
FIG. 42 illustrates an example configuration of components constituting a data conversion application according to the seventh exemplary embodiment.

FIG. 42 illustrates an example configuration of a data conversion application 2302, which is an application running on the computer apparatus according to the seventh exemplary embodiment. A data conversion service system 2301 and components constituting the data conversion application 2302 are implemented by the CPU 2201 executing program code stored in the RAM 2202.

The data conversion application 2302 provides a job processing reception unit 2303, which serves as an interface with the data conversion service system 2301. The job processing reception unit 2303 runs while being incorporated into a process in which the data conversion service system 2301 runs.

To perform data conversion, the data conversion application 2302 uses one or more data conversion modules in an order determined based on a job. In the following description, a data conversion module (a data conversion unit or a data processing unit) is referred to as a "filter". Here, a filter provided in the seventh exemplary embodiment is, for example, a filter that converts image data of the JPEG format into data of the PDF format or a filter that converts data of the PDF format into print data. In other words, a plurality of filters is used to sequentially perform a plurality of data conversion processing operations to produce data for printing.

The data conversion service system 2301 (which runs with the job processing reception unit 2303 incorporated therein), a job control unit 2304, and a filter management unit 2305 run as respective different processes. Also, the job processing reception unit 2303, the job control unit 2304, and the filter management unit 2305 are interconnected via a communication path 2307 to transmit and receive data. The communication path 2307 is provided in a communication protocol such as the TCP/IP.

The job processing reception unit 2303 receives a job input from the data conversion service system 2301, and instructs the job control unit 2304 via the communication path 2307 to execute the job. The job in the seventh exemplary embodiment is composed of a document to be subjected to data conversion and data such as a ticket containing a description of settings used to convert the document into print data.

The job control unit 2304 is a component that performs control of a job relating to each data conversion operation. The job control unit 2304 determines a filter configuration required to process a job input from the data conversion service system 2301 based on filter configuration information stored in a configuration holding unit 2308. After that, the job control unit 2304 instructs the filter management unit 2305, which manages a filter 2306 contained in the filter configuration, via the communication path 2307 to start data conversion processing. At this time, the job control unit 2304 notifies the filter management unit 2305, based on the filter configuration, of location information about a process that outputs a data conversion result. Furthermore, the job control unit 2304 acquires filter input-output information, which contains a description of the input and output forms supported by each filter, from a filter input-output information holding unit 2311. After that, the job control unit 2304 determines a method for passing data between processes according to the seventh exemplary embodiment, based on the filter input-output information. The details of processing by the job control unit 2304 are described below. The configuration holding unit 2308 may be provided in the external storage device 2204 or the RAM 2202.

The filter management unit 2305 loads the filter 2306 by acquiring program code corresponding to a required filter from a filter holding unit 2309. Also, when receiving, via the communication path 2307, processing-target data (input data), the filter management unit 2305 transfers the data to the filter 2306 and instructs the filter 2306 to perform data conversion processing. After receiving data subjected to data conversion processing from the filter, the filter management unit 2305 transmits, via the communication path 2307, the data subjected to data conversion processing to the process a notification of the location information of which has been received from the job control unit 2304. The details of processing by the filter management unit 2305 are described below. The filter holding unit 2309 may be provided in the external storage device 2204 or the RAM 2202.

A temporary data storage device 2310 is a storage region for temporarily storing data when the job processing reception unit 2303, the job control unit 2304, the filter management unit 2305, and the filter 2306 transfer data between processes. The temporary data storage device 2310 may be provided in the external storage device 2204.

<Interprocess Data Transmission Method (Data Transmission Method)>

The method for transferring processing-target data between processes (hereinafter, referred to as "interprocess data transmission") falls roughly into two types.

The first type of method is a method for transmitting data stored in the RAM 2202 from a source process to a destination process via the communication path 2307 (hereinafter, referred to as "data communication"). The destination process stores the received data into the RAM 2202.

The second type of method is a method for, after a source process converts data into a file and stores the file into the temporary data storage device 2310, transmitting reference information of the data (hereinafter, referred to as a "file path") to a destination process via the communication path 2307 (hereinafter, referred to as "path communication"). The destination process acquires processing-target data stored in the temporary data storage device 2310 based on the received file path.

As mentioned in the foregoing, the data communication transmits data using the communication path 2307. The path communication transmits data using the temporary data storage device 2310. In general, the data communication is faster than the path communication. This is because the transfer speed of the communication path 2307 is higher than the transfer speed of the external storage device 2204, in which the temporary data storage device 2310 is provided. Although the path communication additionally involves a time required to transmit a file path, that time is sufficiently shorter than a time required to read and write data with respect to the temporary data storage device 2310. Therefore, that time is not mentioned here.

<Input and Output Forms of Filter>

As described above, the seventh exemplary embodiment performs data conversion using filters. However, the filters fall into two types in input and output forms (input and output forms of processing-target data between the filter management unit 2305 and the filter 2306).

The first type of form is a form for, after the filter management unit 2305 stores processing-target data into an address region allocated in the RAM 2202, passing reference information of the address region to the filter 2306 (hereinafter, referred to as "pass by memory").

The second type of form is a form for, after the filter management unit 2305 stores processing-target data into the temporary data storage device 2310, passing the file path of the data to the filter 2306 (hereinafter, referred to as "pass by path"). Furthermore, the same also applies to a case where the filter 2306 outputs a processing result to the filter management unit 2305.

For some filters, there may be such limitations that the supported input and output forms are only pass by memory or only pass by path. This results from incorporating an outside existing library during the development of filters. More specifically, to cope with large-scale software development, filters may be developed not from the beginning but with an outside existing library incorporated, and there may be limitations on the input and output forms of the library.

<Method for Determining Interprocess Data Transmission in Seventh Exemplary Embodiment>

In the seventh exemplary embodiment, each filter (file management unit) is activated for every process. Therefore, for example, to allow the second filter to perform data conversion on intermediate processing data generated by the first filter performing data conversion, interprocess data transmission is required. As mentioned in the foregoing, since the data communication is faster than the path communication, basically, data transmission can be performed with the use of the data communication. However, depending on the limitations on the input and output forms of filters, in some cases, it may be preferred to perform interprocess data transmission with the use of the path communication rather than the data communication. For example, this applies to a case where, when data conversion processing is to be performed by the second filter after data conversion processing performed by the first filter, any one of the output form available for the first filter and the input form available for the second filter is only pass by path.

FIGS. 35A, 35B, 35C, and 35D each illustrate a concept of interprocess data transmission between filter management units. In the examples illustrated in FIGS. 35A, 35B, 35C, and 35D, interprocess data transmission is performed from a filter management unit A 2401, which manages a filter A 2402, to a filter management unit B 2403, which manages a filter B 2404.

Figure 35A:
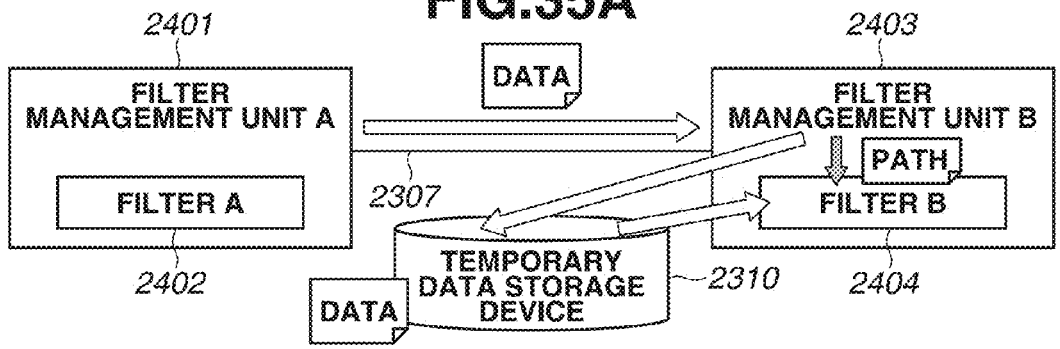
FIGS. 35A, 35B, 35C, and 35D each illustrate a concept of interprocess data transmission between filter management units according to a seventh exemplary embodiment.
Figure 35B:
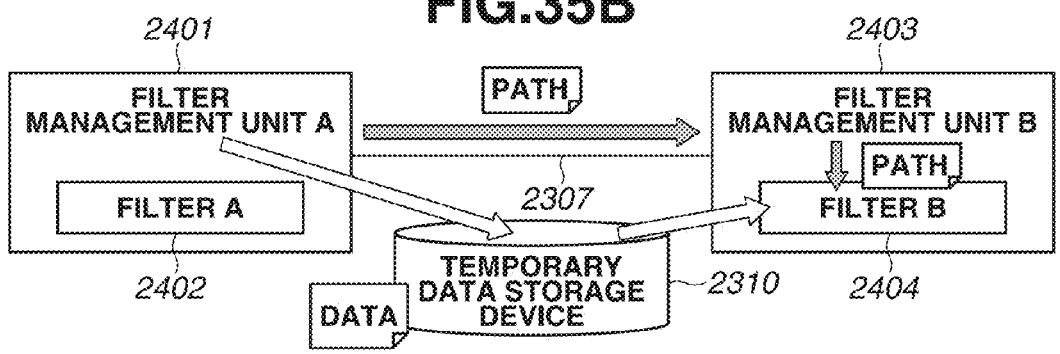

In the examples illustrated in FIGS. 35A and 35B, the input and output forms supported by the filter B 2404 are only pass by path. FIG. 35A illustrates a case where interprocess data transmission is performed with the use of the data communication from the filter management unit A 2401 to the filter management unit B 2403. In this case, while the filter management unit B 2403 stores the received data into the RAM 2202, the filter B 2404 does not support the input form of pass by memory. Therefore, it is necessary that the filter management unit B 2403 converts the data into a file and then inputs its file path to the filter B 2404 via pass by path. FIG. 35B illustrates a case where interprocess data transmission is performed with the use of the path communication from the filter management unit A 2401 to the filter management unit B 2403. In this case, it is necessary to convert data into a file before the filter management unit A 2401 (or the filter A 2402) performs interprocess data transmission. However, since the filter B 2404 supports the input form of pass by path, the filter management unit B 2403 can directly input the received file path to the filter B 2404. Here, a comparison between the case using the data communication and the case using the path communication for interprocess data transmission bespeaks that, while the number of times of reading and writing with respect to the temporary data storage device 2310 is the same, the amount of communication through the communication path 2307 is less in the case using the path communication than in the case using the data communication. Accordingly, in a case where the filter B 2404, i.e., a filter managed by a destination filter management unit (hereinafter, referred to as a "post-stage filter"), supports only the input and output forms of pass by path, the path communication is faster than the data communication.

Figure 35C:
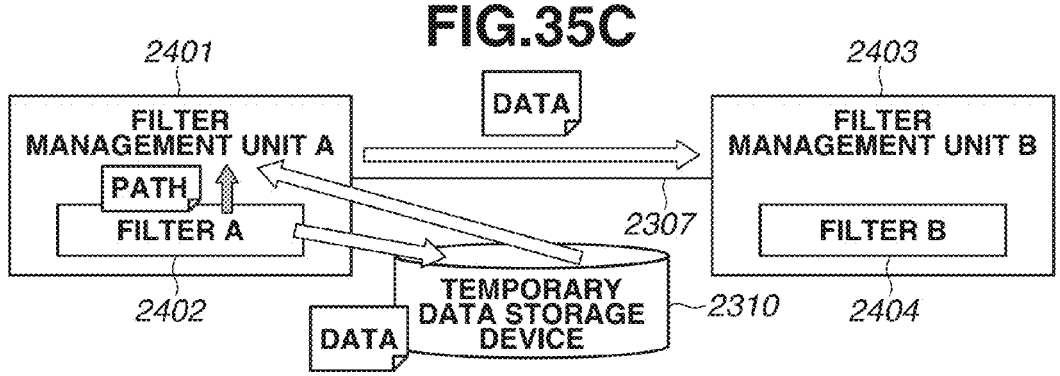
Figure 35D:
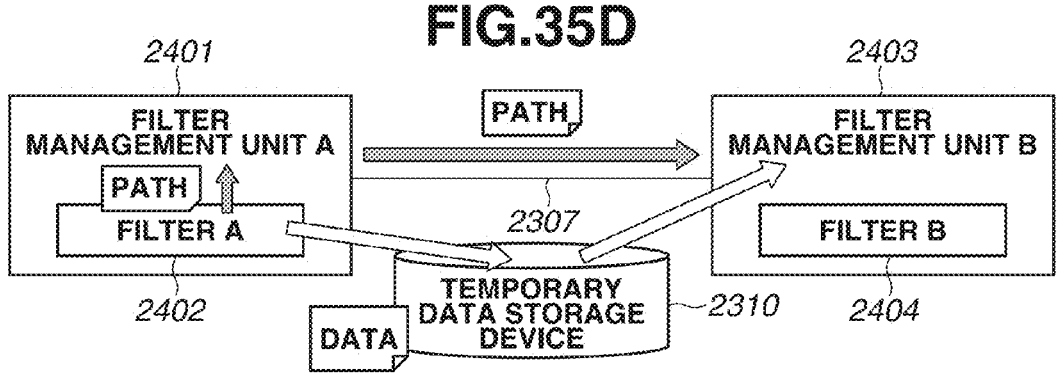

In the examples illustrated in FIGS. 35C and 35D, the input and output forms supported by the filter A 2402 are only pass by path. FIG. 35C illustrates a case where interprocess data transmission is performed with the use of the data communication from the filter management unit A 2401 to the filter management unit B 2403. In this case, it is necessary to perform interprocess data transmission after the filter management unit A 2401 acquires processing target data stored in the temporary data storage device 2310 based on the file path output from the filter A 2402. FIG. 35D illustrates a case where interprocess data transmission is performed with the use of the path communication from the filter management unit A 2401 to the filter management unit B 2403. In this case, the filter management unit A 2401 can directly transmit, by interprocess data transmission, the file path output from the filter A 2402. However, it is necessary that the filter management unit B 2403 (or the filter B 2404) acquires processing target data stored in the temporary data storage device 2310 based on the received file path. Here, a comparison between the case using the data communication and the case using the path communication for interprocess data transmission bespeaks that, while the number of times of reading and writing with respect to the temporary data storage device 2310 is the same, the amount of communication through the communication path 2307 is less in the case using the path communication than in the case using the data communication. Accordingly, in a case where the filter A 2402, i.e., a filter managed by a source filter management unit (hereinafter, referred to as a "pre-stage filter"), supports only the input and output forms of pass by path, the path communication is faster than the data communication.

FIG. 36 illustrates a method for interprocess data transmission according to the seventh exemplary embodiment. Since, basically, the data communication is faster than the path communication, the data communication is used for interprocess data transmission. However, as described above with reference to FIGS. 35A, 35B, 35C, and 35D, in a case where the output form supported by the pre-stage filter is only pass by path or the input form supported by the post-stage filter is only pass by path, the path communication is faster than the data communication to perform interprocess data transmission, so that the path communication is used for interprocess data transmission.

Here, there are two cases in which the filter management unit 2305 is required to perform processing before and after interprocess data transmission. In one case, the output form supported by the pre-stage filter is only pass by memory, and the input form supported by the post-stage filter is only pass by path (illustrated in a field 2501). In this case, while the path communication is used for interprocess data transmission, data is output from the pre-stage filter via pass by memory. Therefore, it is necessary that the filter management unit that manages the pre-stage filter converts the data into a file, stores the file into the temporary data storage device 2310, and then performs the path communication. In the other case, the output form supported by the pre-stage filter is only pass by path, and the input form supported by the post-stage filter is only pass by memory (illustrated in a field 2502). In this case, while the path communication is used for interprocess data transmission, the input form supported by the post-stage filter is only pass by memory. Therefore, it is necessary that the filter management unit that manages the post-stage filter acquires processing target data stored in the temporary data storage device 2310 based on the file path received via the path communication, and then inputs the data to the post-stage filter via pass by memory.

Figure 37:
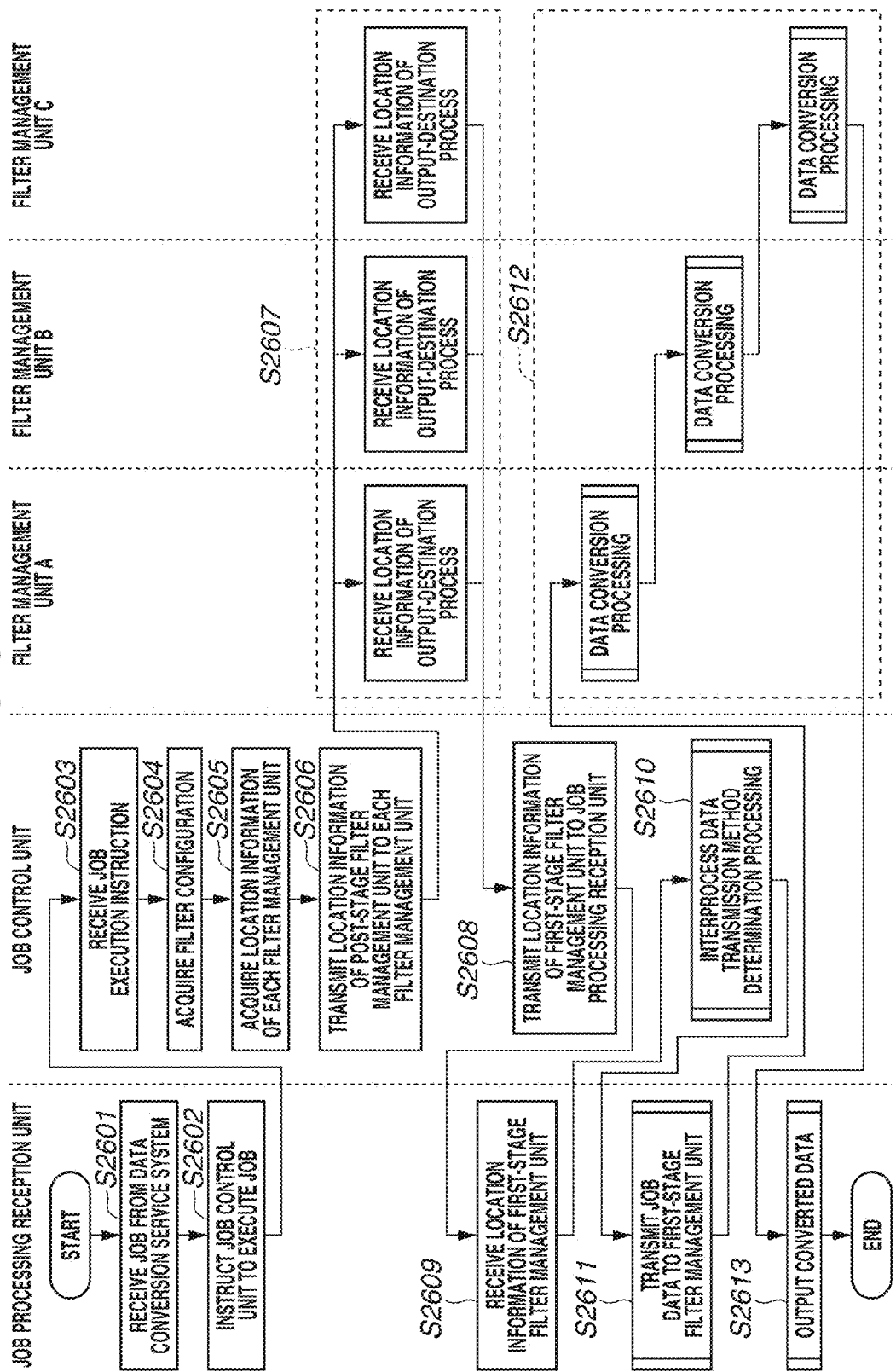
FIG. 37 is a flowchart illustrating job execution processing according to the seventh exemplary embodiment.

Next, job execution processing performed by the data conversion application 2302 according to the seventh exemplary embodiment is described. FIG. 37 is a flowchart illustrating the procedures in which the data conversion application 2302 executes a job from the data conversion service system 2301. Steps in the flowchart of FIG. 37 are implemented by the CPU 2201 reading various computer programs from the RAM 2202 and executing the programs. The various computer programs used to perform the procedures illustrated in flowchart of FIG. 37 are stored in any one of storage units including the external storage device 2204 in addition to the RAM 2202 of the computer apparatus.

In step S2601, the job processing reception unit 2303 receives a job from the data conversion service system 2301.

In step S2602, the job processing reception unit 2303 instructs the job control unit 2304 to execute the job. At this time, the job processing reception unit 2303 analyzes the job and transmits the type of the job and the input and output forms for job data to the job control unit 2304.

In step S2603, the job control unit 2304 receives the job execution instruction transmitted from the job processing reception unit 2303 in step S2602. Here, at the same time, the job control unit 2304 also receives the type of the job and the input and output forms for job data transmitted from the job processing reception unit 2303 in step S2602.

In step S2604, the job control unit 2304 acquires filer configuration information from the configuration holding unit 2308 based on information indicative of the job content received in step S2603. Then, the job control unit 2304 analyzes the configuration information to determine types of filters and their processing sequence. The details of the filter configuration information and the processing in step S2604 are described below with reference to FIG. 38.

In step S2605, the job control unit 2304 acquires, based on the filer configuration information acquired in step S2604, location information of filter management units that manage the respective filters contained in the configuration information. For example, if the types of filters include a filter A, a filter B, and a filter C, the job control unit 2304 acquires location information of each of a filter management unit A, a filter management unit B, and a filter management unit C, which respectively manage the filters A, B, and C. Here, the location information includes an IP address and a port number if the communication path 2307 is provided in the TCP/IP.

In step S2606, the job control unit 2304 transmits, to each filter control unit that manages the associated filter contained in the configuration information, location information of the next-stage filter management unit. This transmission is performed based on the filter configuration information acquired in step S2604. However, to a filter management unit that manages the last-stage filter, the job control unit 2304 transmits location information of the job processing reception unit 2303, which finally outputs a data conversion result. For example, in a case where the processing sequence of filters is the filter A, the filter B, and the filter C in this order, the job control unit 2304 transmits location information of the filter management unit B to the filter management unit A, transmits location information of the filter management unit C to the filter management unit B, and transmits location information of the job processing reception unit 2303 to the filter management unit C.

In step S2607, each filter control unit 2305 that manages the associated filter contained in the configuration information receives location information of an output-destination process transmitted from the job control unit 2304. The location information is used for processing in step S2612, which is described below.

In step S2608, the job control unit 2304 transmits, to the job processing reception unit 2303, location information of a filter management unit that manages the first-stage filter acquired in step S2605.

In step S2609, the job processing reception unit 2303 receives the location information of the filter management unit that manages the first-stage filter, which is transmitted from the job control unit 2304 in step S2608. This location information is used for processing in step S2611, which is described below.

In step S2610, the job control unit 2304 invokes "interprocess data transmission method determination processing" as a subroutine. The details of the "interprocess data transmission method determination processing" as a subroutine are described below with reference to FIG. 39.

In step S2611, the job processing reception unit 2303 invokes "transmit job data to first-stage filter management unit" as a subroutine.

In step S2612, the filter control units 2305 that respectively manage the associated filters contained in the configuration information sequentially perform a plurality of data conversion processing operations in such a manner that, after one filter management unit 2305 performs first data conversion processing, the next filter management unit 2305 performs second data conversion processing.

In step S2613, the job processing reception unit 2303 invokes "output converted data" as a subroutine.

<Filter Configuration Information>

The filter configuration information, which the job control unit 2304 acquires from the configuration holding unit 2308, is described next. As mentioned in the foregoing, the filter configuration information is used to determine types of filters and their processing sequence.

FIG. 38 illustrates an example of filter configuration information (hereinafter, simply referred to as "configuration information"). The configuration information is held in the configuration holding unit 2308. In the example illustrated in FIG. 38, the configuration information is described in the Extensible Markup Language (XML) format. As a child element of "FiltersCatalog" element, which is a root element, there are described a plurality of "Application" elements 2701. In "Application" element, the type of a job ("id" attribute) is set forth. As a child element of "Application" element, there are "Filter" elements 2702. In "Filter" element, the name of a filter ("name" attribute) is set forth.

Taking as an example a case where the type of a job acquired by the job control unit 2304 in step S2603 is "Print", processing in step S2604 is described. In step S2604, the job control unit 2304 searches "id" attribute in "Application" element of the configuration information illustrated in FIG. 38 based on the type of the job acquired in step S2603. If the "id" attribute matches "Print", the job control unit 2304 acquires the processing sequence of filters based on the description order of "Filter" elements, which are child elements of the "Application" element. In the example illustrated in FIG. 38, the job control unit 2304 searches "id" attribute (2701) in "Application" element of the configuration information based on "Print", which is the type of the job acquired in step S2603. After that, the job control unit 2304 acquires "Filter" elements (2702), which are child elements of the "Application" element, to acquire the processing sequence of filters. In the example illustrated in FIG. 38, "FilterA", "FilterB", and "FilterC" are set forth in this order, and this order corresponds to the processing sequence of filters for the job. Accordingly, in a case where the filter configuration information illustrated as an example in FIG. 38 is used, data conversion is performed by the filters in the order of "FilterA", "FilterB", and "FilterC".

Figure 39B:
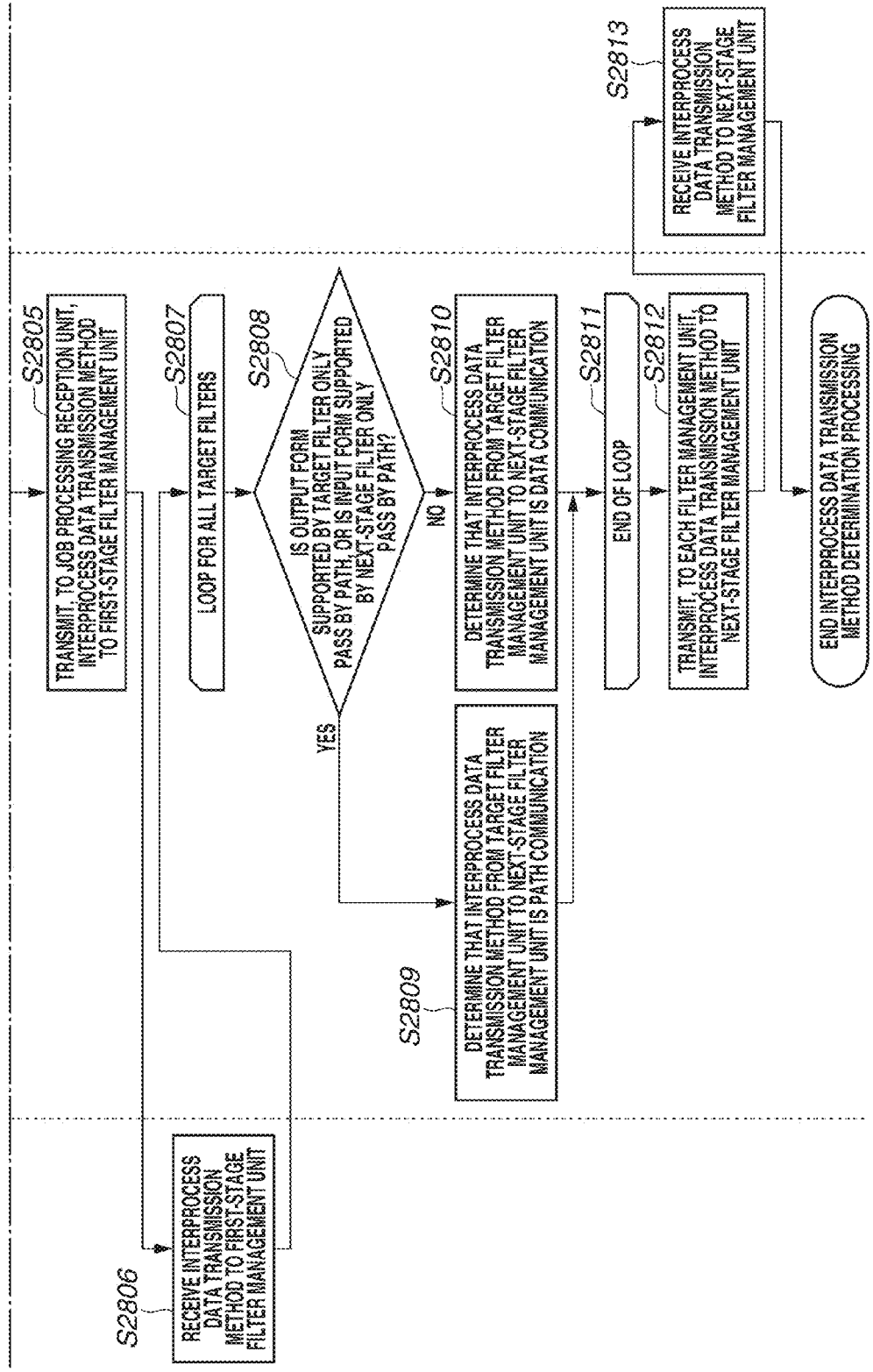
FIG. 39, which is composed of FIGS. 39A and 39B, is a flowchart illustrating processing for determining an interprocess data transmission method according to the seventh exemplary embodiment.

FIG. 39, which is composed of FIGS. 39A and 39B, is a flowchart illustrating the details of the "interprocess data transmission method determination processing" in step S2610. Steps in the flowchart of FIG. 39 are implemented by the CPU 2201 reading various computer programs from the RAM 2202 and executing the programs.

In step S2801, the job control unit 2304 acquires filter input-output information from the filter input-output information holding unit 2311 and analyzes the filter input-output information. This acquisition and analysis step is the processing for acquiring the input and output forms supported by the respective filters contained in the filter configuration information acquired in step S2604. The details of the filter input-output information and the processing in step S2801 are described below with reference to FIG. 40.

In step S2802, the job control unit 2304 determines whether the input form of job data acquired in step S2603 is pass by path or whether the input form supported by the first-stage filter acquired in step S2801 is only pass by path. If that condition is satisfied (YES in step S2802), the processing proceeds to step S2803. If that condition is not satisfied (NO in step S2802), the processing proceeds to step S2804.

In step S2803, the job control unit 2304 determines that the interprocess data transmission method from the job processing reception unit 2303 to the first-stage filter management unit is the path communication.

In step S2804, the job control unit 2304 determines that the interprocess data transmission method from the job processing reception unit 2303 to the first-stage filter management unit is the data communication.

In step S2805, the job control unit 2304 transmits, to the job processing reception unit 2303, the interprocess data transmission method from the job processing reception unit 2303 to the first-stage filter management unit, determined in step S2802 to step S2804.

In step S2806, the job processing reception unit 2303 receives the interprocess data transmission method from the job processing reception unit 2303 to the first-stage filter management unit, transmitted from the job control unit 2304 in step S2805.

In step S2807, the job control unit 2304 repeats processing in step S2808 to step S2810 for all the target filters used for data conversion (steps S2807 and S2811 denote loop processing).

In step S2808, the job control unit 2304 determines whether the output form supported by the target filter is only pass by path or whether the input form supported by the next-stage filter of the target filter is only pass by path. Here, information of the output form supported by the target filter and information of the input form supported by the next-stage filter of the target filter are the information acquired by the job control unit 2304 in step S2801. However, when the target filter is a final-stage filter, the job control unit 2304 determines whether the output form of the job data acquired in step S2603 (the form available for data output) is pass by path instead of determining whether the input form supported by the next-stage filter is only pass by path. If that condition is satisfied (YES in step S2808), the processing proceeds to step S2809. If that condition is not satisfied (NO in step S2808), the processing proceeds to step S2810.

In step S2809, the job control unit 2304 determines that the interprocess data transmission method from the target filter management unit to the next-stage filter management unit (when the target filer is a final-stage filter, the job processing reception unit 2303) is the path communication.

In step S2810, the job control unit 2304 determines that the interprocess data transmission method from the target filter management unit to the next-stage filter management unit (when the target filer is a final-stage filter, the job processing reception unit 2303) is the data communication.

In step S2811, the processing proceeds to step S2812 after the job control unit 2304 completes processing in step S2808 to step S2810 for all the target filters.

In step S2812, the job control unit 2304 transmits, to each filter management unit 2305, the interprocess data transmission method to the next-stage filter management unit determined in step S2808 to step S2810. However, to a filter management unit for the final-stage filter, the job control unit 2304 transmits the interprocess data transmission method to the job processing reception unit 2303.

In step S2813, each filter management unit 2305 receives the interprocess data transmission method to the next-stage filter management unit, transmitted from the job control unit 2304 in step S2812. However, the filter management unit for the final-stage filter receives the interprocess data transmission method to the job processing reception unit 2303.

<Filter Input-Output Information>

As mentioned in the foregoing, in the seventh exemplary embodiment, to acquire the input and output forms supported by the respective filters, the job control unit 2304 acquires filter input-output information from the filter input-output information holding unit 2311 and analyzes the filter input-output information.

FIG. 40 illustrates an example of filter input-output information stored in the filter input-output information holding unit 2311. The filter input-output information is held in the filter input-output information holding unit 2311. In the example illustrated in FIG. 40, the filter input-output information is described in the XML format. As a child element of "FilterInformation" element, which is a root element, there are described a plurality of "Filter" elements. In "Filter" element, the name of a filter ("name" attribute) is set forth. As a child element of "Filter" element, there are "IOType" elements. In "IOType" element, information indicating whether the filter supports pass by memory ("memory" attribute) and information indicating whether the filter supports pass by path ("path" attribute) are set forth. If the value of the "memory" attribute or the "path" attribute is "supported", it indicates that the filter supports pass by memory or pass by path, respectively. If the value of the "memory" attribute or the "path" attribute is "unsupported", it indicates that the filter does not support pass by memory or pass by path, respectively.

Taking as an example a case where the types of filters acquired in step S2604 are "FilterA", "FilterB", and "FilterC", processing in step S2801 is described. In step S2801, the job control unit 2304 searches "name" attribute in "Filter" element of the filter input-output information illustrated in FIG. 40 based on the types of filters acquired in step S2604. If the value of "name" attribute is included in the types of filters, the job control unit 2304 acquires information indicating whether the filter supports pass by memory and/or pass by path based on the "IOType" element, which is a child element of the "Filter" element. In the example illustrated in FIG. 40, the job control unit 2304 searches the "name" attributes (2901, 2902, and 2903) in the "Filter" elements of the filter input-output information based on the types of filters "FilterA", "FilterB", and "FilterC". After that, the job control unit 2304 acquires the "IOType" elements (2904, 2905, and 2906), which are child elements of the "Filter" elements and acquires information indicating whether each filter supports pass by memory and/or pass by path. In the example illustrated in FIG. 40, the job control unit 2304 can acquire information indicating that "FilterA" supports pass by memory and pass by path, "FilterB" supports pass by path, and "FilterC" supports pass by memory and pass by path.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-272039 filed Dec. 27, 2013 and No. 2013-272040 filed Dec. 27, 2013, which are hereby incorporated by reference herein in their entirety.

What is claimed is:

1. An information processing apparatus comprising:
an acquisition unit configured to acquire input data used to generate an image;
a conversion unit configured to generate intermediate data by performing data conversion on the input data with a first data conversion filter activated as a first process, and to generate image data by performing data conversion on the intermediate data with a second data conversion filter activated as a second process different from the first process;
an output unit configured to output the image data, and
a setting unit configured to set a transmission method for transmitting the intermediate data from the first process to the second process based on a form available for the first process to output data and a form available for the second process to input data, wherein said transmission method is at least one of a data communication method and a path communication method.

2. The information processing apparatus according to claim 1, wherein the image data output by the output unit is image data for printing.

3. The information processing apparatus according to claim 1, wherein the acquisition unit acquires the input data from a network-connected client computer, and wherein the output unit outputs the image data to a network-connected printer.

4. The information processing apparatus according to claim 1, further comprising:
an activation condition acquisition unit configured to acquire a process activation condition; and
an activation unit configured to activate the first process and the second process based on the process activation condition.

5. The information processing apparatus according to claim 4, wherein the process activation condition includes at least one of a number of activatable processes and necessity or unnecessity of constant activation for every process.

6. The information processing apparatus according to claim 1, further comprising a log output unit configured to output respective logs for the first data conversion filter and the second data conversion filter.

7. The information processing apparatus according to claim 1, further comprising:
a group setting unit configured to set groups by grouping a plurality of processes to be executed by the information processing apparatus; and
a plurality of log output units set for the respective groups.

8. The information processing apparatus according to claim 7, wherein the plurality of log output units exclusively output logs independently of one another.

9. The information processing apparatus according to claim 7, wherein the group setting unit exclusively controls connection information used to inquire each of the plurality of log output units.

10. The information processing apparatus according to claim 7, further comprising a deletion unit configured to delete a group set by the group setting unit.

11. The information processing apparatus according to claim 1, wherein, if both reliabilities of the first data conversion filter and the second data conversion filter are higher than a predetermined value, the conversion unit performs data conversion with the first data conversion filter and the second data conversion filter as the same process, and wherein, if at least one of the reliabilities of the first data conversion filter and the second data conversion filter is lower than the predetermined value, the conversion unit performs data conversion with the first data conversion filter and the second data conversion filter as respective different processes.

12. The information processing apparatus according to claim 11, further comprising a setting unit configured to set the reliabilities of the first data conversion filter and the second data conversion filter based on operation results of the data conversion.

13. The information processing apparatus according to claim 11, further comprising a setting unit configured to set the reliabilities of the first data conversion filter and the second data conversion filter based on a number of abnormal terminations of the data conversion.

14. The information processing apparatus according to claim 11, wherein, in an early stage of setting, the reliabilities of the first data conversion filter and the second data conversion filter are set higher than the predetermined value.

15. The information processing apparatus according to claim 11, wherein, in an early stage of setting, the reliabilities of the first data conversion filter and the second data conversion filter are set lower than the predetermined value.

16. The information processing apparatus according to claim 11, wherein the reliability is set for every job type.

17. An information processing method comprising:
acquiring input data used to generate an image;
generating intermediate data by performing data conversion on the input data with a first data conversion filter activated as a first process, and generating image data by performing data conversion on the intermediate data with a second data conversion filter activated as a second process different from the first process;
outputting the image data, and
setting a transmission method for transmitting the intermediate data from the first process to the second process based on a form available for the first process to output data and a form available for the second process to input data, wherein said transmission method is at least one of a data communication method and a path communication method.

18. A non-transitory computer-readable storage medium storing a computer program that causes a computer to function as an information processing apparatus comprising:
an acquisition unit configured to acquire input data used to generate an image;
a conversion unit configured to generate intermediate data by performing data conversion on the input data with a first data conversion filter activated as a first process, and to generate image data by performing data conversion on the intermediate data with a second data conversion filter activated as a second process different from the first process;
a setting unit configured to set a transmission method for transmitting the intermediate data from the first process to the second process based on a form available for the first process to output data and a form available for the second process to input data, wherein said transmission method is at least one of a data communication method and a path communication method
an output unit configured to output the image data.

19. The information processing apparatus according to claim 1, wherein the transmission method is at least one of a first method using a communication path and a second method using a temporary data storage.

* * * * *